US012188827B1

(12) United States Patent
Micko et al.

(10) Patent No.: US 12,188,827 B1
(45) Date of Patent: Jan. 7, 2025

(54) DEVICE WITH PIR SENSOR(S) HAVING OFFSET FIELD OF VIEWS (FoVs)

(71) Applicant: Amazon Technologies, Inc., Seattle, WA (US)

(72) Inventors: Eric S. Micko, San Jose, CA (US); Sonny Windstrup Rasmussen, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 18/081,099

(22) Filed: Dec. 14, 2022

(51) Int. Cl.
*G01J 5/0806* (2022.01)
*G01J 5/00* (2022.01)
*G01J 5/10* (2006.01)
*G01V 8/10* (2006.01)

(52) U.S. Cl.
CPC ........... *G01J 5/0806* (2013.01); *G01J 5/0022* (2013.01); *G01J 5/10* (2013.01); *G01V 8/10* (2013.01); *G01J 2005/0077* (2013.01)

(58) Field of Classification Search
CPC .......... G01J 5/0806; G01J 5/0022; G01J 5/10; G01J 2005/0077; G01V 8/10
See application file for complete search history.

(56) References Cited

U.S. PATENT DOCUMENTS

| 11,287,325 B2 * | 3/2022 | Hiremath | ................. G01J 5/10 |
| 2022/0217829 A1 * | 7/2022 | Hiremath | .............. G01J 5/0806 |

* cited by examiner

*Primary Examiner* — David P Porta
*Assistant Examiner* — Meenakshi S Sahu
(74) *Attorney, Agent, or Firm* — Lee & Hayes, P.C.

(57) ABSTRACT

An electronic device includes a first passive infrared (PIR) sensor and a second PIR sensor positive vertically below the first PIR sensor. One or more lenses are shaped and positioned to focus light received at the one or more lenses onto the first PIR sensor and the second PIR sensor. The first PIR sensor has a first field of view (FoV), and the second PIR sensor has a second FoV that is vertically and horizontally offset from the first FoV.

21 Claims, 32 Drawing Sheets

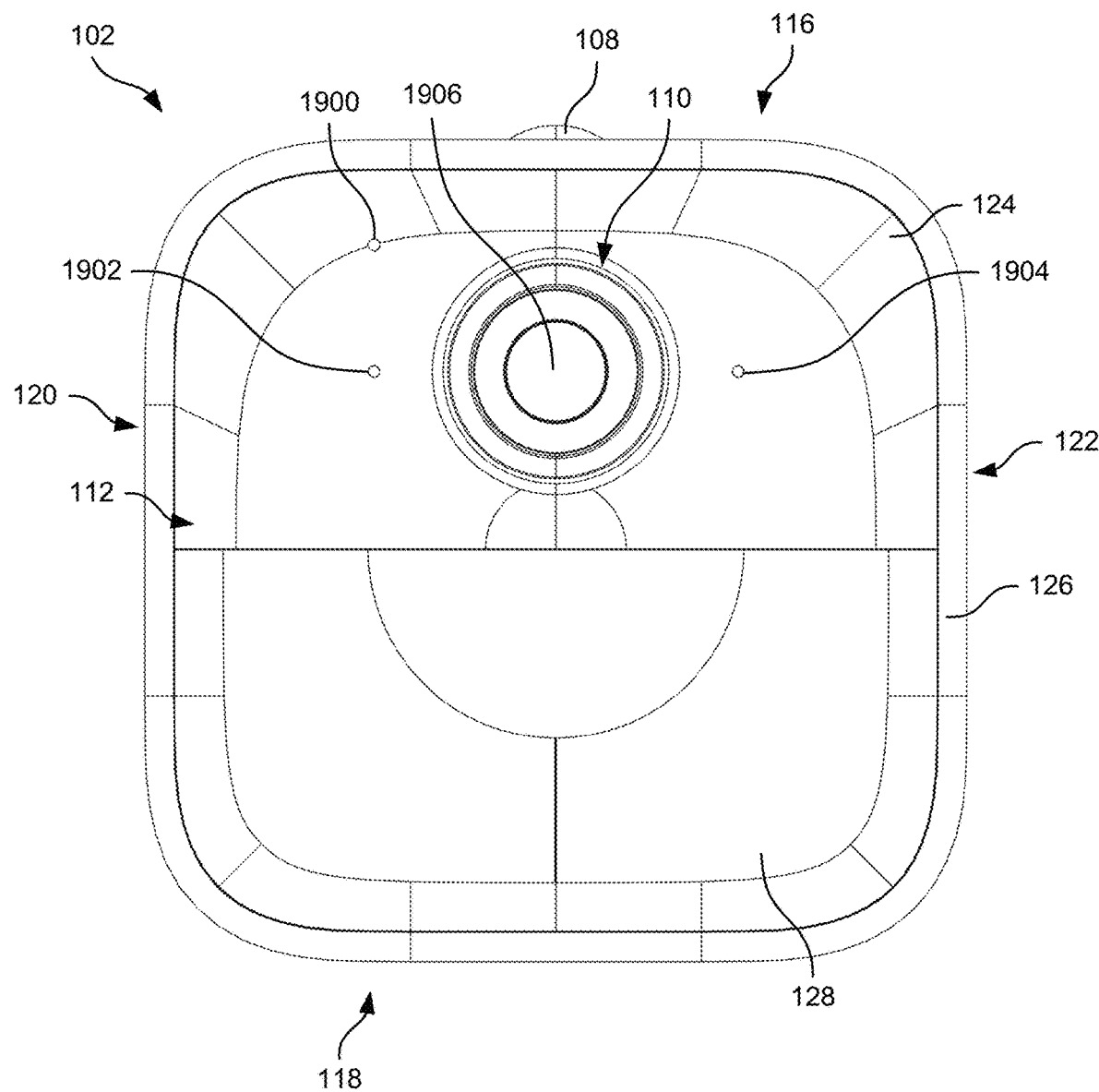
FIG. 19
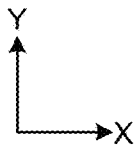

DEVICE WITH PIR SENSOR(S) HAVING OFFSET FIELD OF VIEWS (FoVs)

BACKGROUND

Home security is a concern for many homeowners, businesses, and renters. Some systems and devices include motion sensors that activate camera(s), light(s), and/or other components when motion is detected in an effort to deter would-be intruders. Unfortunately, these systems and devices may have a limited a field of view (FoV) that impacts their motion detection. In such instances, the systems and devices may fail to adequately monitor their intended environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The devices and systems depicted in the accompanying figures are not to scale and components within the figures may be depicted not to scale with each other.

FIG. 19 illustrates a front view of an example camera assembly of the device of FIG. 1, according to an example of the present disclosure.

DETAILED DESCRIPTION

Figure 1:
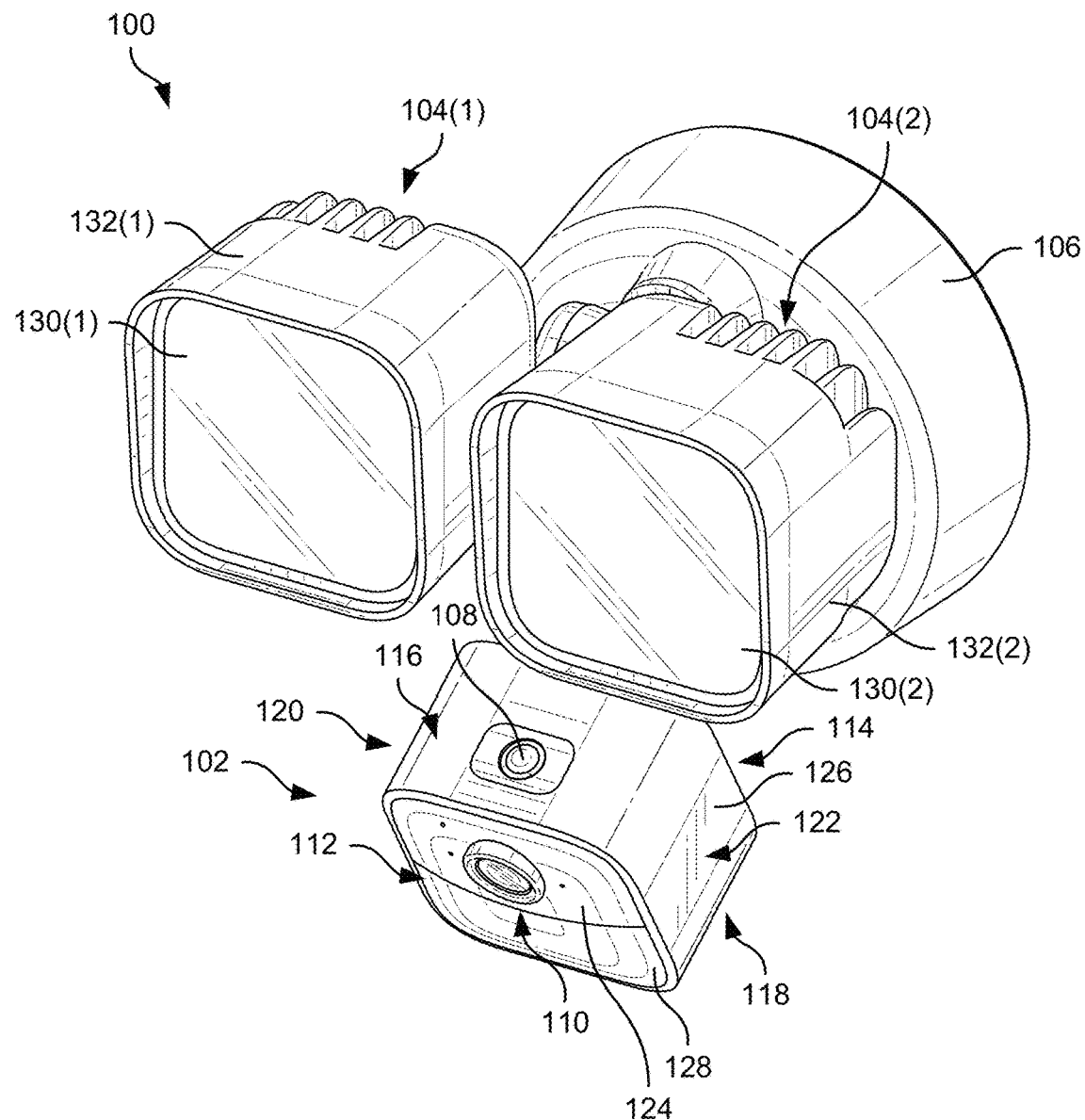
FIG. 1 illustrates a front perspective view of an example device, according to an example of the present disclosure.
Figure 1:
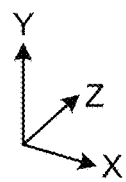

This application is directed, at least in part, to a device having improved motion sensing, audio capturing, video capturing, and illumination capabilities. In some instances, the device includes a camera assembly, one or more light assemblies, and a mount. The camera assembly may include a camera oriented to capture images and/or video within an environment of the device, and/or passive infrared (PIR) sensor(s) arranged to detect motion within the environment of the device. Additionally, the camera assembly may include microphones for capturing audio, as well as a speaker for outputting sound. The light assemblies may include lighting elements configured to illuminate at least a portion of the environment. For example, in response to detecting motion within the environment, the light assemblies may be configured to illuminate and output light. The camera assembly and/or the light assemblies may be rotationally and/or pivotably coupled to the mount for changing an orientation of the camera, the PIR sensor(s), and/or an illumination area, respectively. The mount, for example, may be mounted on a surface (e.g., wall) for disposing the device on the surface. The arrangement of the camera, the PIR sensors, and the lighting elements may permit the device to more accurately sense motion, record images and/or video, and/or illuminate the environment, respectively.

The camera assembly, as indicated above, includes the camera configured to capture image and/or video data within the environment. Additionally, the PIR sensor(s) may be used to detect motion within the environment. In some instances, the camera and the PIR sensor(s) are oriented towards a front of the camera assembly. In some instances, the PIR sensor(s) may be in a vertically stacked relationship compared to one another. For example, a first PIR sensor may reside vertically above a second PIR sensor. In some instances, the PIR sensor(s) are vertically aligned on the device. In some instances, the camera may be vertically aligned with the PIR sensor(s).

The camera assembly may include a camera housing, a front cover, and/or a sensor lens. In some instances, the front cover may couple to the camera housing, and the sensor lens may couple to the front cover. The camera and/or the PIR sensor(s) may be disposed within the camera housing. The sensor lens, or a portion thereof, may include a Fresnel lens for directing incoming light rays to the first PIR sensor and the second PIR sensor, respectively. In some instances, the Fresnel lens is made up of a plurality of individual lens elements having respective focal lengths, centers, concentric grooves, and so forth for manipulating (e.g. increasing) a FoV of the PIR sensor(s). For example, the individual lens elements of the Fresnel lens array may include surfaces at different angles corresponding to different focal lengths and centers that direct light rays (e.g., radiation) onto the PIR sensor(s) from different locations throughout the environment.

In some instances, the front cover defines a window having an upper portion and a lower portion. A divider of the front cover may be disposed between the upper portion and the lower portion, so as to separate the upper portion and the lower portion. The sensor lens may couple to the front cover and be transmissive to light rays for sensing via the PIR sensor(s). For example, the first PIR sensor may receive first light rays via the upper portion of the window, while the second PIR sensor may receive second light rays via the lower portion of the window. The divider disposed between the upper portion and the lower portion may prevent light rays directed towards the first PIR sensor interfering (e.g., cancelling out) with light rays directed towards the second PIR sensor. In some instances, the divider may also include scalloped-shaped features to reduce a glare or reflection of the incoming light rays.

In some instances, the camera includes a substantially similar FOV as the PIR sensor(s). For example, the PIR sensor(s) may be configured to detect motion within a FoV, and the camera may have a FoV that is the same as, or substantially overlaps with, that of the PIR sensor(s). That is, the first PIR sensor and the second PIR sensor may have a collective FoV, and the camera may have a FoV that aligns with the collective FOV of the first PIR sensor and the second PIR sensor. In doing so, as the first PIR sensor and/or the second PIR sensor sense motion, the camera is able to capture image data and/or video data associated with the motion. In some instances, the camera is configured to capture image data and/or video data in response to motion be detected.

The PIR sensors are configured to output a signal or sensor data, and the device may use a characteristic determined using the signal or sensor data to determine whether the PIR sensor detected an object. For example, the characteristic may include a voltage represented by the signal or sensor data, an amplitude of a wave generated or determined using the signal or sensor data, an angle of the wave generated using the signal or sensor data, and/or the like. The device may then use characteristics determined using the signal or sensor data from multiple PIR sensors to determine a distance to the object.

While the PIR sensors may sometimes be described as having a collective FoV, the PIR sensors may individually have separate FoVs. For example, the first PIR sensor may have a first FoV that extends a first distance from the device. The second PIR sensor may have a second FoV that extends a second distance, closer to the device, than the first FOV, and/or a third FoV that extends a third distance, closer to the device, than the second FoV. As such, the first PIR sensor may be responsible for detecting motion within the first FOV, while the second PIR sensor may be responsible for detecting motion within the second FoV and the third FoV. In some instances, the FoVs of the PIR sensors may be non-overlapping.

By including different FoVs for the PIR sensors, the device is able to detect objects when the objects are located close to the device (e.g., within 1 meter) and when the objects are located farther from the device (e.g., twenty meters). For example, when an object is located at a first, distant location from the device, the first PIR sensor is able to detect the object while the second PIR sensor may not. As such, the device may determine that the object is within a certain distance from the device based on the object being detected within the first FoV. Likewise, when the object is located at a second, proximate location from the device, the second PIR sensor is able to detect the object while the first PIR sensor may not. Here, the device may determine that the object is a certain distance from the device.

Additionally, in some instances, the PIR sensors may be individually configured depending upon a desired FOV of the device. For example, if a user of the device desires short-range detection, the user may deactivate or disable the first PIR sensor. Here, only the second PIR sensor may be used to detect motion within the second FoV and/or the third FoV. Comparatively, if the user desires long-range detection, the user may deactivate or disable the second PIR sensor. Here, only the first PIR sensor may be used to detect motion within the first FoV. However, the user may also enable both the first PIR sensor and the second PIR sensor for short and long range detection.

In some instances, the FoVs of the PIR sensors may be defined in terms of tiers. The first FoV may be associated with a first tier, while the second FOV and the third FoV may be associated with a second tier located below the first tier. For example, the first tier may be associated with long-range detection, while the second tier may be associated with short-range detection. In some instances, the different tiers may help the device to detect motion over a wide range (e.g., close to the device and spaced apart from the device), and/or allow the device to more accurately detection motion at certain distances from the device. Further, separating the FoVs into tiers allows the device to monitor short-range and long-range motion.

A PIR sensor may include, for example, two pyroelectric sensing elements. Each pyroelectric sensing element may comprise a pyroelectric crystal that generates an electrical charge in response to a change in temperature. Radiation (e.g. infrared light) received at a surface of a pyroelectric sensing element causes a change in temperature, which, in turn, generates an electrical charge. Stated alternatively, an absorbing layer of a pyroelectric sensing element transforms radiation flux change into a change in temperature and a pyroelectric component performs a thermal to electrical conversion. One or more low-noise and low leakage current field-effect transistors (e.g. a JFET) or operational amplifiers are used to convert charge into a signal voltage.

In some instances, the two pyroelectric sensing elements may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

In some instances, the PIR sensor may include two slots, each providing an optical path to one of the pyroelectric sensing elements. As discussed herein, a Fresnel lens array is configured to direct light received at the Fresnel lens array towards one or both of the pyroelectric sensing elements.

The PIR sensors may be analog, with an analog signal output, or may be digital, with digital data output generated utilizing an analog-to-digital converter (ADC).

A device may include the PIR sensors to detect objects. Each PIR sensor may output a signal or sensor data, where the device uses a characteristic determined using the signal or sensor data to determine whether the PIR sensor detected an object. The characteristic may include a voltage represented by the signal or sensor data, an amplitude of a wave generated or determined using the signal or sensor data, an angle of the wave generated using the signal or sensor data, and/or the like.

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage or an absolute value of a summed voltage exceeds a first threshold, and, if so, sends a logic signal (e.g. a Boolean value or an interrupt) to a controller (e.g. a microcontroller unit or MCU) of an electronic device.

In accordance with one or more preferred implementations, the IC component determines whether a difference between a current summed voltage and a previous summed voltage (e.g. at an immediate preceding time t−1) (or an absolute value of a difference between a current summed voltage and a previous summed voltage) exceeds a first threshold, and, if so, sends a logic signal (e.g. a Boolean value or an interrupt) to a controller (e.g. a microcontroller unit or MCU) of an electronic device.

In accordance with one or more preferred implementations, based on a received logic signal, the controller begins periodically polling or requesting PIR data (e.g. a most recent data value at the time of polling) from the IC component. For example, the controller may poll the IC component at a rate of 64 Hz.

In accordance with one or more preferred implementations, an electronic device is configured to allow a user to set a configuration setting enabling all PIR sensors or independently enabling or disabling a single PIR sensor, e.g. disabling a first PIR sensor while leaving a second PIR sensor enabled, or vice versa.

Fresnel lenses are commonly used in optics as a way to focus light, e.g. infrared light. An exemplary Fresnel lens has a smooth exterior surface and an interior surface having surface features (e.g. a curved surface) that causes refraction of light rays that pass through that feature. These surface features may be curved surfaces having a curvature designed to direct light to a focal point. Features or lens portions designed to direct light to a focal point may be characterized as lens facets. The curved nature of these facets may cause the thickness of a lens at a perimeter or side of one facet to be mismatched from the thickness of the lens at a perimeter or side of an adjoining facet. These mismatched "heights" may be connected together by a surface that can be characterized as a translation edge.

In accordance with one or more preferred implementations, facets and translation edges of a Fresnel lens may resemble, form, or represent grooves in a surface of the Fresnel lens. In some instances, these grooves may take the form of concentric arcs. These concentric arcs may be defined relative to a centerpoint that corresponds to a focal point for the lens.

In accordance with one or more preferred implementations, a Fresnel lens may comprise a plurality of lens sections that each have their own focal point. A lens section may include curved surfaces shaped and dimensioned to direct light onto the respective focal point of the lens section. A lens section may comprise facets and translation edges that resemble, form, or represent grooves in the shape or pattern of concentric arcs defined relative to a centerpoint that corresponds to a focal point for the lens section.

In accordance with one or more preferred implementations, a Fresnel lens comprising a plurality of lens sections is arranged in front of first and second PIR sensors, with a first plurality of the lens sections (e.g. a top row of lens sections) being shaped, dimensioned, and positioned to direct light onto the first PIR sensor, a second plurality of the lens sections (e.g. a middle row of lens sections) being shaped, dimensioned, and positioned to direct light onto the second PIR sensor, and a third plurality of the lens sections (e.g. a bottom row of lens sections) being shaped, dimensioned, and positioned to direct light onto the second PIR sensor.

Figure 30:
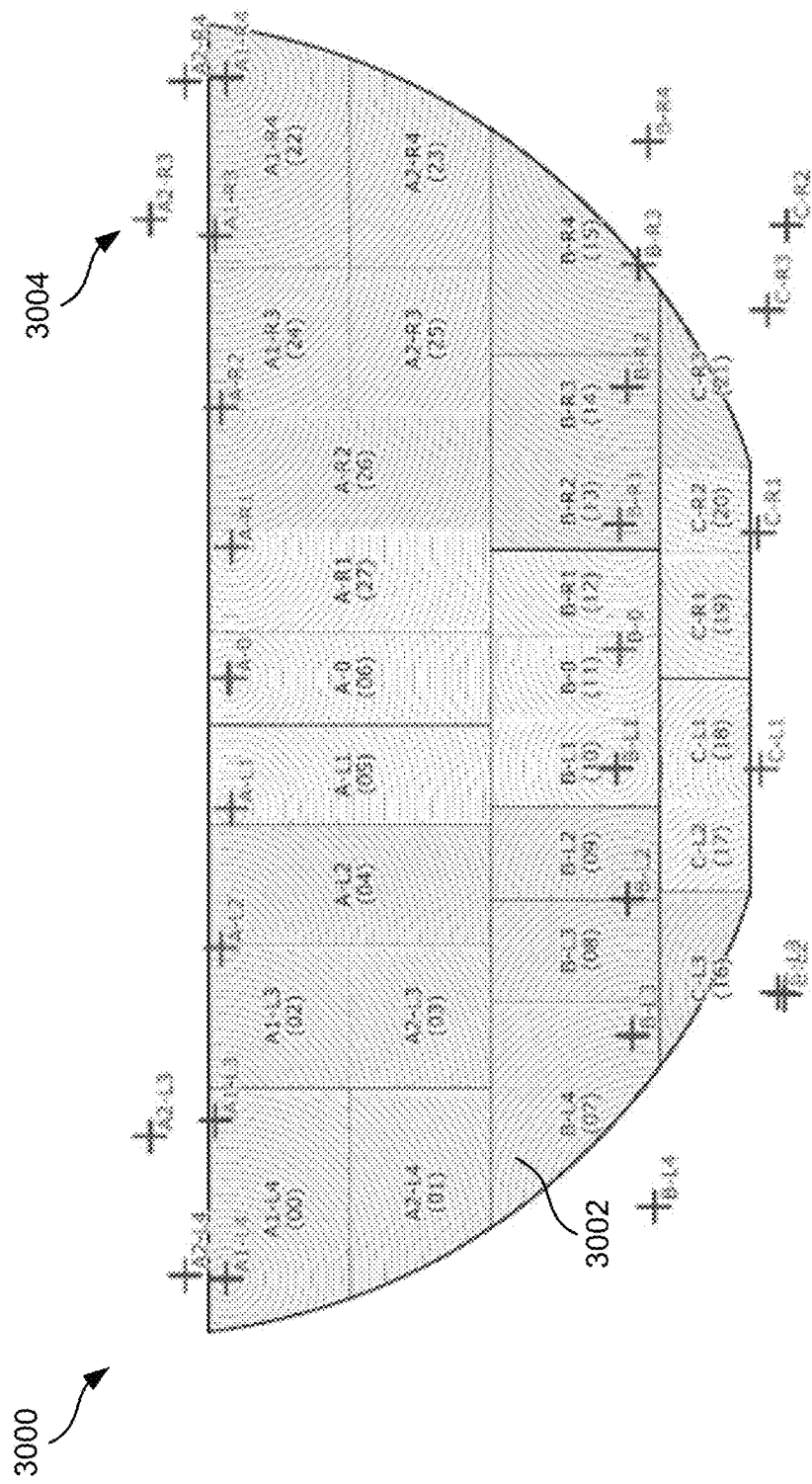
FIG. 30 illustrates an example lens of the device of FIG. 1, according to an example of the present disclosure.

For example, FIG. 30 illustrates an example Fresnel lens array 3000 comprising a plurality of Fresnel lens sections 3002 each having a respective centerpoint 3004 indicated with a plus (+). Each Fresnel lens section 3002 includes a corresponding focal point displaced out of the page (which can be characterized as being displaced along a z-axis, given an x-axis corresponding to a width of the page and a y-axis corresponding to a height of the page).

In some instances, the Fresnel lens array 3000 may include individual lens elements that are assembled together to form the Fresnel lens array 3000. That is, in some instances, lens elements or lens sections may be individually formed, and thereafter, may be assembled together to form a Fresnel lens or lens array. These individual lens elements or sections, as noted above, may include respective concentric grooves In some instances, a Fresnel lens or Fresnel lens array may include multiple focal lengths. Stated alternatively, lens sections or elements may include different focal lengths. However, the lens sections or lens elements that make up a Fresnel lens or Fresnel lens array may have a common focal point for sensing via PIR sensor(s). As such, the PIR sensor(s) may be located at the focal point.

In some instances, a Fresnel lens or lens array is configured to direct light rays to two PIR sensors. A Fresnel lens array may be symmetrical about a central axis/plane, such that a first half includes the same (or similar) lens elements (and translation edges) as a second half. Although described as directing light rays to two PIR sensors, a device (or other system) employing a Fresnel lens or lens array may include more than or less than two PIR sensors.

As introduced above, lens elements or sections may couple to one another in order to form the Fresnel lens array 3000. In some instances, the lens elements may be adhered to one another, bonded to one another, sonically welded to one another, and so forth. However, although described as being separate lens elements that are individually formed from separate pieces of material, in some instances, a Fresnel lens or lens array may be made up of a single piece of material, and the lens elements or sections with the different concentric grooves may be formed within the single piece of material. In this instance, the individual lens elements or sections may not be coupled together to form the Fresnel lens or lens array, but the Fresnel lens or lens array may include a unitary structure with facets and translation edges defining concentric grooves being formed therein.

In some instances, individual lens elements or sections may include different or similar shapes and/or sizes compared to one another. For example, certain lens elements or sections may be square-shaped, while other lens elements may be rectangular-shaped, or have curved edges, etc.

In accordance with one or more preferred implementations, a mold for a Fresnel lens or lens array is manufactured by using a diamond lathe, and the mold is used to injection mold a lens or lens array. In some instances, a lens is formed from HDPE, silicon, germanium, zinc-sulfide, or zinc-selenide.

Each of the FoVs of the PIR sensors may be characterized as including detectable zones. The detectable zones collectively define the FoVs. In accordance with one or more preferred implementations, the detectable zones may be characterized as being polarized (e.g., positive and negative detectable zones). For example, the first FoV may include a plurality of first detectable zones, the second FoV may include a plurality of second detectable zones, and/or the third FoV may include a plurality of the third detectable zones. As objects enter the detectable zones, the PIR sensors generate voltage values (positive or negative) indicative of motion being sensed within the detectable zone.

More specifically, the PIR sensors may have two slots, where each slot provides access to a pyroelectric element that is sensitive to IR. When the PIR sensors are idle, both slots detect the same amount of IR (e.g., the amount of IR radiated from walls, outdoors, etc.). However, when an object, such as a person, comes within the first FoV or the second FoV, IR of the person is intercepted by the first PIR sensor or the second PIR sensor. That is, as the person enters a detectable zone of the first FoV, the second FoV, or the third FoV, in response, a positive differential exists. Comparatively, when the person leaves the detectable zone of the first FoV, the second FoV, or the third FoV, the reverse happens, whereby the first PIR sensor or the second PIR sensor generates a negative differential change. These positive and negative signals are therefore used to indicate whether the person is entering or leaving the first FoV, the second FoV, or the third FoV.

In some instances, the device may determine values associated with the signals or data generated by the PIR sensor(s). For example, a first signal represented by first sensor data may include a first waveform and a second signal represented by second sensor data may include a second waveform. The device may analyze the first waveform to determine a first value (e.g., amplitude, angle, etc.) and/or may also analyze the second waveform to determine a second value (e.g., amplitude, angle, etc.). The difference in the infrared levels between first value and the second value may then be measured in order to detect the presence of the object.

By way of further illustration, as a person passes across the first FoV in a left to right direction, in front of the device, and comes within a first detectable zone of the plurality of first detectable zones, IR light will be directed to a first pyroelectric sensing element of the first PIR sensor, causing the first PIR sensor to output a signal or data based thereon. This signal may output by the first PIR sensor may be positive to indicate entry of the person into a detectable zone (or the FoV). A second detectable zone of the plurality of first detectable zones, however, does not receive the IR light, and accordingly, motion is detected. That is, because a difference exists between the first detectable zone and the second detectable zone, motion is sensed. Thereafter, during continued movement of the person, the person leaves the first detectable zone of the plurality of first detectable zones comes within the second, adjacent, detectable zone of the plurality of first detectable zones. Here, IR light will be directed to the second pyroelectric sensing element of the first PIR sensor, causing the first PIR sensor to output a signal or data based thereon. This signal may be negative to indicate an exit from the first detectable zone of the plurality of first detectable zones and an entrance into the second detectable zone of the plurality of first detectable zones. In other words, the signal may be sum of a first negative signal generated by the first pyroelectric sensing element of the first PIR sensor (e.g., indicative of the person leaving the first detectable zone) and a second negative signal generated by the second pyroelectric sensing element of the first PIR sensor (e.g., indicative of the person entering the second detectable zone).

However, in approach detection, for example, as the person nears the device, the output signals and/or data may cancel out. For example, positive and negative detectable zones may generate signals that cancel each other out. In such instances, the device may fail to detect motion of the object. In an effort to overcome these shortcomings, the detectable zones of the first FoV may be offset from the detectable zones of second FoV and/or the third FoV. (It will be appreciated that each of these detectable zones may itself be characterized as a field of view, e.g. a field of view provided by a first lens section for a first pyroelectric crystal received within a first slot of a PIR sensor). For example, the detectable zones of the first FoV may be azimuthally or horizontally offset (e.g., shifted) from the detectable zones of the second FOV and the third FoV. In some instances, the detectable zones of the second FOV and the third FOV are horizontally aligned. More generally, zones of the tier of the first FOV may be azimuthally offset from zones of the tier of the second FoV and the third FoV. Offsetting the detectable zones of the first FoV causes the detectable zones of the first FoV to not overlap with the detectable zones of the second FoV and/or the third FoV, thereby permitting the device to sense motion in the first FoV (e.g., without signals cancelling out).

In some instances, the first FoV, the second FoV, and/or the third FOV are created using the Fresnel lens. That is, as noted above, the Fresnel lens may direct light to the first PIR sensor and/or the second PIR sensor. The Fresnel lens may define features that are utilized to direct light from the various FoV onto one of the PIR sensors. The Fresnel lens may be shaped, positioned, oriented, and configured to direct light from a particular FoV onto a particular one of the PIR sensors.

While described with respect to PIR sensors, in other examples, the any other type of motion detector may be utilized. For example, the camera assembly may include one or more active IR sensor(s) oriented towards the front of the camera assembly. In some instances, the active IR sensor(s) may include two IR sensor(s) disposed beneath the front cover that are configured to emit IR light through a portion of the front cover. As such, the IR sensor(s) may emit signals (e.g., IR light) through at least a portion of the front cover and may receive the signals to detect IR radiation. As such, at least a portion of the front cover is transmissive to signals emitted from, and received by, the IR sensor(s).

The camera assembly may also include microphone(s) for capturing audio within the environment, speaker(s) for outputting sounding within the environment, ambient light sensor(s) for detecting lighting conditions within the environment, lighting elements configured to output light indicative of operations being performed by the device, button(s) that at least partially control an operation of the device (e.g., volume, sync, reset, turn on/off, etc.), and so forth. In some instances, the microphone(s) may be oriented towards the front of the camera assembly, and/or the speaker may be oriented to emit sound outward from a side of the camera assembly. The speaker may include any suitable speaker, such as a tweeter, mid-range, or subwoofer. In some instances, the lighting elements may illuminate to different colors of light, different patterns of light, and so forth depending on the operational state of the device. Additionally, the camera assembly may include computing components, such as network interfaces, for communicatively coupling the device to one or more additional devices, as well as other computing components that enable operation of the device.

The light assemblies may include various light emitting diodes (LEDs) for illuminating an environment. In some instances, the light assemblies include a first light assembly and a second light assembly. Flood LEDs (e.g., visible light) may be disposed within the light assemblies. In some instances, the light assemblies include a light housing in which the LEDs reside. The light housings may be coupled to the mount via arms, respectively. The light assemblies may be rotatably coupled to the arms, respectively, while the arms may be rotationally coupled to the mount. As such, an illumination FoV of the light assemblies may be independently adjustable via an engagement between the light housings with the arms, and the arms with the mount. Wires, or other cables, may route through the arms, between the mount and the light housings, respectively, for communicatively coupling the light assemblies to the camera assembly. Additionally, the light assemblies may be communicatively coupled to PCBs within the mount (e.g., for receiving power).

In some instances, the light assemblies couple to the arms via a ratchet mechanism having teeth and a coupler. The teeth may be disposed on the arm, while the coupler may couple to the light housing. The coupler engages with the teeth. For example, the light housings may define a receptacle into which at least a portion of the arm is disposed, and within the light housing, the coupler may engage with the teeth. In some instances, the coupler includes a notch that engages with the teeth. The engagement between the notch and the teeth allows the light housing to be rotated for reorienting the light assemblies. During such occurrences, the notch may traverse over or along the teeth. As the notch traverses over the teeth, haptic feedback may be provided to the user.

In some instances, the mount may couple to the device to dispose the device on a vertical surface (e.g., wall). In some instances, the mount may couple to the camera housing. In some instances, the mount couples to a junction box, and receives power (or other cables) via the junction box. In some instances, the camera housing couples to the mount via a ball and socket joint. Such coupling allows the camera housing to pivot, rotate, and so forth for changing a FoV of the camera, the PIR sensor(s), and so forth. In some instances, the wires that provide power to the device may be routed at least partially through the ball and socket joint.

The device may also include heat dissipating elements to disperse heat generated by components of the device. By way of example and not limitation, the camera(s), LEDs, power supply, network interfaces, and so forth generate heat during use. Without effectively dispersing or dissipating this heat, the internal components, such as the camera, may be adversely effected and become uncappable of performing its intended function. To efficiently dissipate heat generated by the components, heat dissipating elements may be included within the camera housing and/or the light housings to transmit heat away from generating sources.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to examples of the present disclosure. In some instances, the device 100 may represent an electronic device, audio/video (A/V) device, and so forth configured to detect motion, capture audio and/or video, and/or illuminate an environment of the device 100.

In some instances, the device 100 includes a camera assembly 102, one or more light assemblies 104, such as a first light assembly 104(1) and a second light assembly 104(2), and/or a mount 106. The camera assembly 102 may include a button 108 that at least partially controls an operation of the device 100 (e.g., volume, sync, turn on/off, reset, etc.) and/or a camera 110 configured to capture image and/or video data within the environment. The camera assembly 102, as explained herein, may further include sensor(s) (e.g., passive infrared (PIR) sensor(s)) for detecting motion within the environment, sensor(s) (e.g., microphone(s)) capturing audio within the environment, components (e.g., speaker(s)) for outputting sound within the environment, sensor(s) (e.g., ambient light sensor(s)) for detecting lighting conditions within the environment, and so forth. Additionally, the camera assembly 102 may include computing components, such as network interfaces, for communicatively coupling the device 100 to one or more additional devices, as well as other computing components that enable operation of the device 100.

In some instances, the camera assembly 102 includes a front 112, a back 114 spaced apart from the front 112 (e.g., in the Z-direction), a top 116, a bottom 118 spaced apart from the top 116 (e.g., in the Y-direction), a first side 120, and a second side 122 spaced apart from the first side 120 (e.g., in the X-direction). In some instances, the camera assembly 102 includes a front cover 124, disposed at or along the front 112, and which couples to a housing 126. The camera 110 may be disposed at least partially through the front cover 124 (at the front 112), and the button 108 may be disposed at least partially through the housing 126 (at the top 116). The camera assembly 102 also includes a sensor lens 128, which in some instances, couples to the front cover 124. Sensor(s) may be disposed behind (e.g., Z-direction) the sensor lens 128 for sensing the environment. In some instances, the sensor(s) disposed beneath the sensor lens 128 are configured to detect motion within the environment, and in response, the camera 110 of the device 100 may capture and/or record image data/video data. The sensor lens 128 may be transmissive to IR light such that the motion sensor(s) are capable of receiving IR light via the sensor lens 128. Although not shown in FIG. 1, a rear cover may couple to the housing 126 at the back 114.

The light assemblies 104 may include lighting elements, such as light emitting diodes (LEDs), for illuminating at least a portion of the environment. For example, in response to detecting motion within the environment, the light assemblies 104 may be configured to output light to illuminate the environment. The camera assembly 102 on the light assemblies 104 may be communicatively coupled to one another (e.g., via wires). The lighting elements of the light assemblies 104 may be disposed beneath windows 130, such as a first window 130(1) of the first light assembly 104(1) and a second window 130(2) of the second light assembly 104(2), respectively. The light assemblies 104 may include light housings 132, such as a first light housing 132(1) and a second light housing 132(2). The first window 130(1) and the second window 130(2) may be respectively coupled to the first light housing 132(1) and the second light housing 132(2). As shown, and in some instances, the light assemblies 104 may be located vertically above the camera assembly 102.

The mount 106 may couple the device 100 to, or dispose the device 100 along, a surface (e.g., wall). For example, the mount 106 may be mounted to the surface such that the device 100 may hang from the surface. In some instances, the mount 106 may couple to a junction box, for example, to receive power and to route the power to components of the device 100. In some instances, the mount 106 may include an internal connection that couples the power to wires of the device 100. The mount 106 may also include computing components (e.g., capacitors, PCBs, etc.) for supplying power to the camera assembly 102 and the light assemblies 104.

Additionally, the camera assembly 102 and the light assemblies 104 may be pivotably coupled to the mount 106. Each of the camera assembly 102 and the light assemblies 104 may be independently oriented (or otherwise repositioned). For example, to adjust an illumination area, the first light assembly 104(1) and/or the second light assembly 104(2) may pivot, rotate, and so forth. Additionally, the camera assembly 102 may rotate to adjust FoV of the camera 110 and/or motion sensor(s). In some instances, the camera assembly 102 and the light assemblies 104 are rotatable about multiple axes. Details of the coupling between the camera assembly 102 and the light assemblies 104 are discussed herein, however, such couplings may represent ball and socket joints, swivel joints, knuckle joints, universal joints, revolute joints, and so forth. Moreover, the coupling between the camera assembly 102 and the light assemblies 104 may be secured to lock the camera assembly 102 and the light assemblies 104 in place to maintain their respective orientation.

Figure 2:
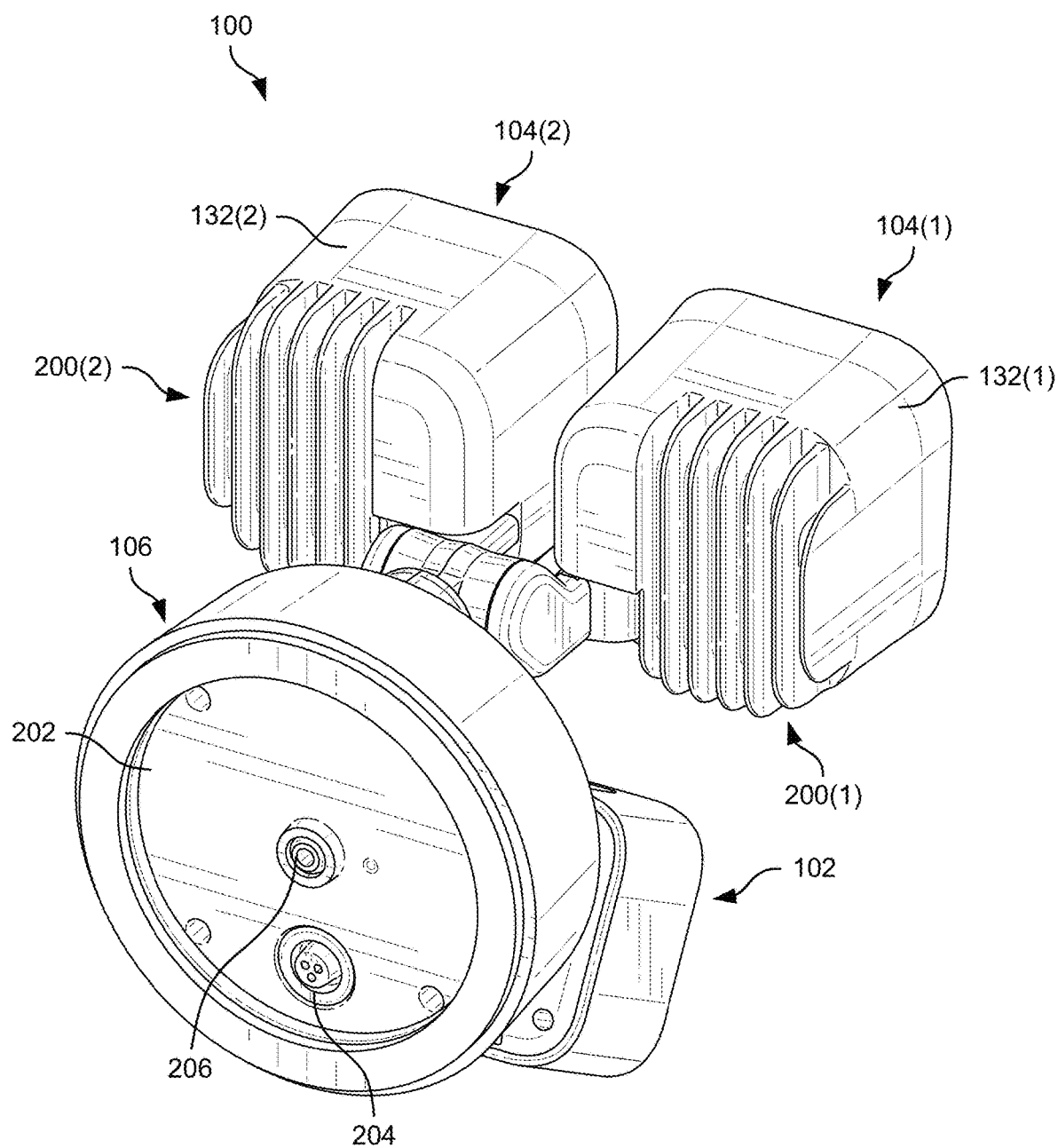
FIG. 2 illustrates a rear perspective view of the device of FIG. 1, according to an example of the present disclosure.
Figure 2:
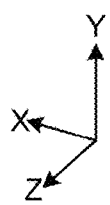

FIG. 2 illustrates a rear perspective view of the device 100, according to examples of the present disclosure. The camera assembly 102 and the light assemblies 104 are shown coupled to, or extending from, the mount 106. In some instances, the first light housing 132(1) includes first heat dissipating elements 200(1) (e.g., fins) and/or the second light housing 132(2) includes second heat dissipating elements 200(2) (e.g., fins) for dispersing heat generated by the lighting elements within the first light housing 132(1) and the second light housing 132(2), respectively. As shown, the first heat dissipating elements 200(1) and the second heat dissipating elements 200(2) may be disposed at a back of the first light housing 132(1) and the second light housing 132(2).

The mount 106 may include a rear surface 202 that is disposed against a wall, or other surface, to which the device 100 is configured to couple. The mount 106 may define a passageway 204 through which wires may route for providing power to the camera assembly 102 and the light assemblies 104. However, other wires, cables, and the like may route through the passageway 204 (e.g., Ethernet). Additionally, in some instances, the device 100 may be battery powered. The mount 106 may include other holes 206 disposed through the mount 106 and which may be used to secure the mount 106 to the surface. For example, fasteners may be disposed through the holes 206.

Figure 3:
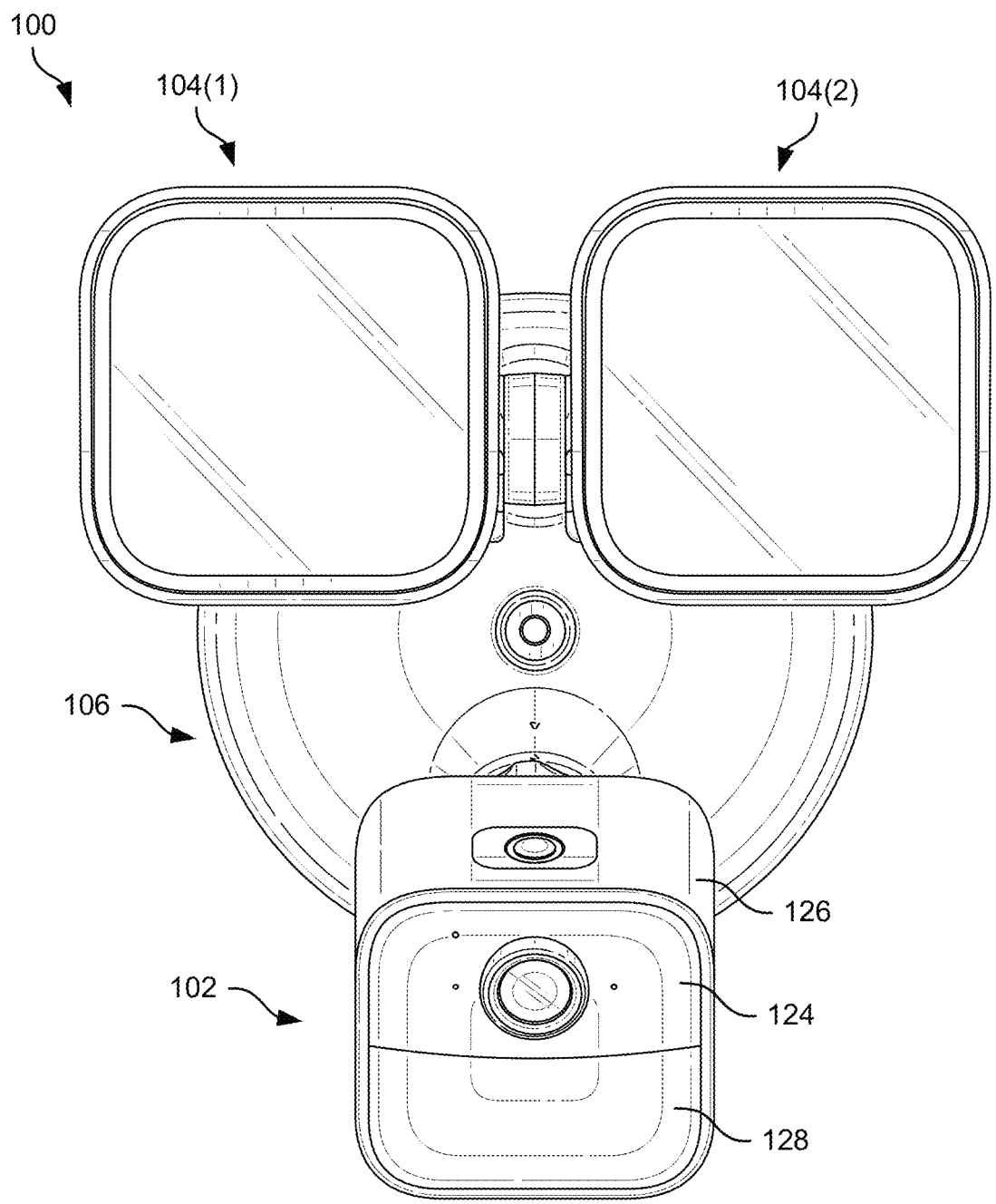
FIG. 3 illustrates a front view of the device of FIG. 1, according to an example of the present disclosure.

FIG. 3 illustrates a front view of the device 100, according to examples of the present disclosure. In some instances, given that the device 100 may be configured to mount to a surface, the camera assembly 102 may be generally oriented downwards towards a ground surface to permit the device 100 to sense motion within the environment. However, the camera assembly 102 may be pivotable about one or more axes (e.g., X-axis, Y-axis, and/or Z-axis) to adjust a FoV of the sensor(s), whether the camera 110, the motion sensor(s), and so forth. The camera assembly 102 further includes the housing 126, the front cover 124 coupled to the housing 126, and the sensor lens 128 coupled to the housing 126 and/or the front cover 124.

The light assemblies 104 reside vertically above the camera assembly 102. In some instances, the camera assembly 102 may be located centrally (e.g., in the X-direction) between the first light assembly 104(1) and the second light assembly 104(2). The light assemblies 104 may also be pivotable about one or more axes (e.g., X-axis, Y-axis, and/or Z-axis) to adjust a FoV of the lighting elements within the light assemblies 104, respectively.

In some instances, the camera assembly 102 and/or the light assemblies 104 may be substantially square shaped (e.g., in the X-Y plane). However, other shapes are envisioned, and the camera assembly 102 and/or the light assemblies 104 may be coupled or otherwise mounted to the mount 106 differently than shown.

Figure 4:
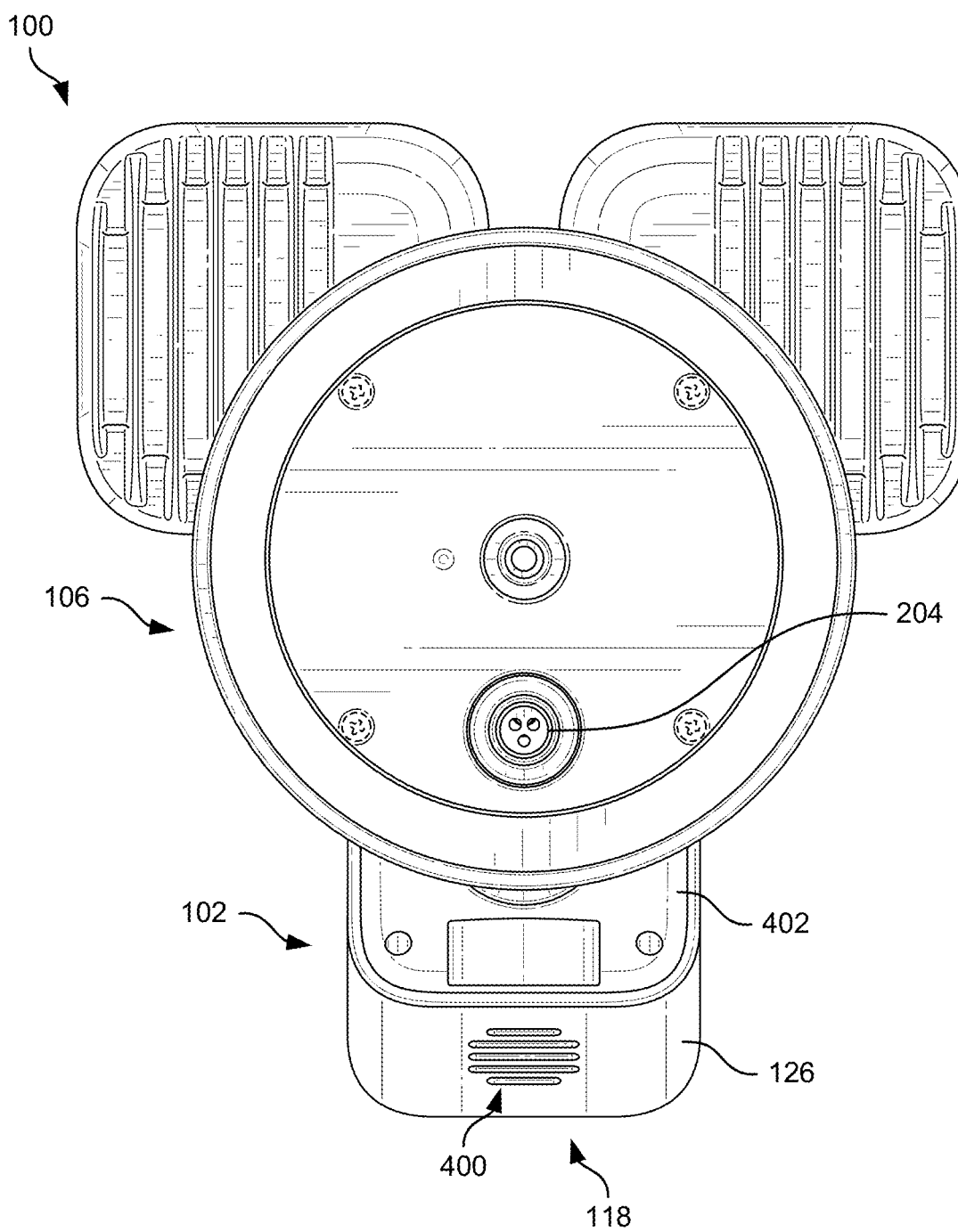
FIG. 4 illustrates a rear view of the device of FIG. 1, according to an example of the present disclosure.

FIG. 4 illustrates a rear view of the device 100, according to examples of the present disclosure. The mount 106 is configured to couple the device 100 to a surface, and wires are configured to extend through the passageway 204 for providing power, signals, or other data to the device 100.

The camera assembly 102 includes orifices 400 disposed along the bottom 118 of the housing 126. A speaker may reside beneath the orifices 400 (e.g., in the Y-direction) and may be oriented to emit sound towards the orifices 400. When the speaker outputs sound, the orifices 400 may output sound downward and outward from the device 100. Although the orifices 400 are shown being a certain size, shape, and number, the orifices 400 may be represented differently than shown. Additionally, the orifices 400 may be located on additional or alternative locations of the housing 126 (e.g., the first side 120). A rear cover 402 is further shown coupled to the back 114 of the housing 126. In some instances, the rear cover 402 may be omitted, and instead, the back 114 of the housing 126 may be enclosed.

Figure 5:
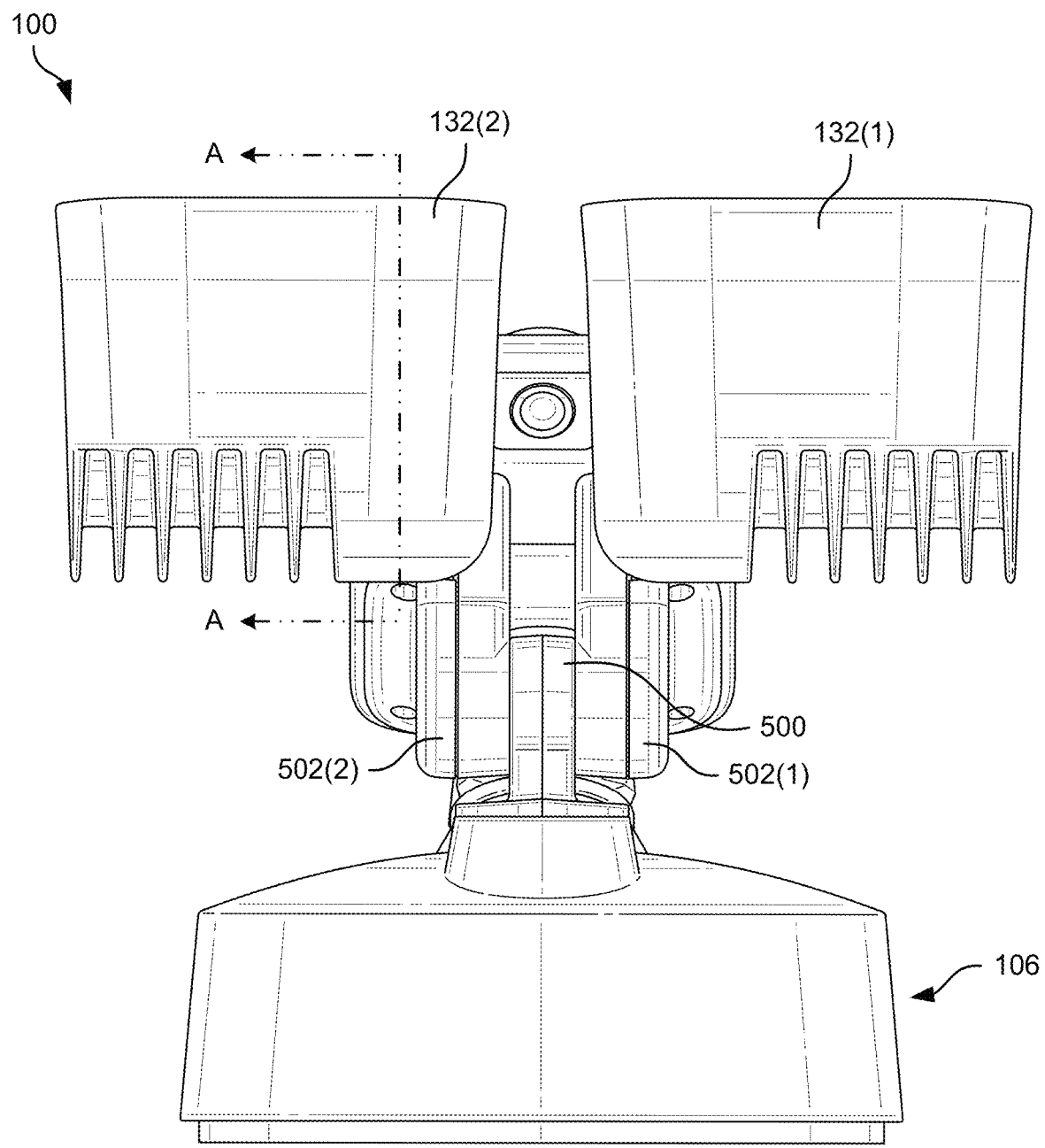
FIG. 5 illustrates a top view of the device of FIG. 1, according to an example of the present disclosure.

FIG. 5 illustrates a top view of the device 100, according to examples of the present disclosure. In some instances, the device 100 includes a bracket 500 that couples the first light housing 132(1) and the second light housing 132(2) to the mount 106. For example, a first arm 502(1) may couple to the first light housing 132(1) and the bracket 500, while a second arm 502(2) may couple to the second light housing 132(2) and the bracket 500. In some instances, the first arm 502(1) and the second arm 502(2) are rotationally coupled to the bracket 500 (e.g., rotatable about the X-axis) for adjusting an orientation of the first light housing 132(1) and the second light housing 132(2). Additionally, the first light housing 132(1) and the second light housing 132(2) may be rotationally coupled to the first arm 502(1) and the second arm 502(2) (e.g., about the Y-axis).

In some instances, the rotational coupling between the first arm 502(1) and the second arm 502(2) with the bracket 500 may vertically adjust the first light housing 132(1) and the second light housing 132(2), respectively, up and down. In some instances, the rotational coupling between the first light housing 132(1) and the first arm 502(1), as well as the second light housing 132(2) and the second arm 502(2), respectively, may horizontally adjust the first light housing 132(1) and the second light housing 132(2) side to side. In some instances, the bracket 500 may additionally or alternatively be rotationally coupled to the mount 106.

Figure 8:
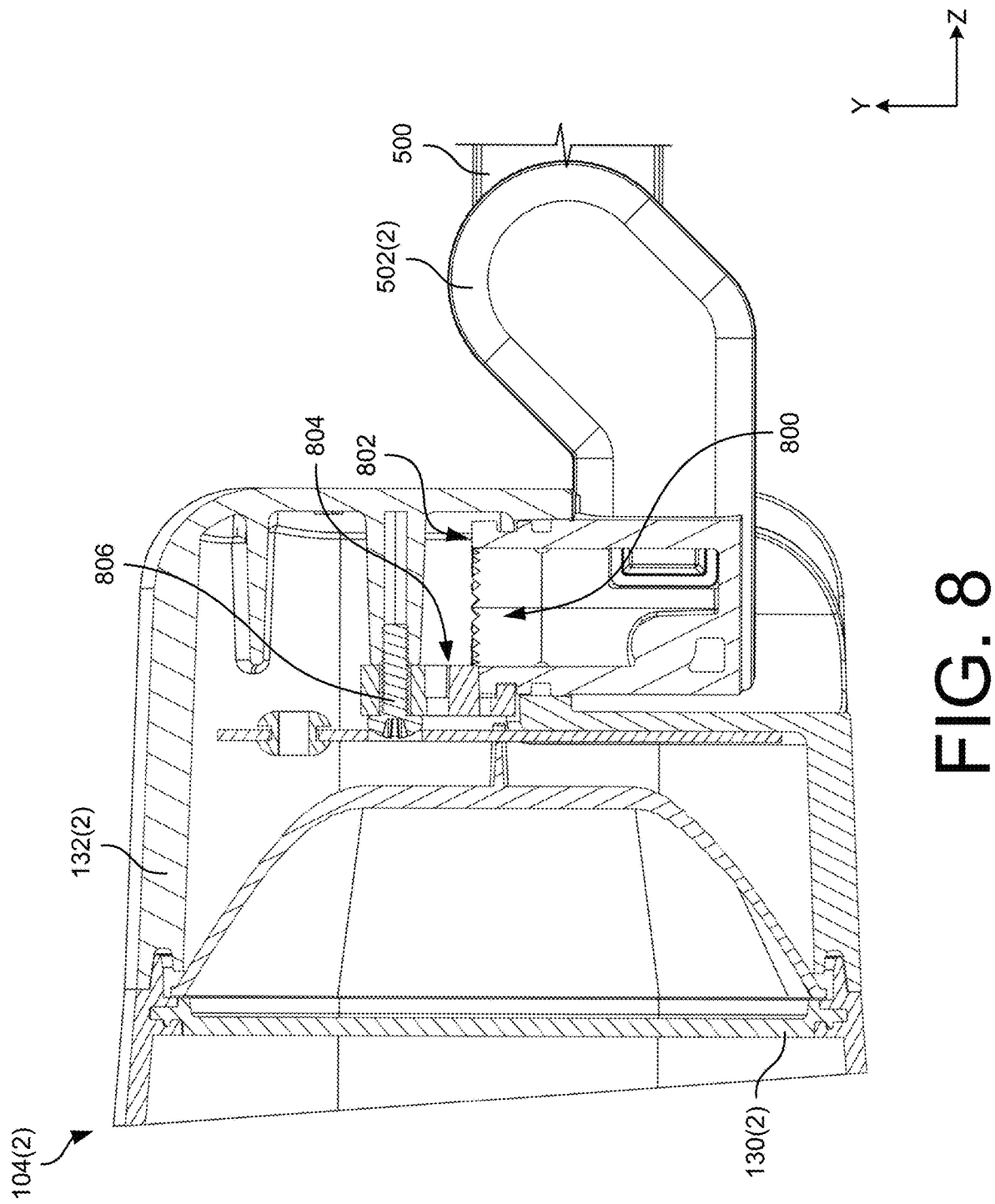
FIG. 8 illustrates a cross-sectional view of the device of FIG. 1, taken along line A-A of FIG. 5, according to an example of the present disclosure.

A line A-A is further shown extending through the second light housing 132(2), which is used to illustrate a cross-sectional view of the second light housing 132(2) in FIG. 8.

Figure 6:
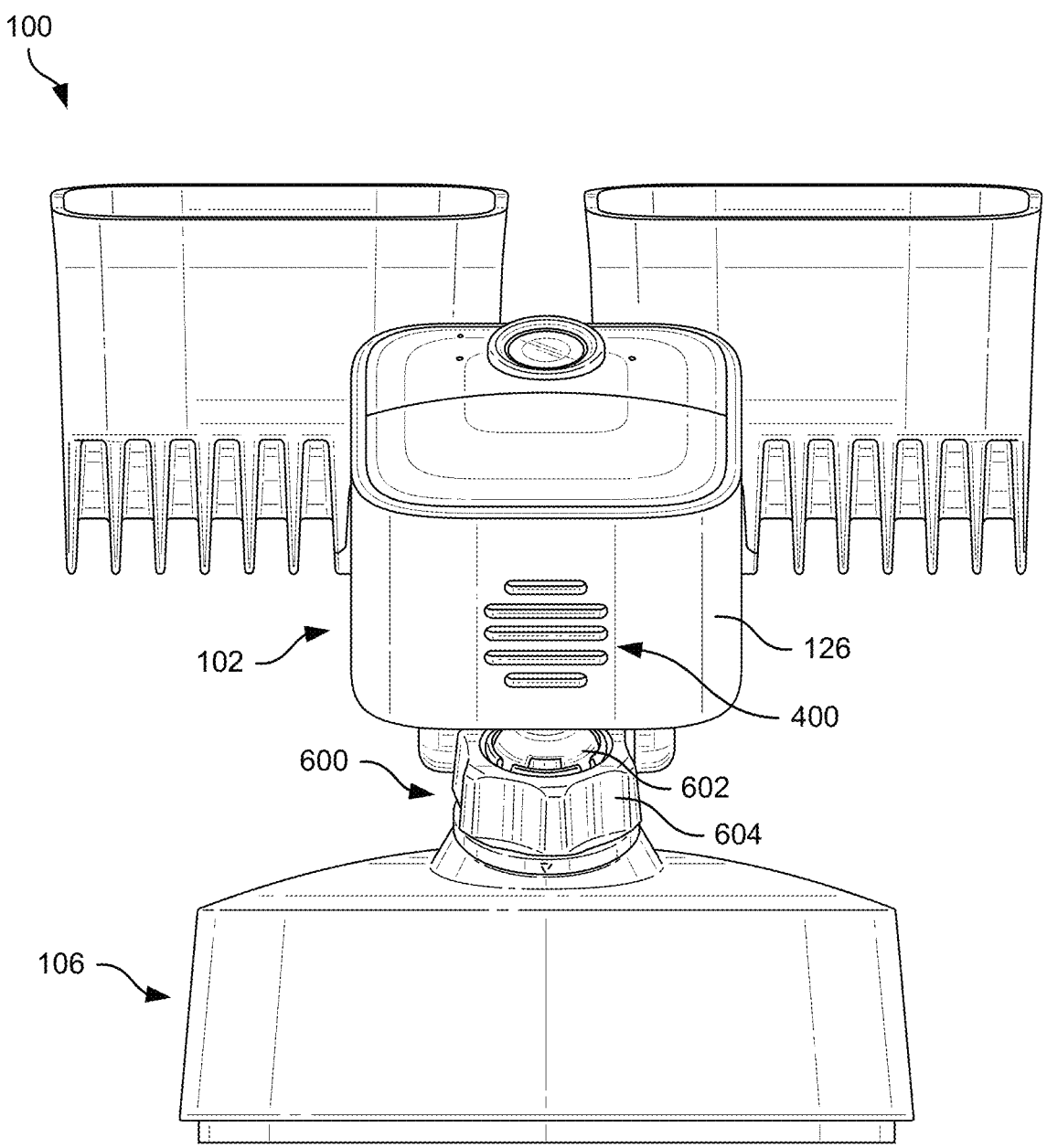
FIG. 6 illustrates a bottom view of the device of FIG. 1, according to an example of the present disclosure.

FIG. 6 illustrates a bottom view of the device 100, according to examples of the present disclosure. In some instances, the camera assembly 102 couples to the mount 106 via a ball and socket joint 600. In some instances, the ball and socket joint 600 includes a ball 602 extending from the housing 126 (or the rear cover 402) that is received within a socket 604 disposed on the mount 106. The socket 604 may be configured to tighten and loosen around the ball 602 to permit the housing 126 to be reoriented. The housing 126 is further shown including the orifices 400 for outputting sound from the speaker.

Figure 7A:
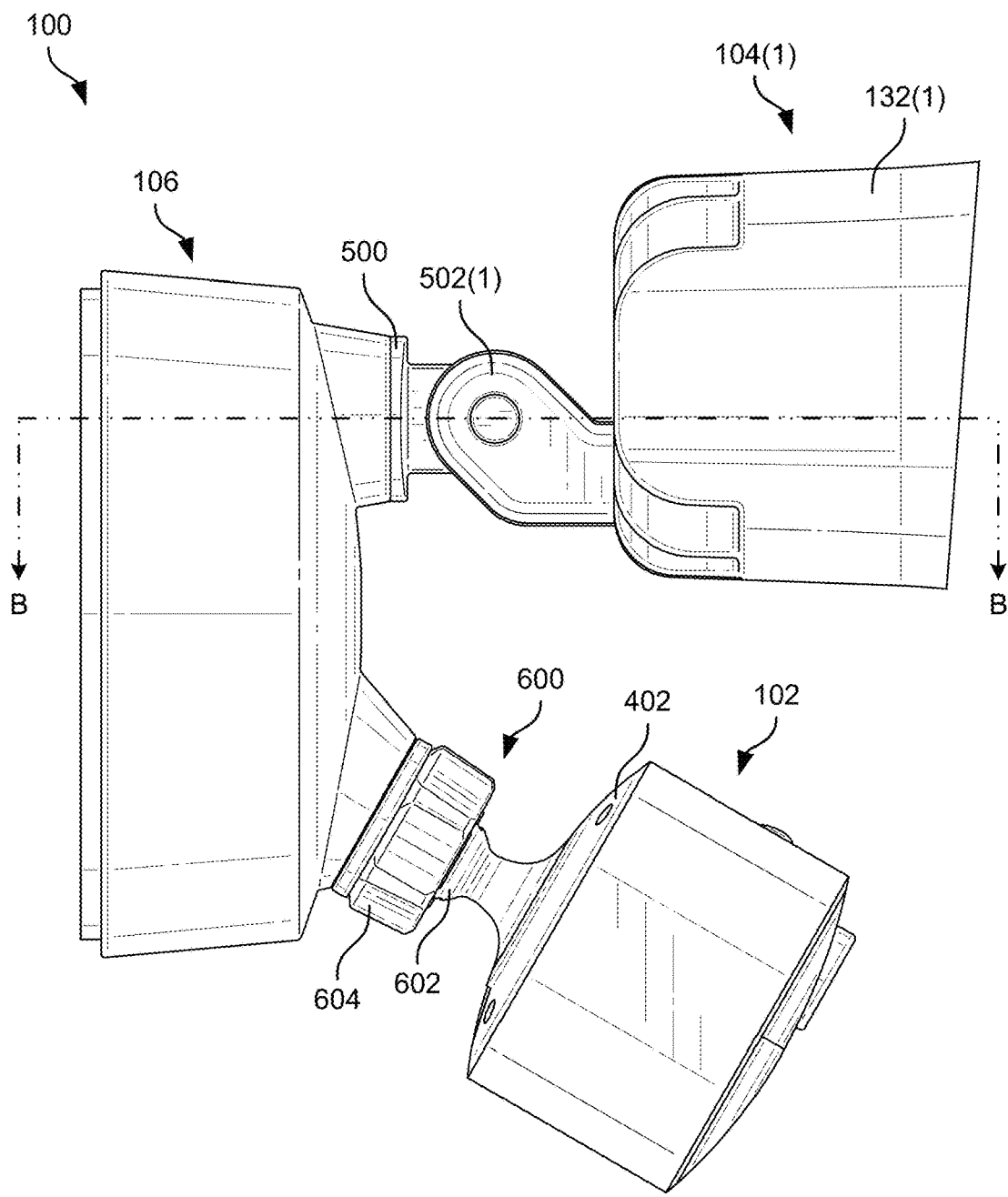
FIG. 7A illustrates a first side view of the device of FIG. 1, according to an example of the present disclosure.
Figure 7B:
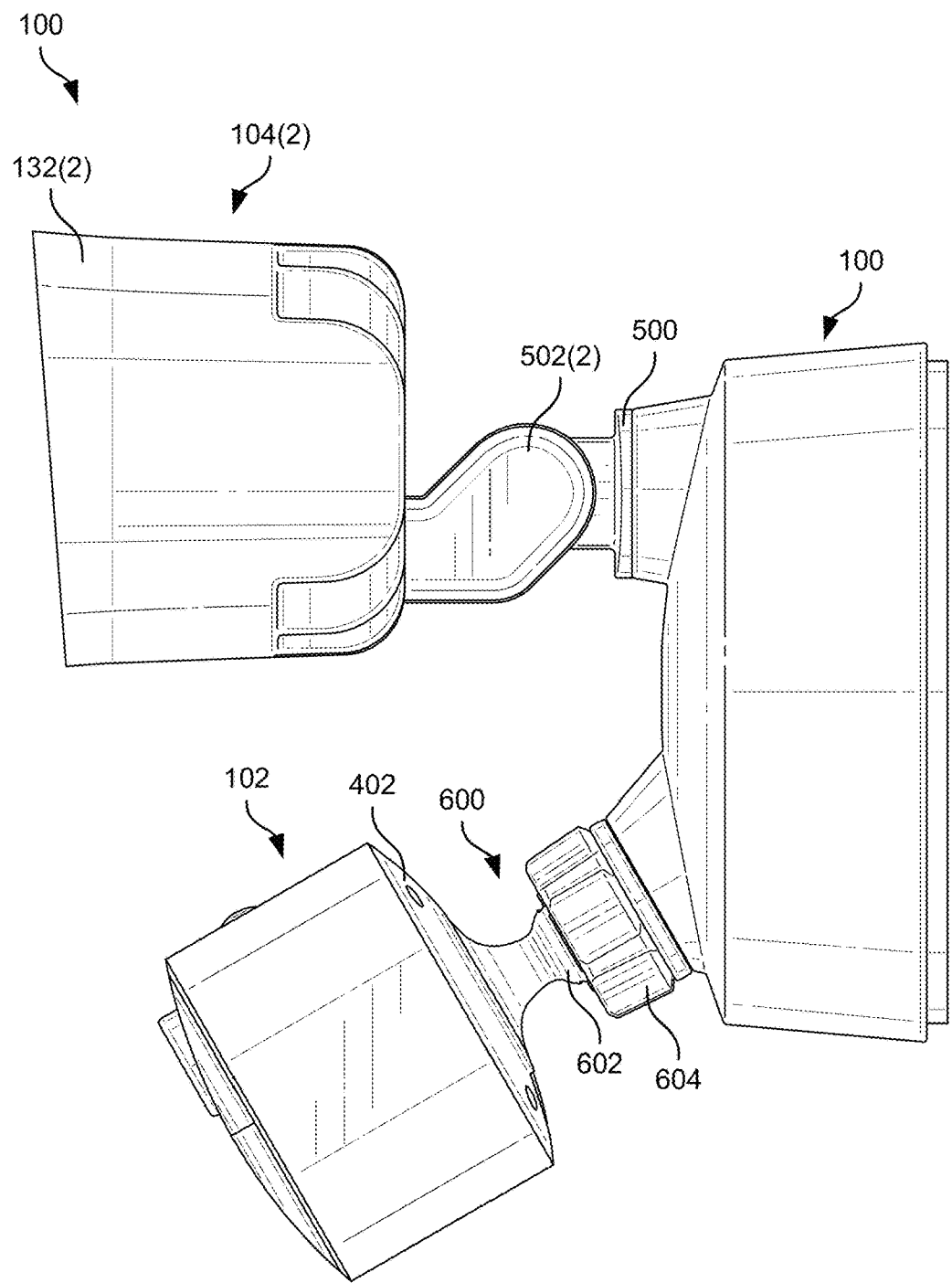
FIG. 7B illustrates a second side view of the device of FIG. 1, according to an example of the present disclosure.

FIGS. 7A and 7B illustrate side views of the device 100, according to examples of the present disclosure. FIG. 7A illustrates a view of the first side 120 of the device 100, while FIG. 7B illustrates a view of the second side 122 of the device 100.

The first light housing 132(1) couples to the bracket 500 via the first arm 502(1) (as shown in FIG. 7A), and the second light housing 132(2) couples to the bracket 500 via the second arm 502(2) (as shown in FIG. 7B). The bracket 500 is received by, or coupled to, the mount 106. Additionally, the camera assembly 102 couples to the mount 106 via the ball and socket joint 600. In some instances, the ball 602 of the camera assembly 102 extends from the rear cover 402, and the socket 604 extends from the mount 106. The socket 604 is accordingly sized and shaped to receive the ball 602.

In some instances, the first light assembly 104(1), the second light assembly 104(2), and the camera assembly 102 each have a degree of movement without contacting one another. For example, the first light assembly 104(1) may be rotated downward, from the position shown in FIG. 7A, without making contact with the camera assembly 102 (whether the camera assembly 102 is rotated upwards or not from the position of the camera assembly 102 shown in FIG. 7A).

Figure 17:
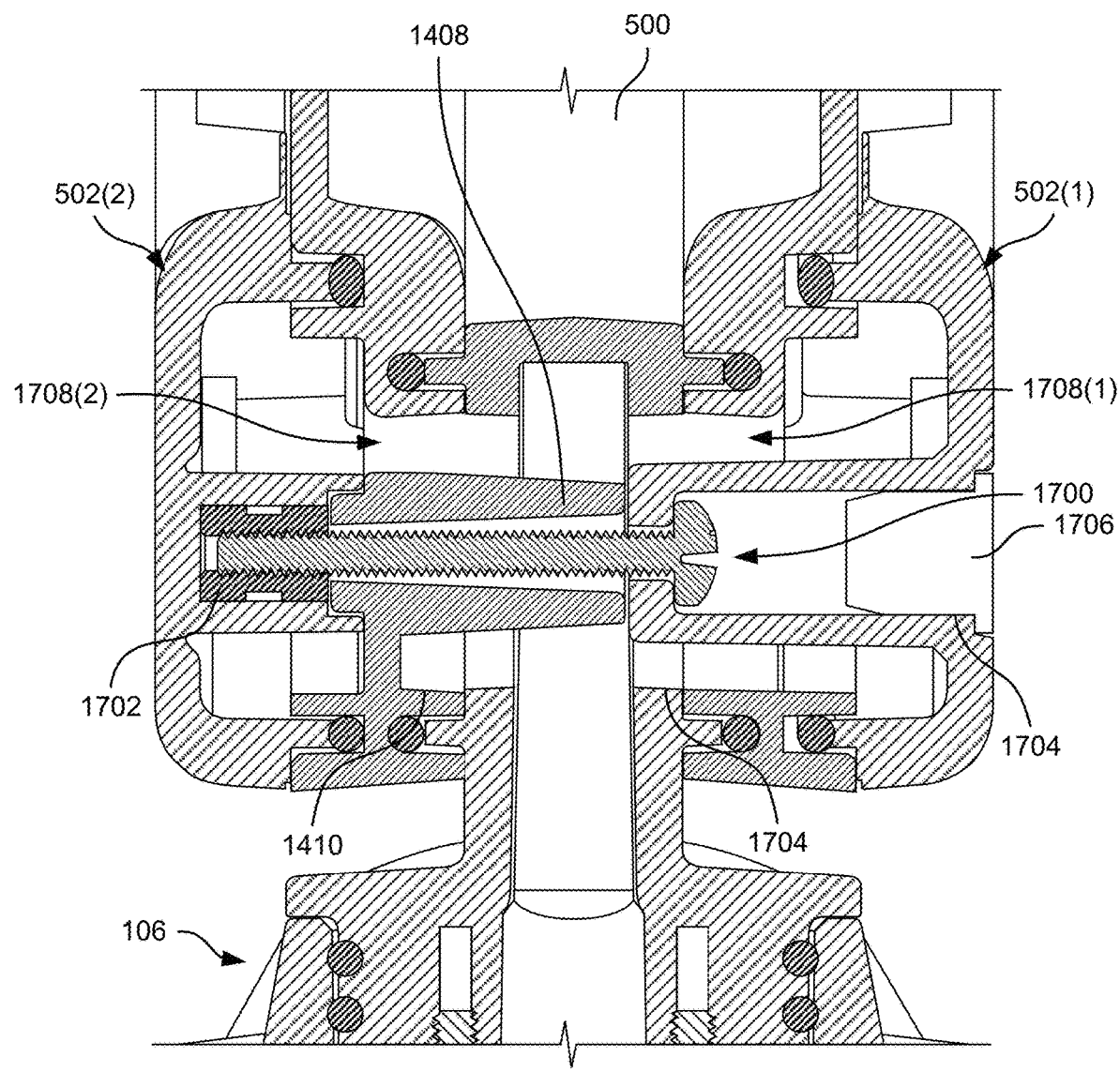
FIG. 17 illustrates a cross-sectional view taken along line B-B of FIG. 7A, showing an example engagement between the arm of FIGS. 14A and 14B within the bracket of FIG. 16, according to an example of the present disclosure.

A line B-B is further shown in FIG. 7A, which is used to illustrates a cross-sectional view of the device in FIG. 17.

FIG. 8 illustrates a cross-sectional view of the second light assembly 104(2), taken along line A-A of FIG. 5, according to examples of the present disclosure. Although the discussion of FIG. 8 relates to the second light assembly 104(2), it is to be understood that the first light assembly 104(1) may include similar components, and function similar to the second light assembly 104(2).

The second light assembly 104(2) includes the second light housing 132(2) and the second window 130(2). Lighting elements are disposed within the second light housing 132(2), beneath the second window 130(2), and are configured to emit light through the second window 130(2). The second arm 502(2) couples to the bracket 500 for adjusting an orientation of the second arm 502(2). Additionally, the second arm 502(2) couples to the second light housing 132(2) (or more generally, the second light assembly 104 (2)). As will be discussed herein, the second light assembly 104(2) and the second arm 502(2) may be adjoined via a ratchet mechanism 800. The ratchet mechanism 800 may include teeth 802 disposed on the second arm 502(2), and which engage with a coupler 804 disposed in the second light housing 132(2). For example, the teeth 802 (or other serrations) may be engaged by the coupler 804. The second light housing 132(2) may rotate (e.g., about the Y-axis), and during which, the coupler 804 may drive along the teeth 802. The engagement between the coupler 804 and the teeth 802 may secure the second light housing 132(2) in place, however, upon application of a sufficient amount of force, the coupler 804 may engage with different teeth 802 during reorientation of the second light housing 132(2). A fastener 806 may secure the coupler 804 to the second light housing 132(2).

Figure 9:
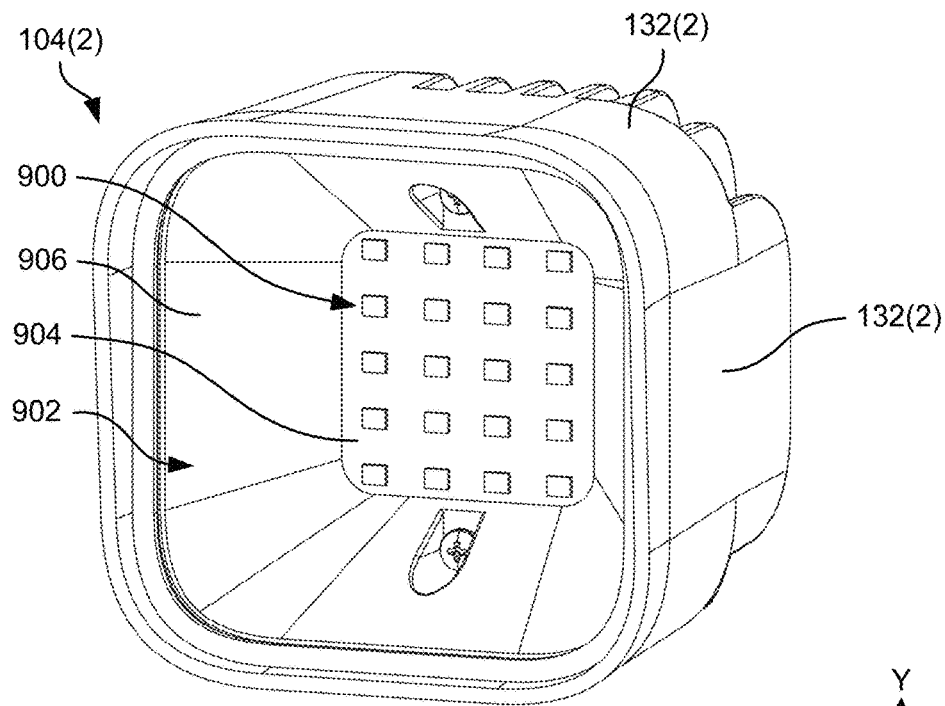
FIG. 9 illustrates example lighting elements disposed within an example light assembly of the device of FIG. 1, according to an example of the present disclosure.

FIG. 9 illustrates an interior view of the second light assembly 104(2), according to examples of the present disclosure. Although the discussion of FIG. 9 relates to the second light assembly 104(2), it is to be understood that the first light assembly 104(1) may include similar components, and function similar to the second light assembly 104(2).

In FIG. 9, the second window 130(2) is shown removed from the second light housing 132(2). Lighting elements 900 are disposed beneath the second window 130(2), within a cavity 902 of the second light housing 132(2). In some instances, the lighting elements 900 are disposed on an LED PCB 904. The second light assembly 104(2) may include any number of the lighting elements 900, which in some instances, may be arranged in a grid-like fashion. However, the lighting elements 900 may be arranged differently than shown, and/or more than or less than the number of the lighting elements 900 as shown may be included. In some instances, the lighting elements 900 may represent LEDs, OLEDs, and so forth. The second light assembly 104(2) may also include a reflector 906 that directs light emitted from the lighting elements 900 out the second window 130(2).

Figure 10:
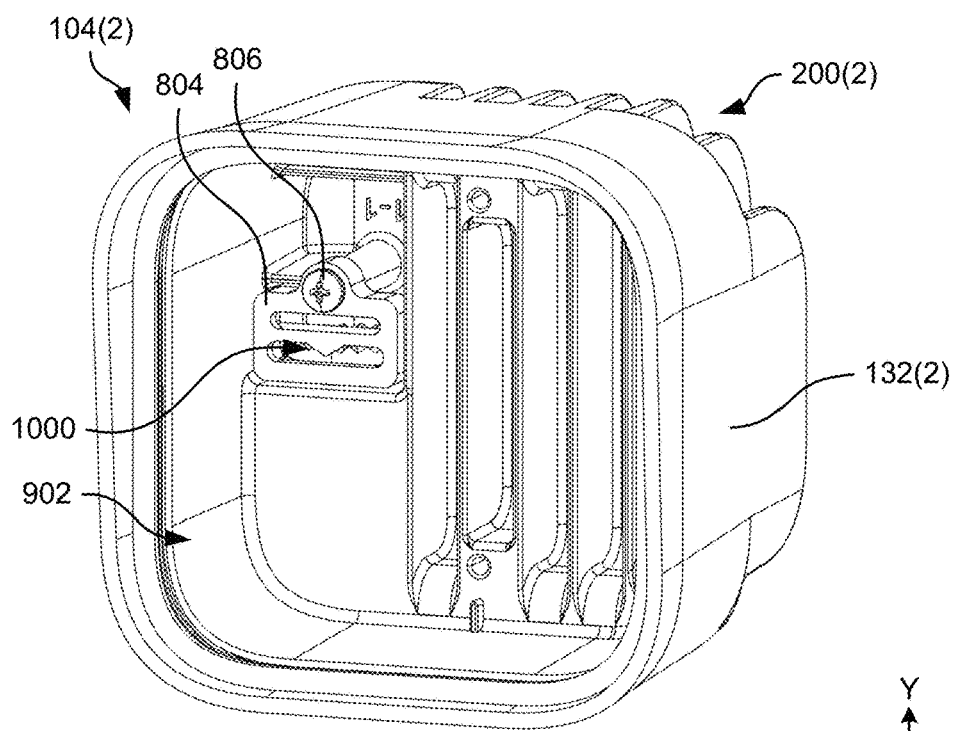
FIG. 10 illustrates an example coupler of a ratchet mechanism disposed within the light assembly of FIG. 9, according to an example of the present disclosure.

FIG. 10 illustrates an interior view of the second light assembly 104(2), according to examples of the present disclosure. Although the discussion of FIG. 10 relates to the second light assembly 104(2), it is to be understood that the first light assembly 104(1) may include similar components, and function similar to the second light assembly 104(2).

In FIG. 10, the second window 130(2), the lighting elements 900, and the reflector 906 are shown removed from the second light housing 132(2). Removing the lighting elements 900 and the reflector 906 exposes the coupler 804 that engages with the teeth 802 disposed on an end of the second arm 502(2). The coupler 804 couples to the second light housing 132(2) via the fastener 806. The coupler 804 includes a notch 1000 (e.g., tooth) that engages with the teeth 802. As the second light housing 132(2) is rotated, the notch 1000 may be driven over and along the teeth 802. In some instances, within the cavity 902, the coupler 804 may reside beside the second heat dissipating elements 200(2).

Figure 11:
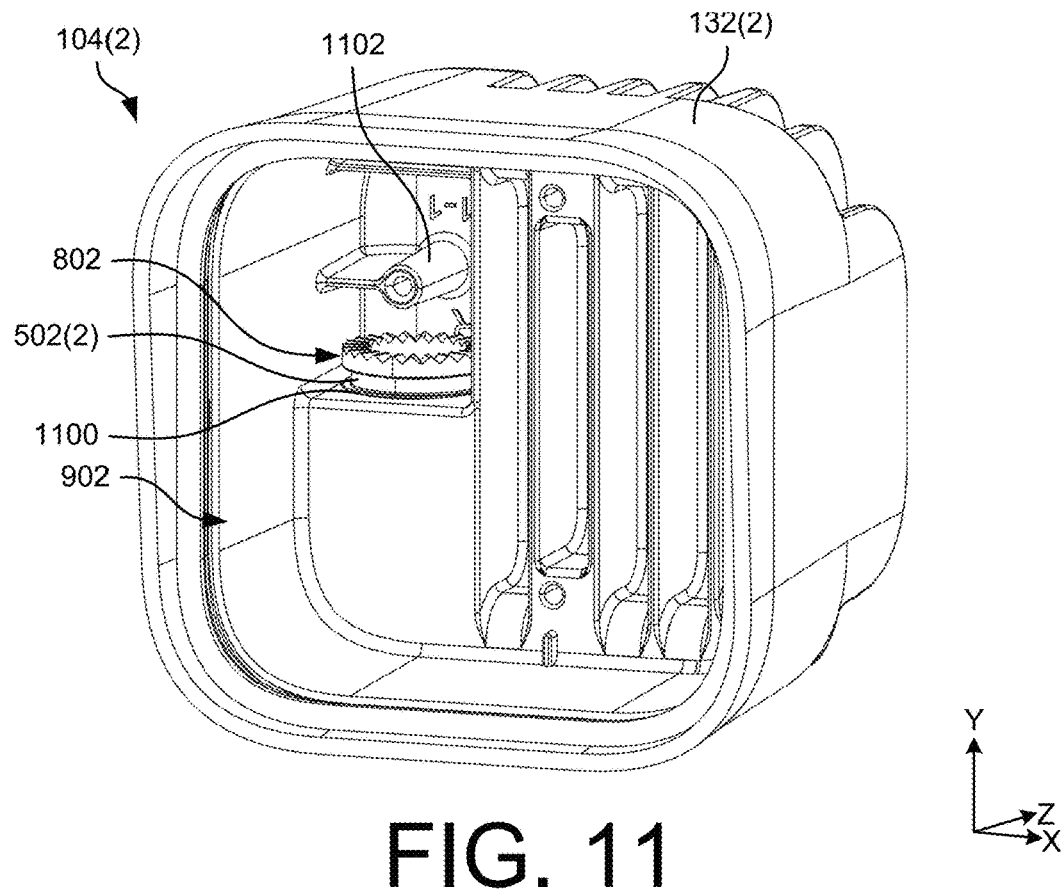
FIG. 11 illustrates example teeth of the ratchet mechanism disposed within the light assembly of FIG. 9, and which engages with the coupler of FIG. 10, according to an example of the present disclosure.

FIG. 11 illustrates an interior view of the second light assembly 104(2), according to examples of the present disclosure. Although the discussion of FIG. 11 relates to the second light assembly 104(2), it is to be understood that the first light assembly 104(1) may include similar components, and function similar to the second light assembly 104(2).

In FIG. 11, the second window 130(2), the lighting elements 900, the reflector 906, and the coupler 804 are shown removed from the second light housing 132(2). Removing the coupler 804 exposes the teeth 802 of the ratchet mechanism 800 that engage with the coupler 804, and more specifically, the notch 1000 of the coupler 804. For example, the teeth 802 may annularly extend around a perimeter of an end of the second arm 502(2). The end of the second arm 502(2) may be coupled with, or disposed within, a receptacle 1100 defined by the second light housing 132(2). In doing so, as the second light housing 132(2) rotates (e.g., about the Y-axis), the notch 1000 may be driven along the teeth 802. Although the teeth 802 are shown extending completely around the perimeter of the end of the second arm 502(2), in some instances, the teeth 802 may extend around a portion of the perimeter. The second light housing 132 further defines a slot 1102 for receiving the fastener 806.

Figure 12:
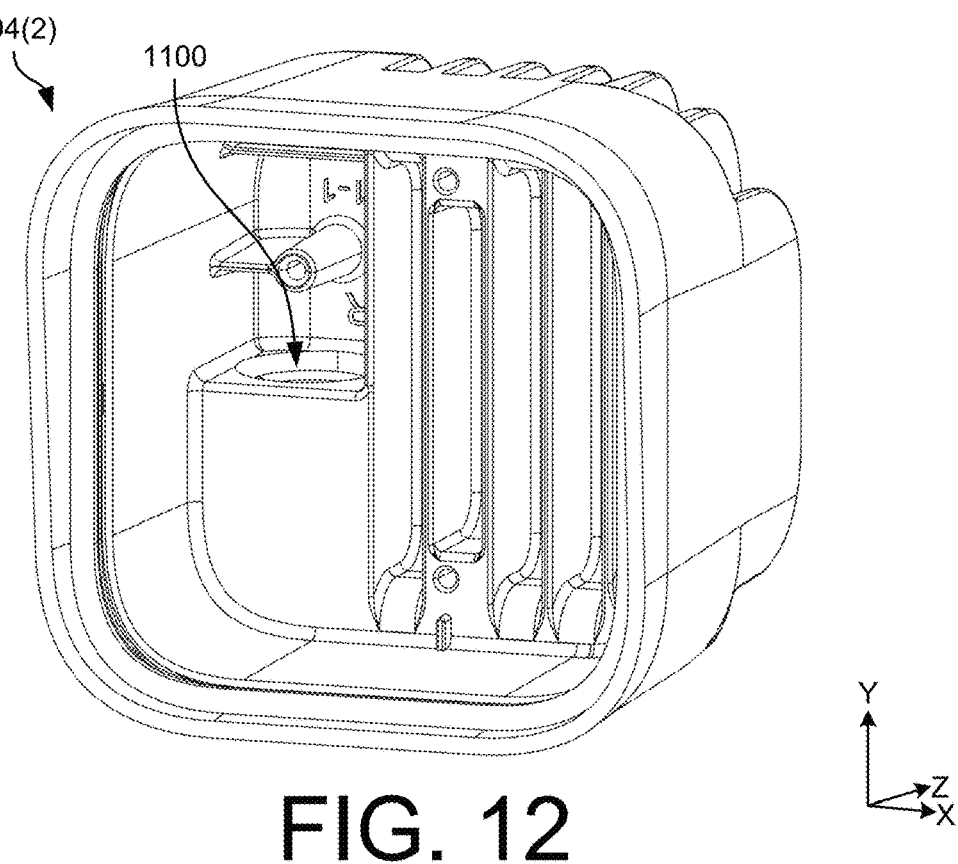
FIG. 12 illustrates an example receptacle of the light assembly of FIG. 9 that receives at least a portion of the ratchet mechanism of FIG. 11, according to an example of the present disclosure.

FIG. 12 illustrates an interior view of the second light assembly 104(2), according to examples of the present disclosure. Although the discussion of FIG. 12 relates to the second light assembly 104(2), it is to be understood that the first light assembly 104(1) may include similar components, and function similar to the second light assembly 104(2).

In FIG. 12, the second window 130(2), the lighting elements 900, the reflector 906, and the ratchet mechanism 800 (e.g., the coupler 804 and the teeth 802) are shown removed from the second light housing 132(2). Removing the ratchet mechanism 800 exposes the receptacle 1100 of the second light housing 132(2). When coupled to the second light housing 132(2), a portion of the second arm 502(2) may be at least partially disposed with the receptacle 1100.

Figure 13A:
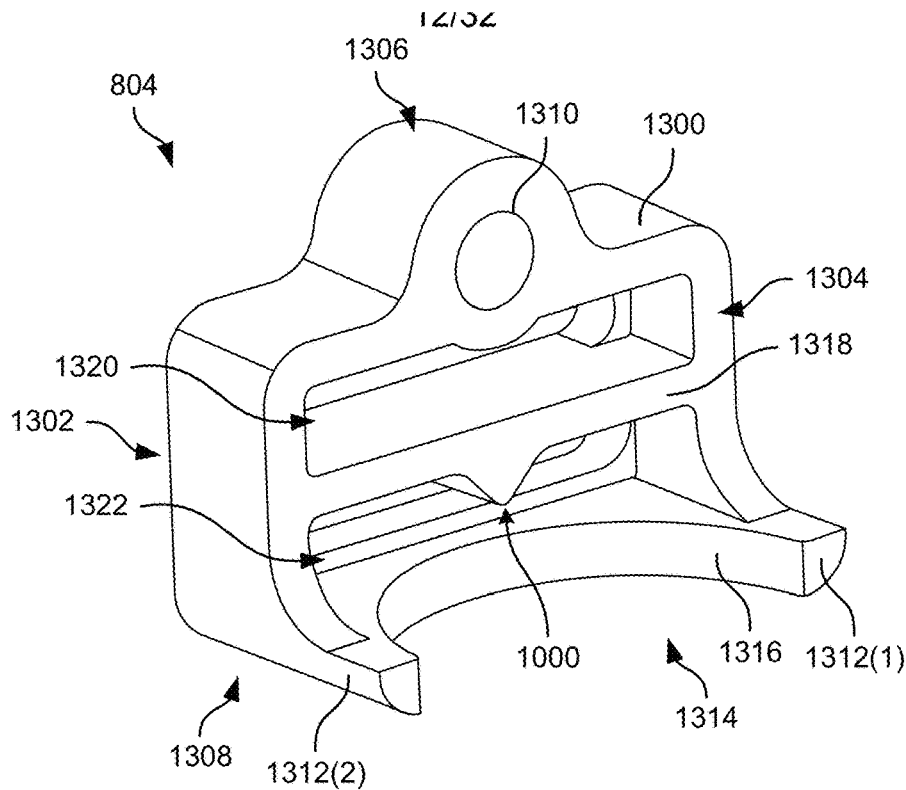
FIG. 13A illustrates a perspective view of the example coupler of FIG. 10, according to an example of the present disclosure.
Figure 13B:
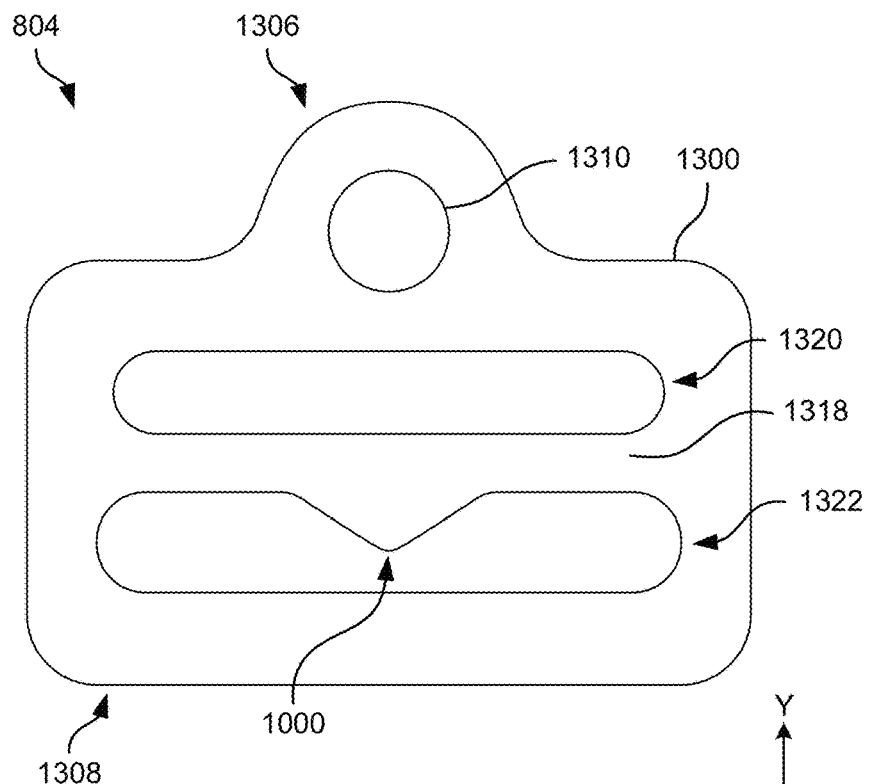
FIG. 13B illustrates a planar view of the example coupler of FIG. 10, according to an example of the present disclosure.

FIGS. 13A and 13B illustrate the coupler 804, according to examples of the present disclosure. In some instances, FIG. 13A illustrates a perspective view of the coupler 804, and FIG. 13A illustrates a front view of the coupler 804.

In some instances, the coupler 804 includes a body 1300 having a front 1302 and a back 1304 spaced apart from the front 1302 (e.g., in the Z-direction). The body 1300 may also include a top 1306 and a bottom 1308 spaced apart from the top 1306 (e.g., in the Y-direction). The body 1300 defines a channel 1310 through which the fastener 806 is disposed for coupling the coupler 804 to the second light housing 132(2). As shown, the channel 1310 may extend through the body 1300 proximate to the top 1306. The body 1300 also includes a first wing 1312(1) and a second wing 1312(2) that define a slot 1314 for receiving an end of the second arm 502(2) having the teeth 802. As shown, the first wing 1312(1) and the second wing 1312(2) may represent prongs, arms, or branches that extend from the body 1300. The first wing 1312(1) and the second wing 1312(2) may engage along sides (e.g., sidewalls) of the second arm 502(2) to retrain the second arm 502(2) within the receptacle 1100 and the engage the notch 1000 of the coupler 804 with the teeth 802. For example, a sidewall 1316 (or surface) of the slot 1314 may engage with an exterior surface of the second arm 502(2). As shown, the slot 1314 may be half-circular shaped to correspond to a profile of the second arm 502(2).

The body 1300 includes a crosspiece 1318 having the notch 1000. The crosspiece 1318 may be capable of deflecting (e.g., in the Y-direction) as the notch 1000 traverse along the teeth 802. For example, the body 1300 may include a first cavity 1320 disposed vertically above the crosspiece 1318, and a second cavity 1322 disposed vertically below the crosspiece 1318. The first cavity 1320 and the second cavity 1322 permit the crosspiece 1318 to deflect as the notch 1000 traverses along the teeth 802. For example, when traversing along the teeth 802 (e.g., at a peak between adjacent teeth of the teeth 802), the crosspiece 1318 may deflect in an upward manner, into the first cavity 1320, and then may transition back once the notch 1000 resides between adjacent teeth 802 (e.g., a valley between the teeth 802). As the notch 1000 traverses over the teeth 802 a user of the device 100 may be provided with tactile feedback. In some instances, the notch 1000 is aligned with the channel 1310. The notch 1000 and the channel 1310 may also be centrally located between sides of the coupler 804.

Figure 14A:
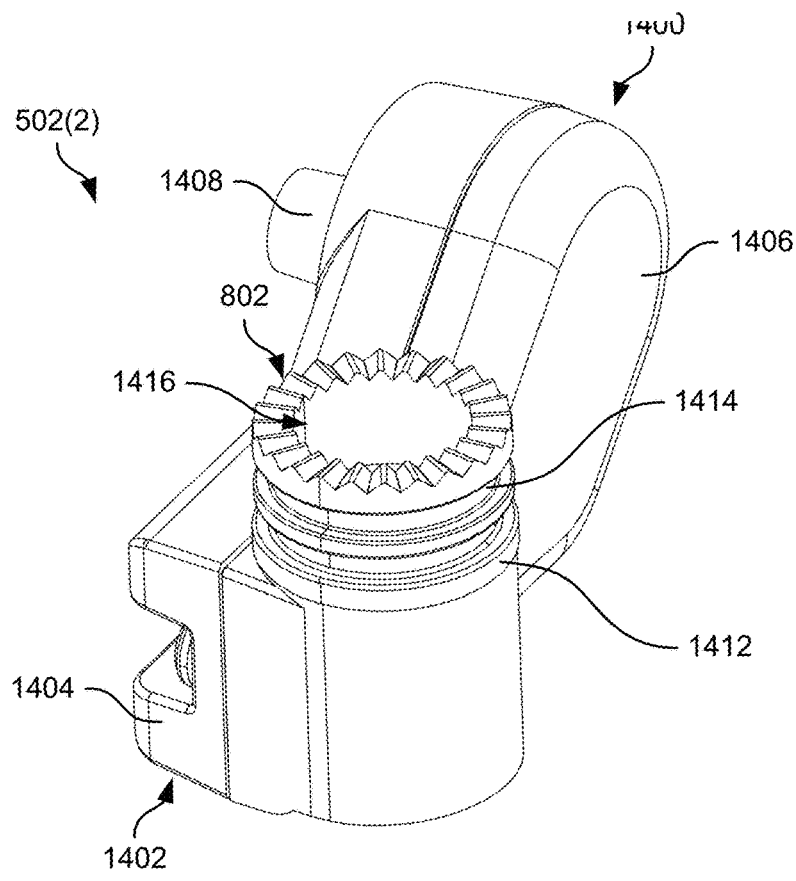
FIG. 14A illustrates a first perspective view of an example arm of the device of FIG. 1, according to an example of the present disclosure.
Figure 14B:
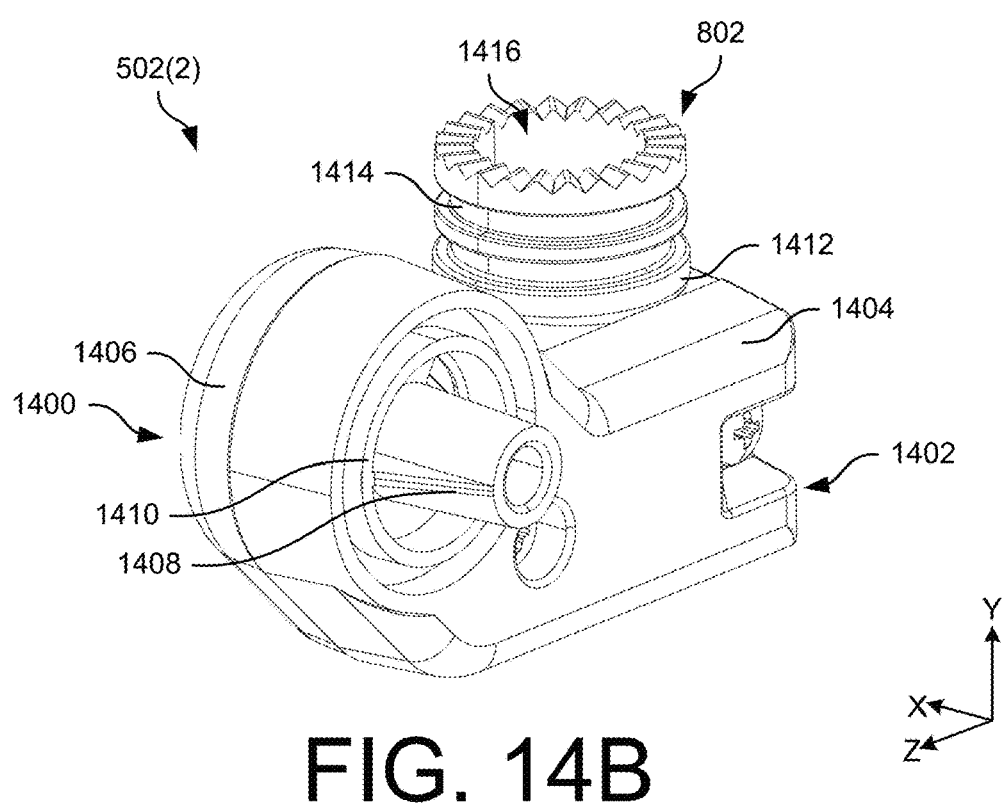
FIG. 14B illustrates a second perspective view of an example arm of the device of FIG. 1, according to an example of the present disclosure.

FIGS. 14A and 14B illustrate perspective views of the second arm 502(2), according to examples of the present disclosure. Although the discussion of FIGS. 14A and 14B relates to the second arm 502(2), it is to be understood that the first arm 502(1) may include similar components, and function similar to the second arm 502(2).

In some instances, the second arm 502(2) includes a first end 1400 that couples to the bracket 500 and a second end 1402 that couples to the second light housing 132(2). In some instances, the second arm 502(2) may include a first segment 1404 and a second segment 1406 coupled to the first segment 1404, vice versa. In some instances, the first segment 1404 forms a first side or first half of the second arm 502(2), while the second segment 1406 may form a second side or second half of the second arm 502(2). The first segment 1404 and the second segment 1406 may couple together via snap-fit connections, pressure fit connections, and/or fastener(s).

The first segment 1404 may include a post 1408 into which a fastener that is used to secure the first arm 502(1) and the second arm 502(2) to the bracket 500 is disposed. For example, the fastener may be threaded into the an opening of the post 1408. As shown, the post 1408 may be disposed proximate to the first end 1400 of the second arm 502(2). Additionally, the first segment 1404 may include a collar 1410 that engages with and/or resides within a channel of the bracket 500. The collar 1410 may be annularly disposed around the post 1408.

The second segment 1406 may include the teeth 802 that engage with the notch 1000 of the coupler 804. Collectively, the coupler 804 and the teeth 802 may represent the ratchet mechanism 800 that couples the second light assembly 104(2) to the second arm 502(2) and the mount 106. In some instances, the second end 1402 of the second arm 502(2) includes a post, pillar, or column 1412 that extends from, or represents a portion of, the second arm 502(2). In some instances, the column 1412 is substantially cylindrically shaped for residing within the receptacle 1100 of the second light housing 132(2). The teeth 802 are disposed on an end, or are form within the end, of the column 1412. Additionally, the column 1412 may define a groove 1414. The groove 1414 may be sized to receive the first wing 1312(1) and the second wing 1312(2) of the coupler 804. For example, the sidewall 1316 of the slot 1314 may engage with the column 1412, within the groove 1414. In some instances, the engagement between the first wing 1312(1) and the second wing 1312(2) with the groove 1414 may prevent the second light assembly 104(2) separating (e.g., being pulled apart) from the second arm 502(2).

The second arm 502(2) defines a cavity 1416 through which wires or other cables are routed into the second light housing 132(2). As shown, the teeth 802 are radially disposed around the cavity 1416. The wires or other cables may be routed into the second arm 502(2) at the first end 1400, and through an interior of second arm 502(2) formed by the first segment 1404 and the second segment 1406. Therein, the wires or other cables may exit the cavity 1416 at the second end 1402, and into the second light housing 132(2). In turn, the wires or other cables may be coupled to the LED PCB 904. Such coupling, for example, may provide power to the lighting elements 900, as well as signals that control an operation of the light elements 900 (e.g., turn on in response to motion being detected).

Figure 15:
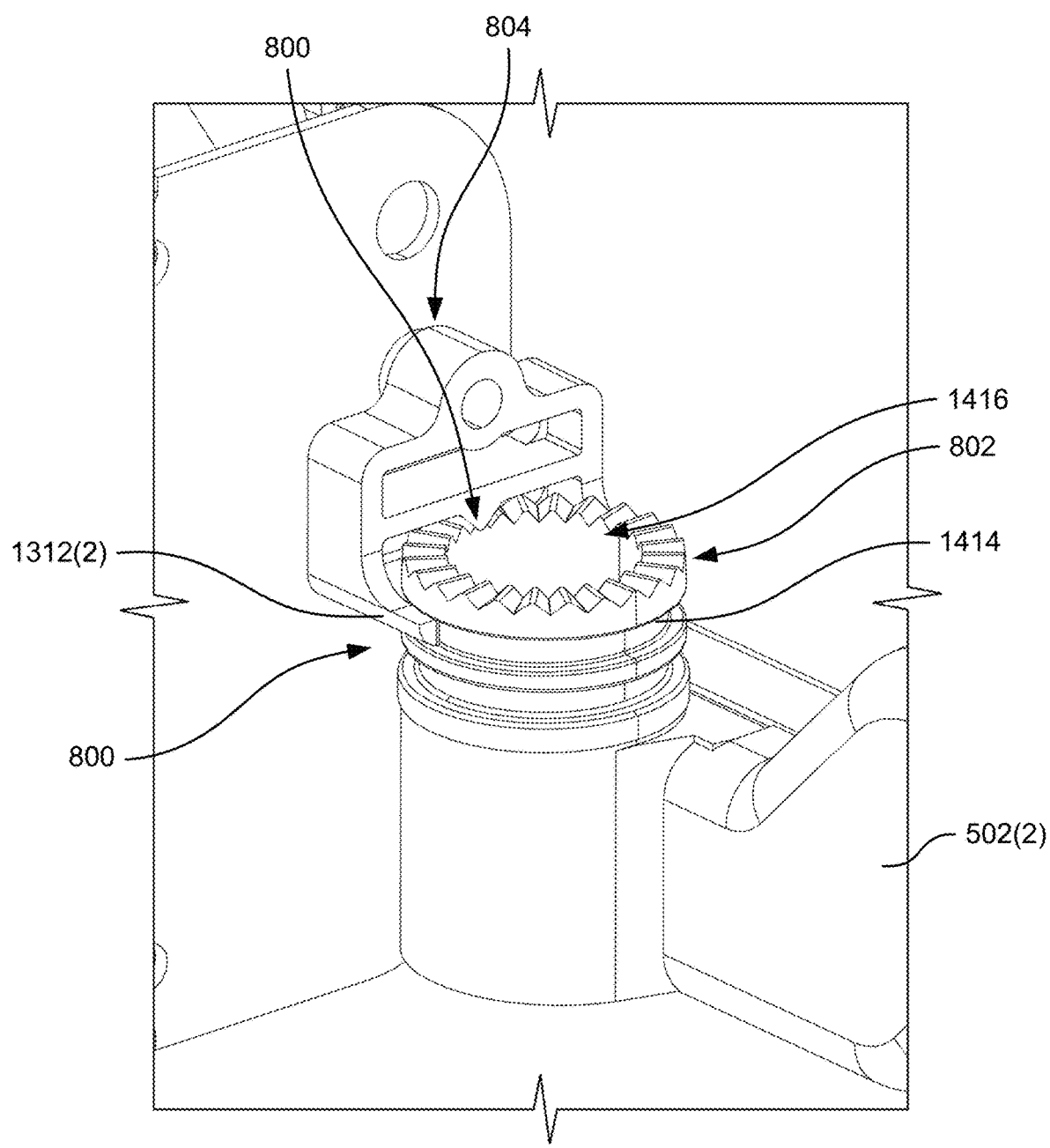
FIG. 15 illustrates an example engagement between the coupler of FIG. 10 and the teeth of FIG. 11, according to an example of the present disclosure.
Figure 15:
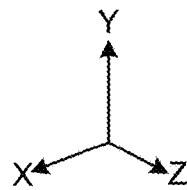

FIG. 15 illustrates an engagement between the coupler 804 and the teeth 802 of the ratchet mechanism 800, according to examples of the present disclosure. Although the discussion of FIG. 15 relates to the second arm 502(2), it is to be understood that the first arm 502(1) may include similar components, and function similar to the second arm 502(2).

As introduced above in FIGS. 14A and 14B, the teeth 802 are disposed on the second arm 502(2) and engage with the coupler 804 coupled to the second light housing 132(2). In FIG. 15, the second light housing 132(2) is shown removed to illustrate the engagement between the teeth 802 and the coupler 804. As shown, the notch 1000 of the coupler 804 engages with the teeth 802. Moreover, the first wing 1312(1) (obscured in FIG. 15) and the second wing 1312(2) engage with the groove 1414 to secure the second light housing 132(2) to the second arm 502(2). During rotation of the second light housing 132(2) (e.g., about the Y-axis), for example, to change an orientation of the second light assembly 104(2), the notch 1000 of the coupler 804 may traverse in between adjacent teeth of the teeth 802. The cavity 1416 is provided for routing cables or other wires up and into the second light housing 132(2). As shown, the teeth 802 may be disposed around the cavity 1416.

Figure 16:
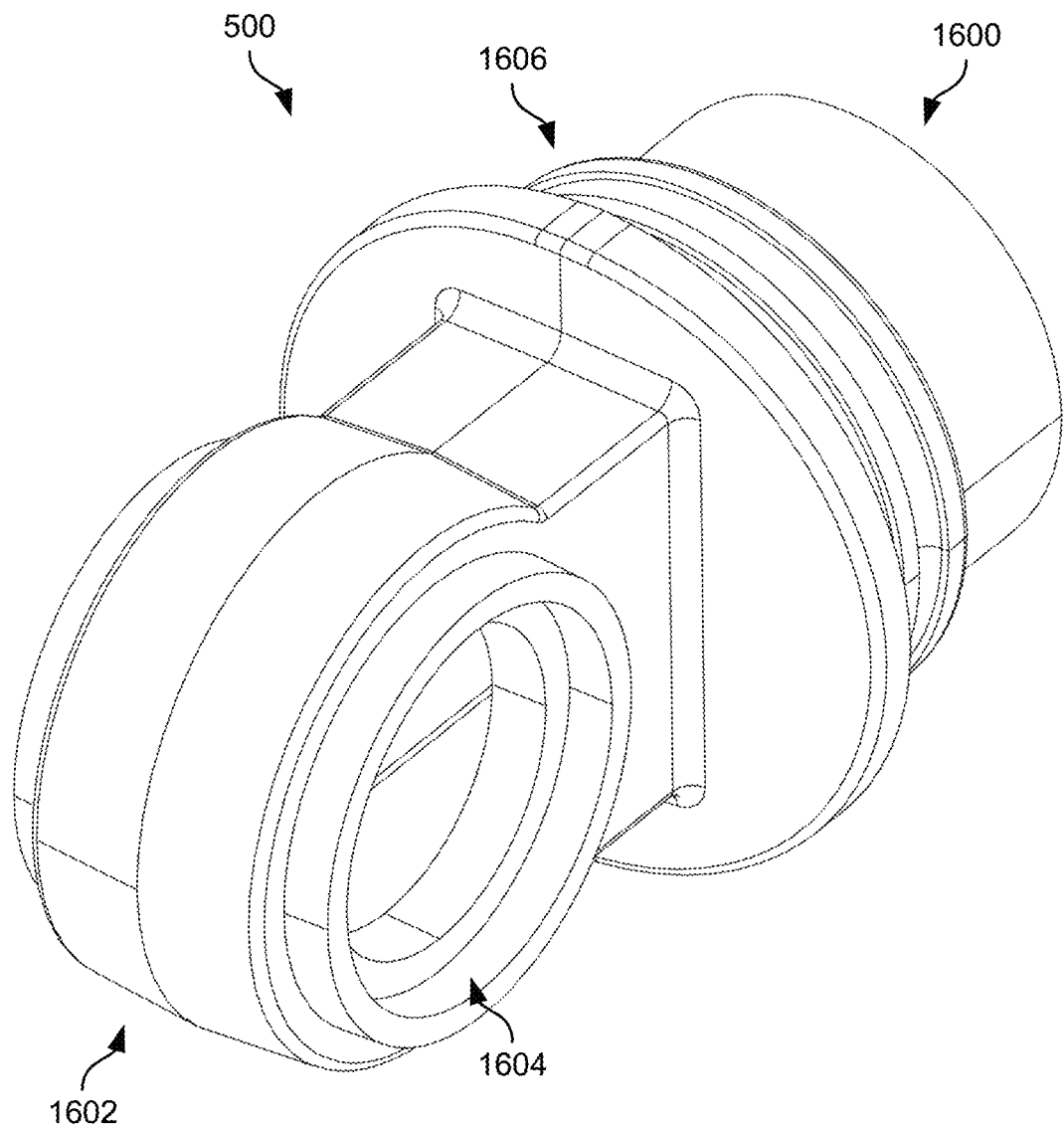
FIG. 16 illustrates an example bracket configured to receive the arm of FIGS. 14A and 14B, according to an example of the present disclosure.

FIG. 16 illustrates a perspective view of the bracket 500, according to examples of the present disclosure. The bracket 500 is configured to receive the first arm 502(1) and the second arm 502(2). For example, the bracket 500 may include a first end 1600 that couples to the mount 106, and an opposite second end 1602 that receives the first arm 502(1) and the second arm 502(2). More specifically, the second end 1602 may include a channel 1604 that extends through a thickness of the bracket 500 (e.g., in the X-direction). The collar 1410 of the second arm 502(2), as well as a collar of the first arm 502(1) (similar to the collar 1410 of the second arm 502(2)), may be insertable into the channel 1604. The first arm 502(1) and the second arm 502(2) may be rotatable within the channel 1604. As will be explained herein, a fastener may be disposed through the first arm 502(1) and the second arm 502(2) for coupling the first arm 502(1) and the second arm 502(2) to the bracket 500. In some instances, the first end 1600 of the bracket 500 may be fastened to the mount 106, or the bracket 500 may be threaded into the mount 106. In some instances, the first end 1600 of the bracket 500 may be rotatable within the mount 106 to adjust an orientation of the bracket 500, and consequently, the light assemblies 104. In some instances, threads 1606 are disposed proximate to the first end 1600 and are threaded into a receptacle of the mount 106. The threads 1606 permit the bracket 500 to rotate within the receptacle of the mount 106 while still being coupled thereto.

Additionally, in some instances, wires or other cables may route through the bracket 500. For example, the mount 106 may include one or more PCBs that supply power to the light assemblies 104. The one or more PCBs may also communicatively couple the camera assembly 102 to the light assemblies 104, respectively, such as controlling the lighting elements 900 in response to motion being detected. In some instances, the wires or other cables may route through a body of the bracket 500, between the first end 1600 and the second end 1602. In such instances, the wires or other cables may be routed through the channel 1604 and into the first arm 502(1) and the second arm 502(2), respectively.

FIG. 17 illustrates a cross-sectional view of the device 100, taken along line B-B of FIG. 7A, showing an engagement between the first arm 502(1), the second arm 502(2), and the bracket 500, according to examples of the present disclosure. The first arm 502(1) and the second arm 502(2) engage within the channel 1604 of the bracket 500. For example, the collar 1410 of the first arm 502(1) and the second arm 502(2) reside within the channel 1604 of the bracket 500.

Further, a fastener 1700 may be used to secure the first arm 502(1) and the second arm 502(2) to the bracket 500. For example, the fastener 1700 may be disposed through the post 1408 of the second arm 502(2), and engaged with a threaded receptacle 1702. Tightening the fastener 1700 may create a friction fit between the first arm 502(1), the second arm 502(2), and the bracket 500. In some instances, the fastener 1700 is insertable into the first arm 502(1) via a passageway 1704. Once the fastener 1700 is tightened, a plug 1706 may be disposed within the passageway 1704 to enclose and seal the passageway 1704. In some instances, the fastener 1700 may be loosened to adjust an orientation of the first arm 502(1) and/or the second arm 502(2) (e.g., rotate about the X-axis), and may be tightened to secure the first arm 502(1) and/or the second arm 502(2) in place.

A first passageway 1708(1) is formed to route wires or other cables from the mount 106, through the bracket 500, and into the first arm 502(1). Likewise, a second passageway 1708(2) is formed to route wires or other cables from the mount 106, through the bracket 500, and into the second arm 502(2). The first arm 502(1) and the second arm 502(2) may include respective cavities through which the wires or other cables are respective routed into the first light assembly 104(1) and the second light assembly 104(2).

In some instances, various seals (e.g., O-rings, gaskets, etc.) may be disposed between the bracket 500, the first arm 502(1), and the second arm 502(2). The seals may prevent the ingress of debris, liquid, and so forth into the bracket 500, the first arm 502(1), and the second arm 502(2).

Figure 18:
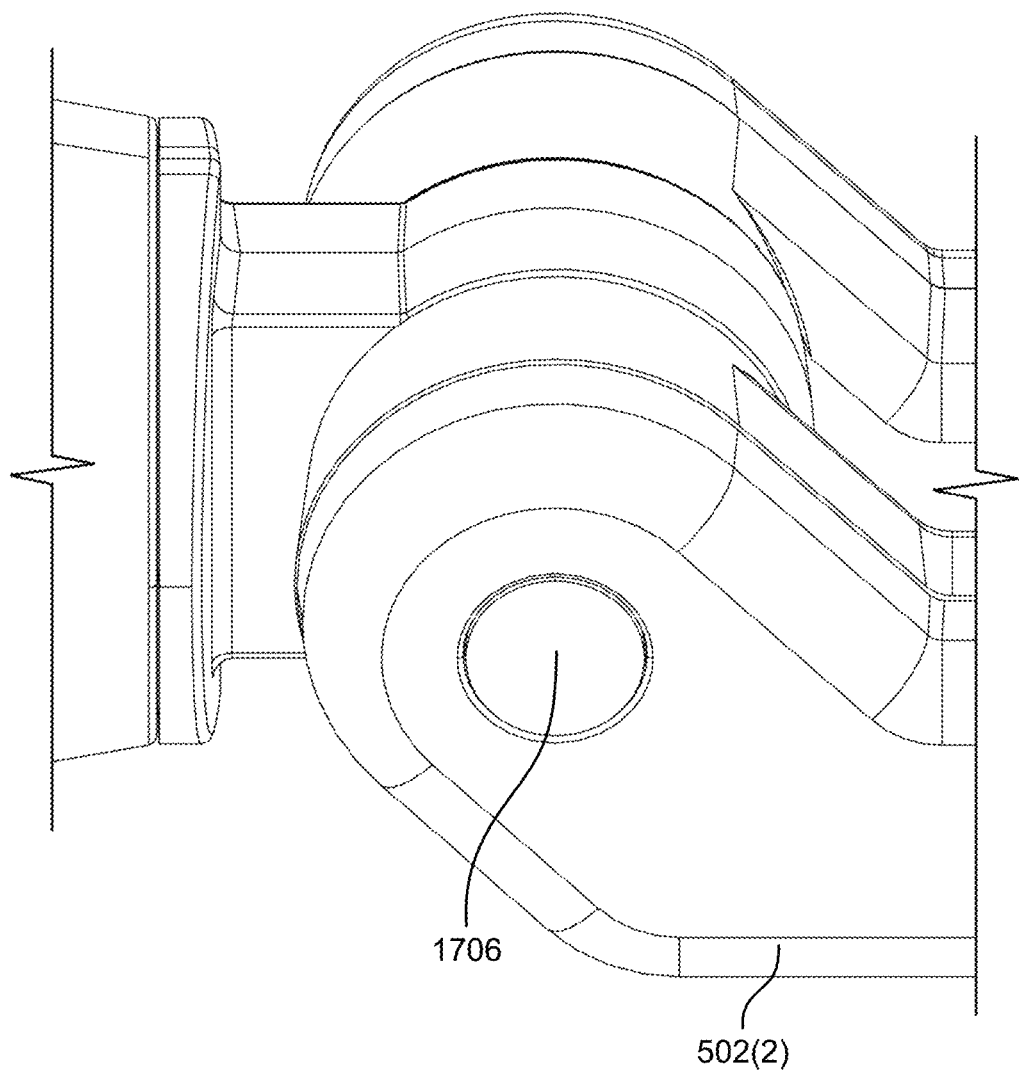
FIG. 18 illustrates an example engagement between the arm of FIGS. 14A and 14B within the bracket of FIG. 16, according to an example of the present disclosure.
Figure 18:
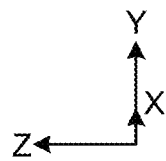

FIG. 18 illustrates the second arm 502(2), showing the plug 1706 engaged within the passageway 1704, according to examples of the present disclosure. Removing the plug 1706 exposes the fastener 1700 and allows the fastener 1700 to be loosened and tightening for adjusting an orientation of the first arm 502(1) and/or the second arm 502(2), and consequently, the first light assembly 104(1) and/or the second light assembly 104(2), respectively.

FIG. 19 illustrates a front view of the camera assembly 102 of the device 100, according to examples of the present disclosure. As introduced above, the camera assembly 102 includes the front cover 124 and the housing 126, as well as the top 116, the bottom 118, the first side 120, the second side 122, the front 112, and the back 114.

The front cover 124 may include a first channel 1900, a second channel 1902, and a third channel 1904. The first channel 1900 may direct sound to a microphone disposed within the camera assembly 102. For example, the first channel 1900 may represent a microphone port that channels sound to a microphone disposed within the camera assembly 102. The second channel 1902 and/or the third channel 1904 may output light associated with an operational state of the device 100 (e.g., recording audio, outputting sound, recording image/video data, detecting motion, etc.). Lighting elements of the camera assembly 102, for example, may be configured to emit light out of the second channel 1902 and the third channel 1904, respectively. In some instances, a first lighting element disposed beneath the second channel 1902 may output light associated with one or more first operations being performed by the device 100 (e.g., recording audio, recording video, etc.), while a second lighting element disposed beneath the third channel 1904 may output light associated with one or more second operations being performed by the device 100 (e.g., detected motion).

The camera assembly 102 may also include a camera lens 1906 coupled to or disposed within the front cover 124. The camera 110 of the device 100 is disposed behind (e.g., Z-direction) the camera lens 1906 for imaging an environment of the device 100. The camera assembly 102 also includes the button 108, which may be used to at least partially control an operation of the device 100. In some instances, the camera lens 1906 is located centrally between the first side 120 and the second side 122, and/or may be located more proximate to the top 116 than the bottom 118. In some instances, the first channel 1900 is located more proximate to the top 116 than the bottom 118, and may be located more proximate to the first side 120 than the second side 122. Additionally, the button 108 may be located centrally between the first side 120 and the second side 122. In some instances, the second channel 1902 is located to a first side of the camera 110 (or the camera lens 1906) and may be located more proximate to the first side 120 and/or the top 116, while the third channel 1904 is located to a second side of the camera 110 (or the camera lens 1906) and may be located more proximate to the second side 122 and/or the top 116.

In some instances, the front cover 124 and/or the sensor lens 128 are transmissive to signals and/or light rays. For example, in some instances, IR sensor(s) may reside beneath the front cover 124 and are oriented to emit IR signals in front of the device 100 for detecting motion. In such instances, the IR sensor(s) may output IR light through the front cover 124, and receive IR light reflected off object(s) in the environment. Additionally, PIR sensor(s) may reside beneath the sensor lens 128 and are configured to receive IR (e.g., radiation) emitted from sources (e.g., people, animals, etc.). In some instances, the front cover 124 and the sensor lens 128 are manufactured from different materials, or the same materials. Example materials include, for example, from high-density polyethylene (HDPE), silicon, germanium, zinc-sulfide, or zinc-selenide, and so forth.

Figure 20:
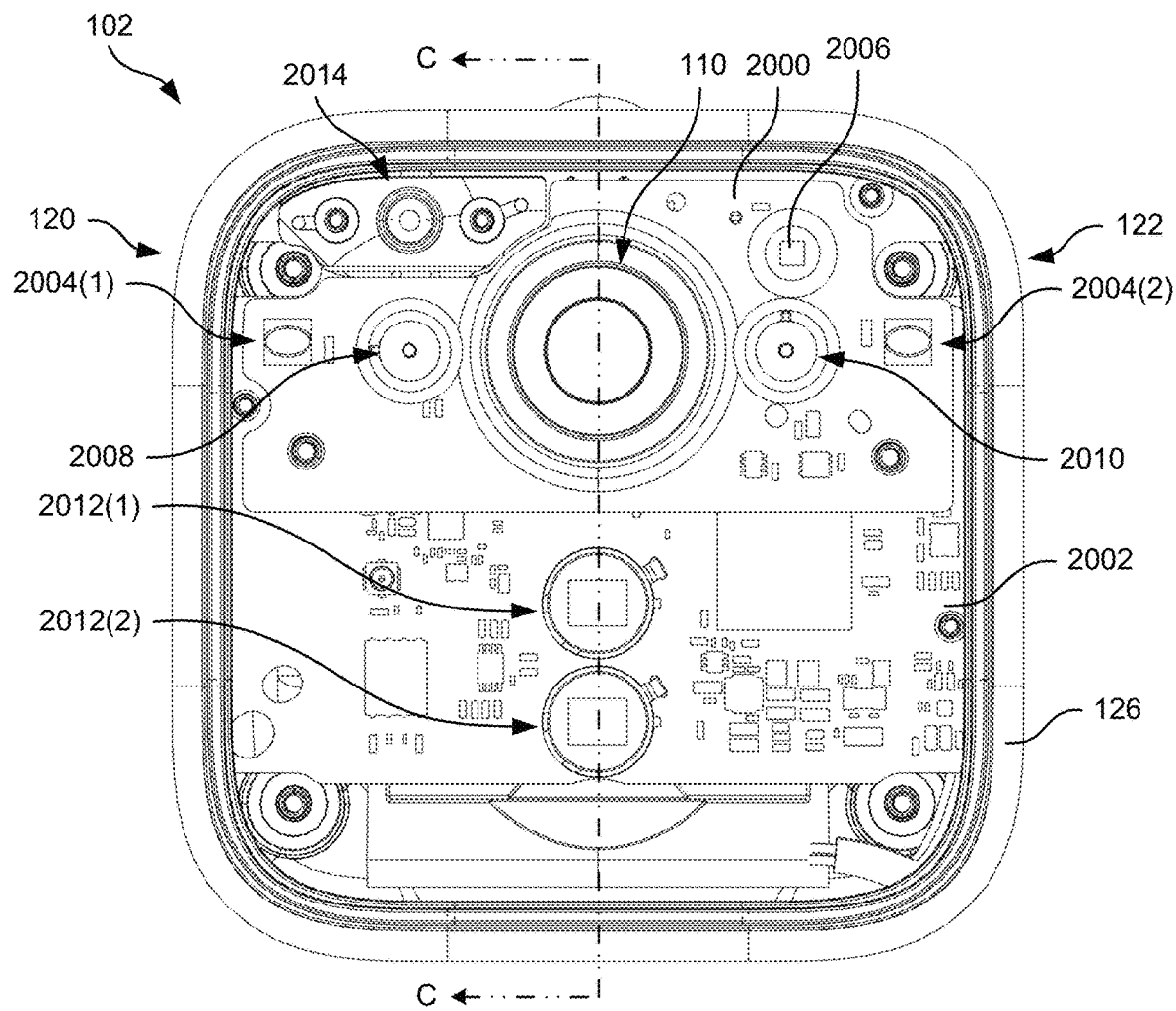
FIG. 20 illustrates example computing components residing within the camera assembly of FIG. 19, according to an example of the present disclosure.

FIG. 20 illustrates example computing components residing within the camera assembly 102, according to examples of the present disclosure. In FIG. 20, the front cover 124 and the sensor lens 128 are shown removed from the housing 126.

In some instances, the camera assembly 102 includes a first PCB 2000 and a second PCB 2002. The first PCB 2000 may be disposed in front of (e.g., more proximate to the front 112) the second PCB 2002. Among other components, the first PCB 2000 may include a first IR sensor 2004(1) (e.g., IR LED), a second IR sensor 2004(2) (e.g., IR LED), an ambient light sensor 2006, a first light guide 2008, and a second light guide 2010. The first IR sensor 2004(1) and the second IR sensor 2004(2) are configured to emit IR light through the front cover 124 and into the environment. The ambient light sensor 2006 receives light through the front cover 124. The ambient light sensor 2006 is configured to generate data indicative of a brightness of the environment (e.g., for switching between nighttime and daytime modes).

The first light guide 2008 may output light from a lighting element disposed beneath (e.g., in the Z-direction) the first light guide 2008. The first light guide 2008 is configured to direct light out the second channel 1902. Similarly, the second light guide 2010 may output light from a lighting element disposed beneath (e.g., in the Z-direction) the second light guide 2010. The second light guide 2010 is configured to direct light out the third channel 1904. In some instances, the first light guide 2008 and/or the second light guide 2010 may output light indicative of an operational status and/or setup of the device 100 and/or the camera assembly 102. For example, the first light guide 2008 may output light indicative of an operational status of the device 100, which the second light guide 2010 may output light during a setup of the device 100 (e.g., syncing, connecting, etc.).

The camera 110 may be mounted to the second PCB 2002 and at least partially disposed through an opening in the second PCB 2002. For example, the camera 110 may be mounted to the second PCB 2002, and a body of the camera 110 may be disposed through an opening of the first PCB 2000. Here, the camera 110 may include a first end coupled to the second PCB 2002 and second end disposed in front of the first PCB 2000 (e.g., spaced apart in the Z-direction). A portion of a body of the camera 110, between the first end and the second end, is disposed through the first PCB 2000. Accordingly, the first PCB 2000 includes a passageway through which the body of the camera 110 is disposed.

Additionally, the second PCB 2002 may include a first PIR sensor 2012(1) and a second PIR sensor 2012(2). The first PIR sensor 2012(1) and the second PIR sensor 2012(2) are shown being in a vertically stacked relationship on the second PCB 2002. For example, the first PIR sensor 2012(1) may be located more proximate to the top 116 of the housing 126 than the second PIR sensor 2012(2). The first PIR sensor 2012(1) and the second PIR sensor 2012(2) are arranged to receive light rays through the sensor lens 128.

In some instances, the first PIR sensor 2012(1) and the second PIR sensor 2012(2) may include, for example, two pyroelectric sensing elements and each pyroelectric sensing element may have a pyroelectric crystal. The pyroelectric sensing elements may generate an electrical charge in response to heat. Radiation (e.g., IR light) received at a surface of a pyroelectric sensing element generates heat, which in turn, generates an electrical charge sensed by the first PIR sensor 2012(1) and the second PIR sensor 2012(2), respectively. Stated alternatively, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

In some instances, the two pyroelectric sensing elements of the first PIR sensor 2012(1) and the second PIR sensor 2012(2) may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements of the first PIR sensor 2012(1) and the second PIR sensor 2012(2) will result in an output signal that is positive or negative (depending on which pyroelectric sensing element experienced the change in temperature).

In some instances, the first PIR sensor 2012(1) and the second PIR sensor 2012(2) may include two slots, each providing an optical path to one of the pyroelectric sensing elements. A Fresnel lens formed by or within a portion of the sensor lens 128 is configured to direct light onto the pyroelectric sensing elements. In some instances, such as in the case that the device 100 includes two PIR sensors, the Fresnel lens array is configured to direct light received at a first portion of the sensor lens 128 (e.g., upper half) onto the pyroelectric sensing elements of the first PIR sensor 2012(1) and to direct light received at a second portion of the sensor lens 128 (e.g., lower half) onto the pyroelectric sensing elements of the second PIR sensor 2012(2). The first PIR sensor 2012(1) and the second PIR sensor 2012(2) may be analog, with an analog signal output, or may be digital, with digital data output generated utilizing an analog-to-digital converter (ADC).

In some instances, the device 100 may include the first PIR sensor 2012(1) and the second PIR sensor 2012(2) to detect objects. For example, the first PIR sensor 2012(1) and the second PIR sensor 2012(2) may output a signal or sensor data, where the device 100 uses a characteristic determined using the signal or sensor data to determine whether the first PIR sensor 2012(1) and/or the second PIR sensor 2012(2) detected an object. The characteristic may include a voltage represented by the signal or sensor data, an amplitude of a wave generated or determined using the signal or sensor data, an angle of the wave generated using the signal or sensor data, and/or the like.

In some instances, an interior surface of the sensor lens 128 includes the Fresnel lens that directs light to the first PIR sensor 2012(1) and the second PIR sensor 2012(2), respectively. The Fresnel lens may be made up of a plurality of individual lens elements having concentric grooves, such as the facets and translation edges, that form an Fresnel lens array. For example, the concentric grooves may be etched, milled, cut, molded, or otherwise formed within a rearward surface oriented towards the first PIR sensor 2012(1) and the second PIR sensor 2012(2). The Fresnel lens may increase a FOV of the first PIR sensor 2012(1) and the second PIR sensor 2012(2) for detecting motion within the environment. An example Fresnel lens array is described in, for example, U.S. patent application Ser. No. 17/990,200, filed Nov. 18, 2022, entitled "Fresnel Lens with Variable-Angle Translation Edges." This patent application, as well as any publications thereof or patents issuing therefrom, are herein incorporated by reference.

The camera assembly 102 may further include a microphone assembly 2014. The microphone assembly 2014 may be mounted to the front cover 124, and communicatively coupled to the first PCB 2000 and/or the second PCB 2002. A portion of the microphone assembly 2014 is aligned with the first channel 1900 such that sound may be directed to a microphone of the microphone assembly 2014. Various shielding or isolating foams may be disposed around the microphone assembly 2014, the front cover 124, the sensor lens 128, and so forth for acoustically sealing the microphone, and/or to prevent the ingress of liquid or other debris into the camera assembly 102.

In some instances, the camera 110 includes a substantially similar FOV as the PIR sensor(s) 2012. For example, the PIR sensor(s) 2012 detect motion within a FoV, and the camera 110 may have a FoV that is the same as, or substantially overlaps with the PIR sensor(s) 2012. That is, the first PIR sensor 2012(1) and the second PIR sensor 2012(2) may have a collective FoV, and the camera 110 has a FoV that aligns with the collective FoV of the first PIR sensor 2012(1) and the second PIR sensor 2012(2). In doing so, as the first PIR sensor 2012(1) and/or the second PIR sensor 2012(2) sense motion, the camera 110 is able to capture image data and/or video data associated with the motion. Additionally, a FoV of the light assemblies 104 may overlap with the FoV of the camera 110 such that the light assemblies illuminate the image data and/or video data captured by the camera 110.

Figure 21:
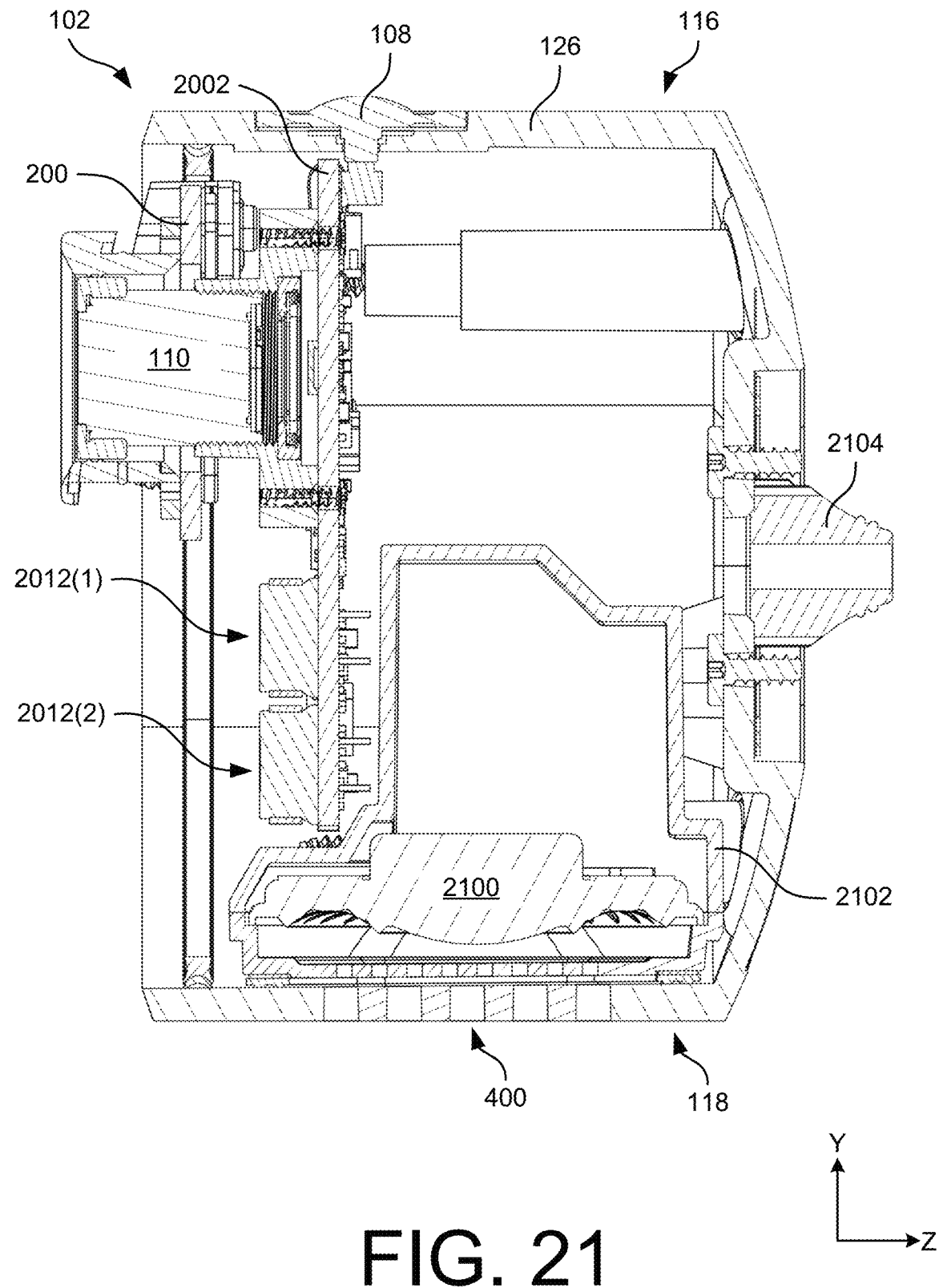
FIG. 21 illustrates a cross-sectional view of the camera assembly of FIG. 19, taken along line C-C of FIG. 20, according to an example of the present disclosure.

A line C-C is further shown extending through the camera assembly 102, which is used to illustrate a cross-sectional view of the sensor subassembly in FIG. 21.

FIG. 21 illustrates a cross-sectional view of the camera assembly 102, taken along line C-C of FIG. 20, according to examples of the present disclosure.

The camera assembly 102 includes the first PCB 2000, the second PCB 2002, the camera 110, the button 108, the first PIR sensor 2012(1), and the second PIR sensor 2012(2). The camera 110, the button 108, the first PIR sensor 2012(1), and the second PIR sensor 2012(2) may be mounted or coupled to the second PCB 2002. As shown, the camera 110 may be coupled to the second PCB 2002, but may extend through an opening of the first PCB 2000. The button 108 is further shown being at least partially disposed through the housing 126. While a single button is shown, the device 100 may include additional buttons. In some instances, the button 108 may correspond to a power button, a wireless connectivity button, a mute button, volume buttons, a reset button, sync buttons, or any other type of button or control. The button 108 may also be located on sides of the housing 126 other than the top 116. In some instances, the button 108 may be mechanical (e.g., having physically movable components) and/or electronic (e.g., capacitive sensors, optical sensors, touch screen, or the like). In some instances, the button 108 may be located closer to the front 112 than the back 114 (e.g., spaced apart in the Z-direction).

The camera assembly 102 further includes a speaker 2100 oriented to emit sound through the orifices 400 of the housing 126. As shown, the speaker 2100 is oriented towards the bottom 118 of the camera assembly 102. The speaker 2100 may be disposed within a speaker housing 2102 that provides a back volume to the speaker 2100. The speaker 2100 may represent a tweeter speaker, a mid-range speaker, or a subwoofer speaker.

A connection 2104 of the camera assembly 102 may receive wires or other cables that are routed into the housing 126. The connection 2104 may couple to the ball 602 of the ball and socket joint 600.

Figure 22A:
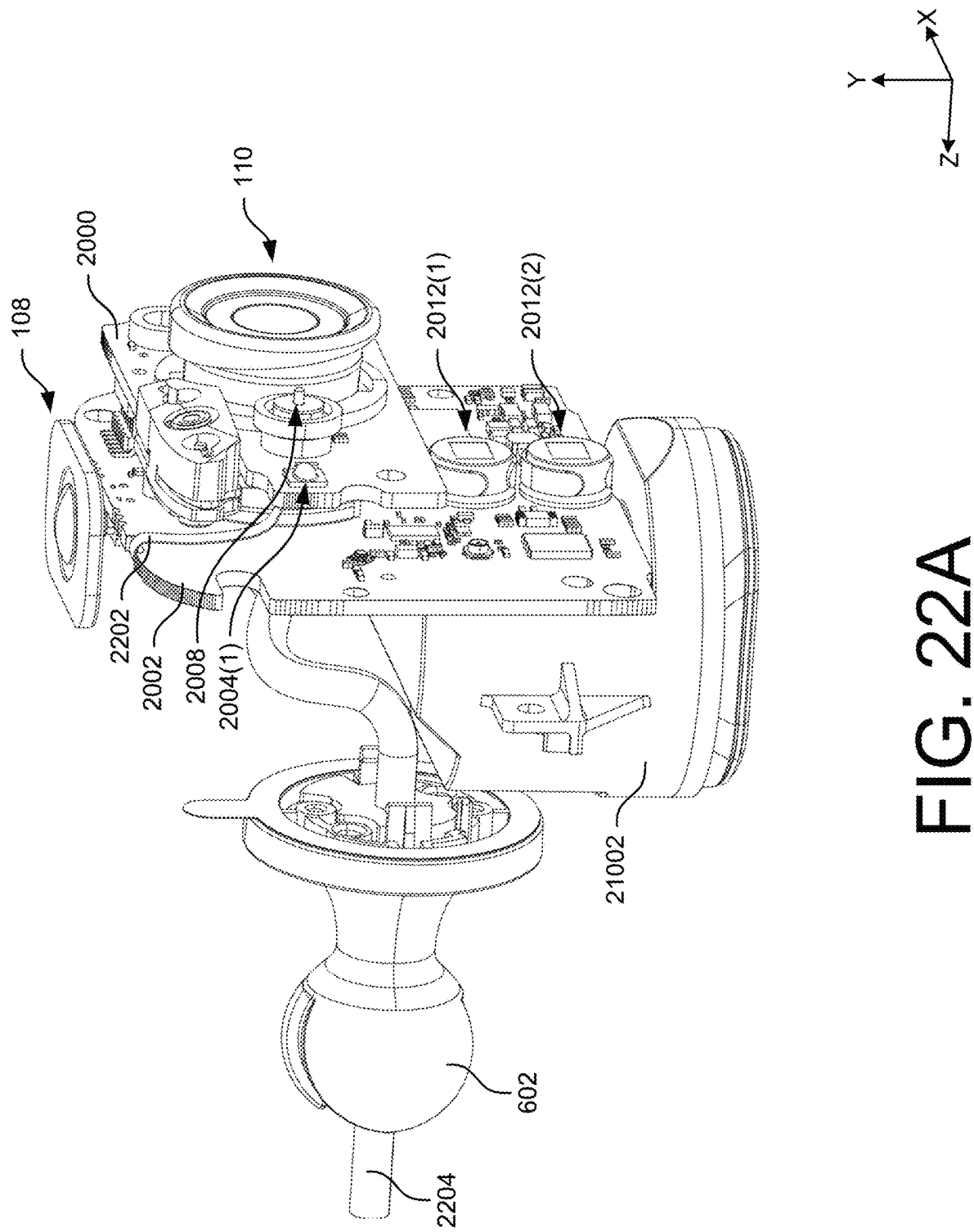
FIGS. 22A-22C illustrate example computing components residing within the camera assembly of FIG. 19, according to an example of the present disclosure.
Figure 22B:
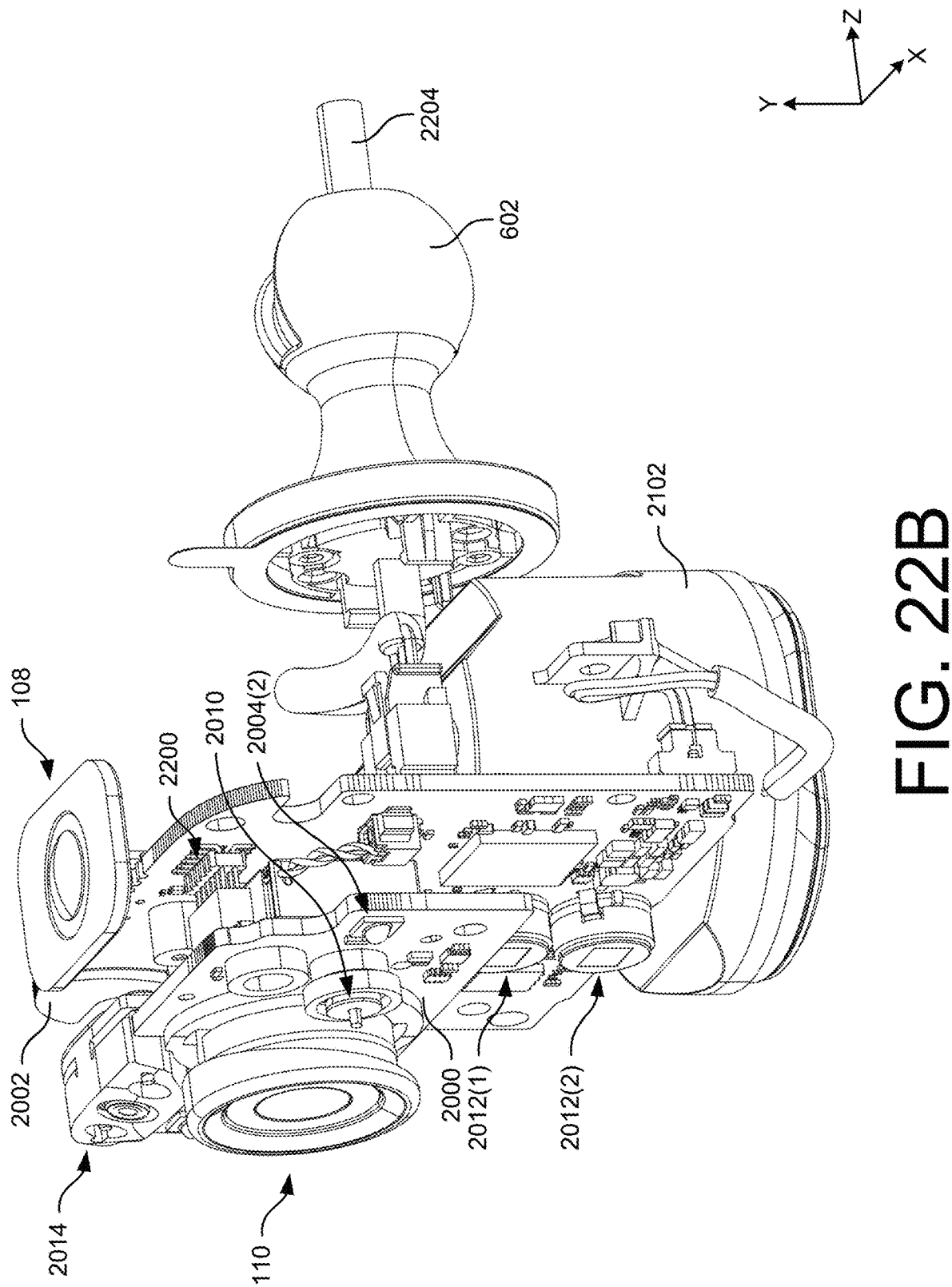
Figure 22C:
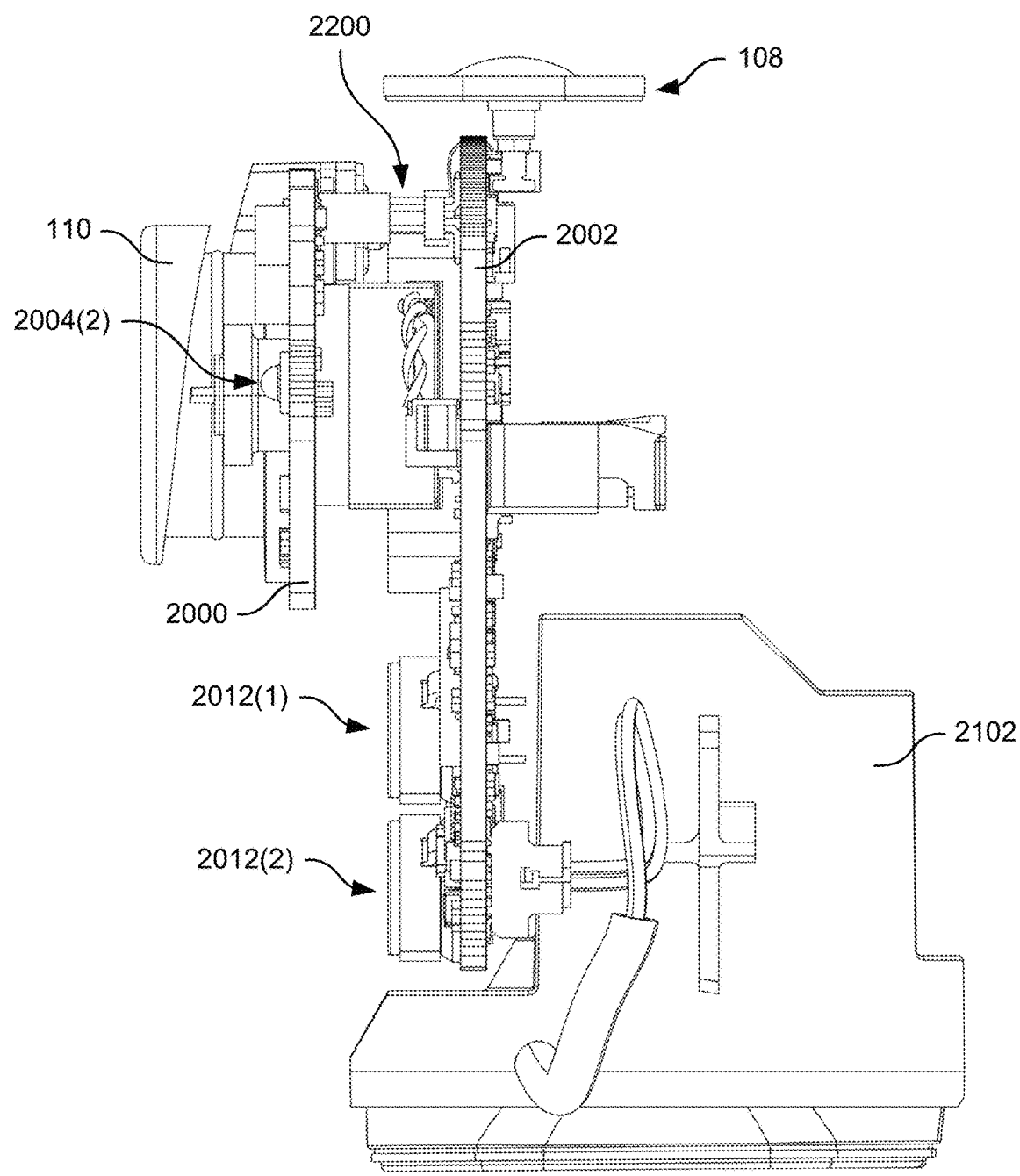

FIGS. 22A-22C illustrate various components of the camera assembly 102, according to examples of the present disclosure. FIG. 22A illustrates a perspective view of the first side 120 of the camera assembly 102, FIG. 22B illustrates a perspective view of the second side 122 of the camera assembly 102, and FIG. 23 illustrates a planar view of the second side 122 of the camera assembly 102.

The first IR sensor 2004(1), the second IR sensor 2004(2), the first light guide 2008, and the second light guide 2010 may be disposed on the first PCB 2000. Additionally, the ambient light sensor 2006 may be disposed on the first PCB 2000. The camera 110, the first PIR sensor 2012(1), and the second PIR sensor 2012(2) may be disposed on the second PCB 2002. In some instances, the first PCB 2000 and the second PCB 2002 communicatively couple to one another via a pin and socket connector 2200. For example, the first PCB 2000 may include a pin connector that are received within sockets of the second PCB 2002.

The first IR sensor 2004(1), the second IR sensor 2004(2), the ambient light sensor 2006, the first light guide 2008, and the second light guide 2010 are shown being disposed on a first side of the first PCB 2000 and oriented in a first direction (e.g., towards the front 112). Additionally, the camera 110, the first PIR sensor 2012(1), and the second PIR sensor 2012(2) may be disposed on a first side of the second PCB 2002 and oriented in the first direction (e.g., towards the front 112). The speaker 2100 may be oriented in a second direction that is different from the first direction (e.g., towards the bottom 118). The button 108 may be oriented in a third direction that is opposite the second direction (e.g., towards the top 116). In some instances, the button 108 mounts to the second PCB 2002, at a second side that is opposite to the first side in which the camera 110, the first PIR sensor 2012(1), and the second PIR sensor 2012(2) are disposed.

The microphone assembly 2014 may be coupled to or disposed on the first PCB 2000. In some instances, the microphone assembly 2014 is disposed in front of the second PCB 2002. In some instances, the microphone assembly 2014 may include a microphone PCB having a microphone mounted thereto. In some instances, a flexible printed circuit (FPC) 2202 communicatively couples the microphone PCB to the second PCB 2002. Additional details of the microphone assembly 2014 are described in, for example, U.S. patent application Ser. No. 18/074,098, filed Dec. 2, 2022, entitled "Audio/Visual (A/V) Device." This patent application, as well as any publications thereof or patents issuing therefrom, are herein incorporated by reference.

In some instances, when the camera assembly 102 is assembled, the first PCB 2000 may couple to the front cover 124. The second PCB 2002, in some instances, may couple to the rear cover 402. Additionally, or alternatively, the first PCB 2000 and/or the second PCB 2002 may couple to the speaker housing 2102 and/or the housing 126.

The ball 602 of the camera assembly 102 is shown including wires 2204 extending therethrough. That is, the wires 2204 may route through the ball and socket joint 600 for transferring power, signals, data, and the like to the camera assembly 102. Such signals or data, for example, may control an operation of the lighting elements 900 within the light assemblies 104. In some instances, the wires 2204 are connected to the second PCB 2002. In some instances, the wires 2204 connect to other wires within the mount 106. For example, within the mount, the wires 2204 may connect with wires providing power to the device 100. Although not shown, wire, or other cables, may route from the camera assembly 102 to the light assemblies 104, for example, or the power may split within the mount 106 to provide power to the camera assembly 102 and the light assemblies 104, respectively. However, the camera assembly 102 and the light assemblies 104 may be communicatively coupled to one another, for example, to at least partially control an operation thereof. For example, in response to detecting motion within the environment, the light assemblies 104 may illuminate.

The first PCB 2000 and/or the second PCB 2002 may include various cutouts for aligning the first PCB 2000 and/or the second PCB 2002 within the housing 126, vice versa. For example, the cutouts may engage with protrusions, flanges, and so forth within the housing 126. Additionally, or alternatively, channels may be disposed through the first PCB 2000 and/or the second PCB 2002, and fasteners may be disposed through the channels and received within posts of the housing 126 to couple the first PCB 2000 and/or the second PCB 2002 to the housing 126.

Figure 23A:
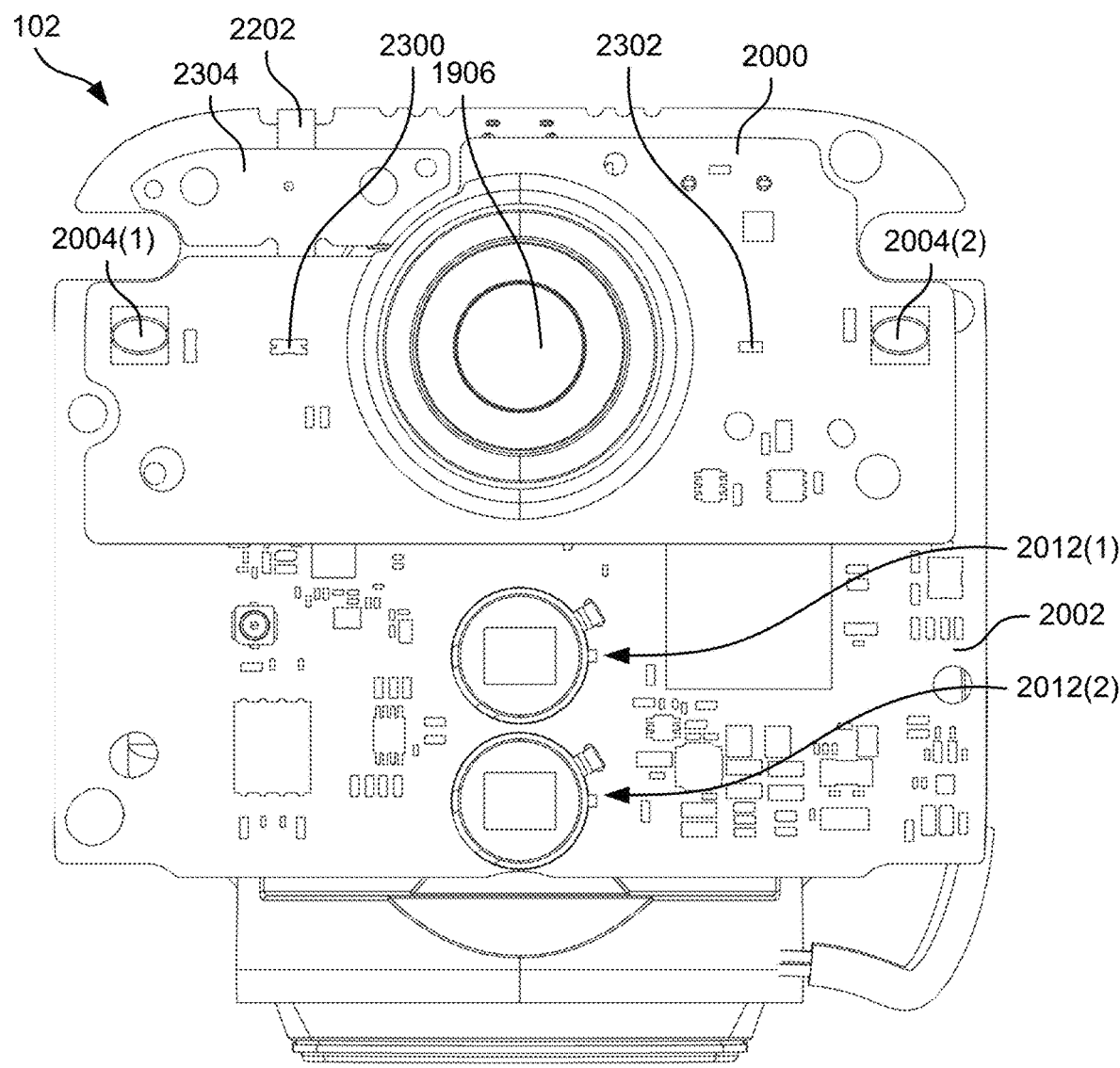
FIGS. 23A and 23B illustrate example printed circuit boards (PCBs) of the camera assembly of FIG. 19, according to an example of the present disclosure.
Figure 23A:
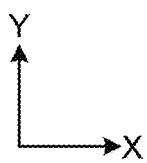
Figure 23B:
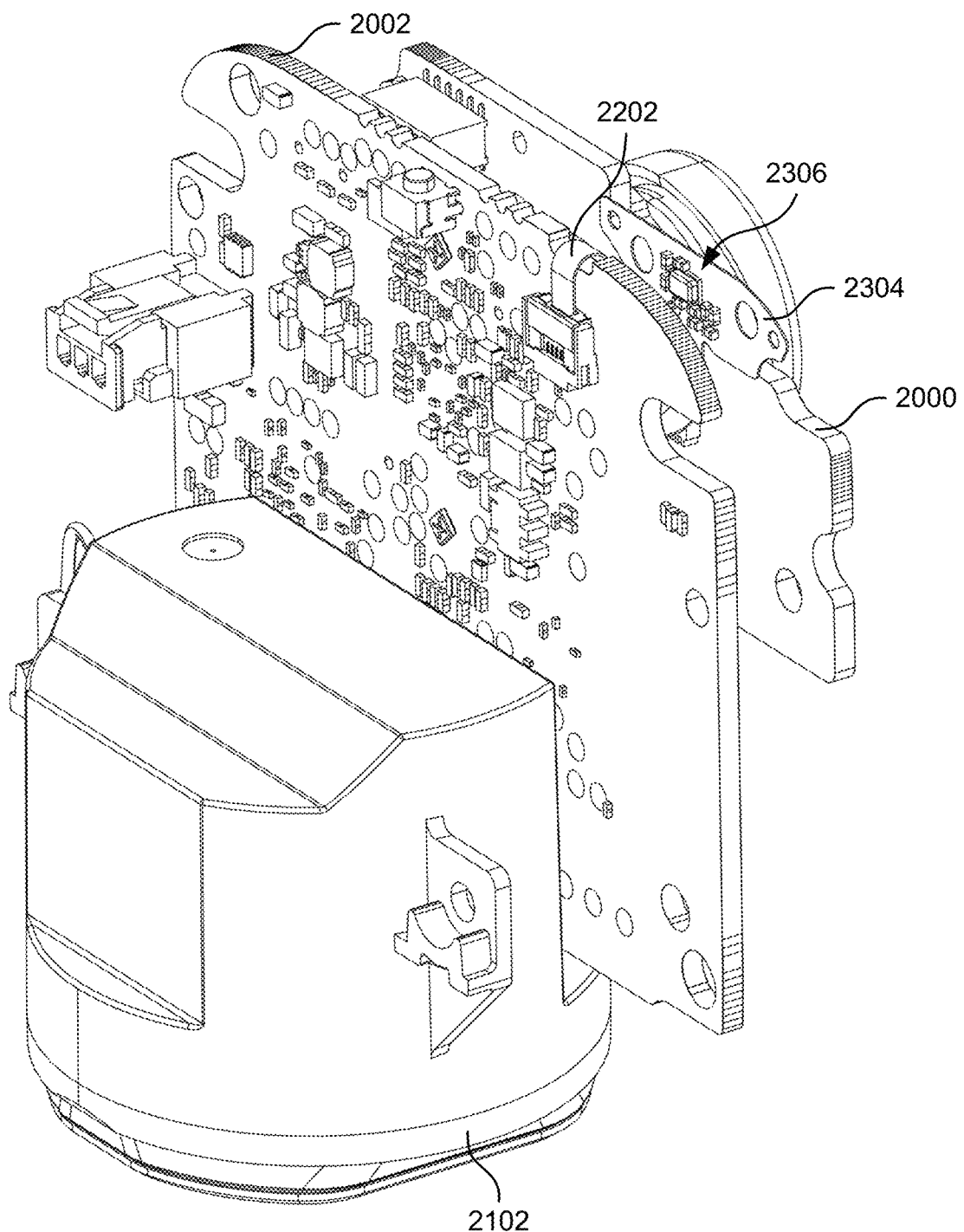

FIGS. 23A and 23B illustrate various components of the camera assembly 102, according to examples of the present disclosure. FIG. 23A illustrates a front view of the camera assembly 102, and FIG. 23B illustrates a rear perspective view of the camera assembly 102. In FIGS. 23A and 23B, the first light guide 2008, the second light guide 2010, the button 108, and portions of the microphone assembly 2014 are shown removed.

A first lighting element 2300 and a second lighting element 2302 are disposed on the first PCB 2000. The first lighting element 2300 may output light through the second channel 1902 in the front cover 124 via the first light guide 2008, while the second lighting element 2302 may output light through the third channel 1904 in the front cover 124 via the second light guide 2010. In some instances, the first lighting element 2300 and the second lighting element 2302 may output light indicative of operations being performed by the device 100. For example, the first lighting element 2300 may output light in response to first operations of the device 100, such as recording video, while the second lighting element 2302 may output light in response to second operations of the device 100, such as detecting motion, syncing with other devices, setup, and so forth. In some instances, the first lighting element 2300 may be an RGB lighting element, and the second lighting element 2302 may be a blue lighting element.

In some instances, the microphone assembly 2014 includes a microphone PCB 2304. The microphone PCB 2304 may be encased, or otherwise at least partially enclosed, via a microphone seal (shown removed in FIGS. 23A and 23B). The microphone PCB 2304 may be coupled to the second PCB 2002 via the FPC 2202. Additionally, a microphone 2306 may mount to the microphone PCB 2304, and a channel of the microphone PCB 2304 may route sound to the microphone 2306.

In some instances, the camera 110 is vertically aligned with the first PIR sensor 2012(1) and the second PIR sensor 2012(2). Additionally, or alternatively, the camera 110 may be horizontally aligned with the first IR sensor 2004(1), the second IR sensor 2004(2), the first lighting element 2300, and/or the second lighting element 2302.

The camera assembly 102, or more generally, the device 100, may include additional computing components not described. For example, the camera assembly 102 may include processors, memory, circuits, transformers, power supplies, network interfaces (e.g., Wi-Fi, Bluetooth, ZigBee, LTE, Bluetooth Low Energy (BLE), thermal pads, shielding foams, shielding plates, and so forth. In some instances, these computing components may be disposed on the first PCB 2000 and/or the second PCB 2002. Various connectors (e.g., flex circuits) may communicatively couple such components together.

Figure 24A:
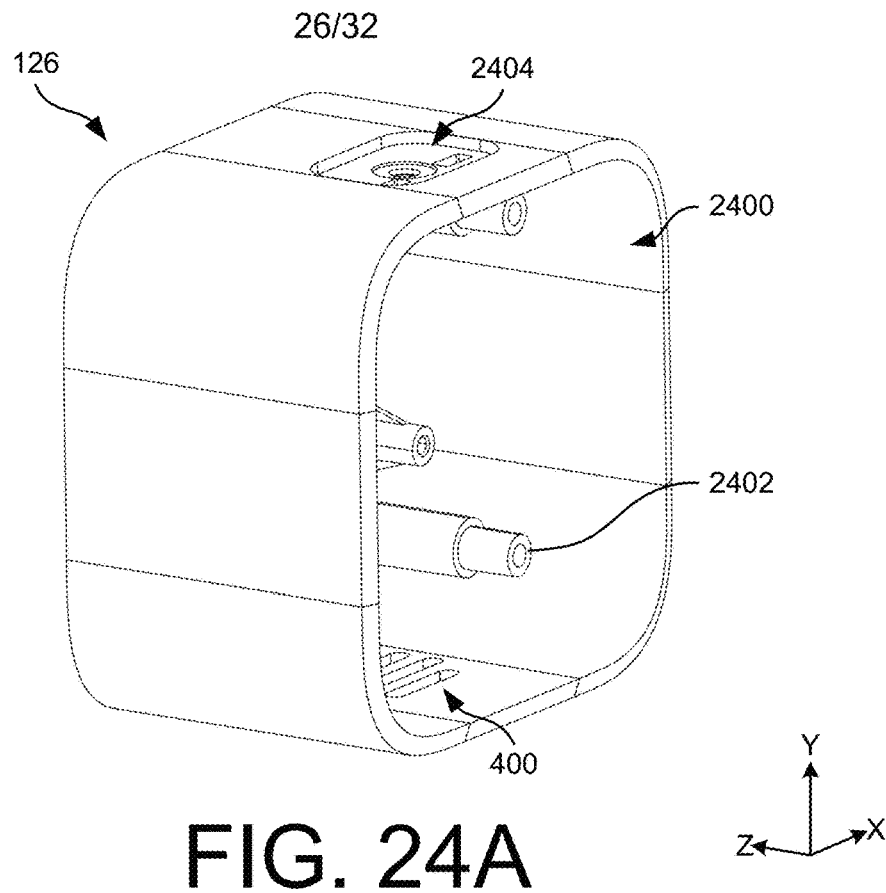
FIGS. 24A and 24B illustrate an example housing of the camera assembly of FIG. 19, according to an example of the present disclosure.
Figure 24B:
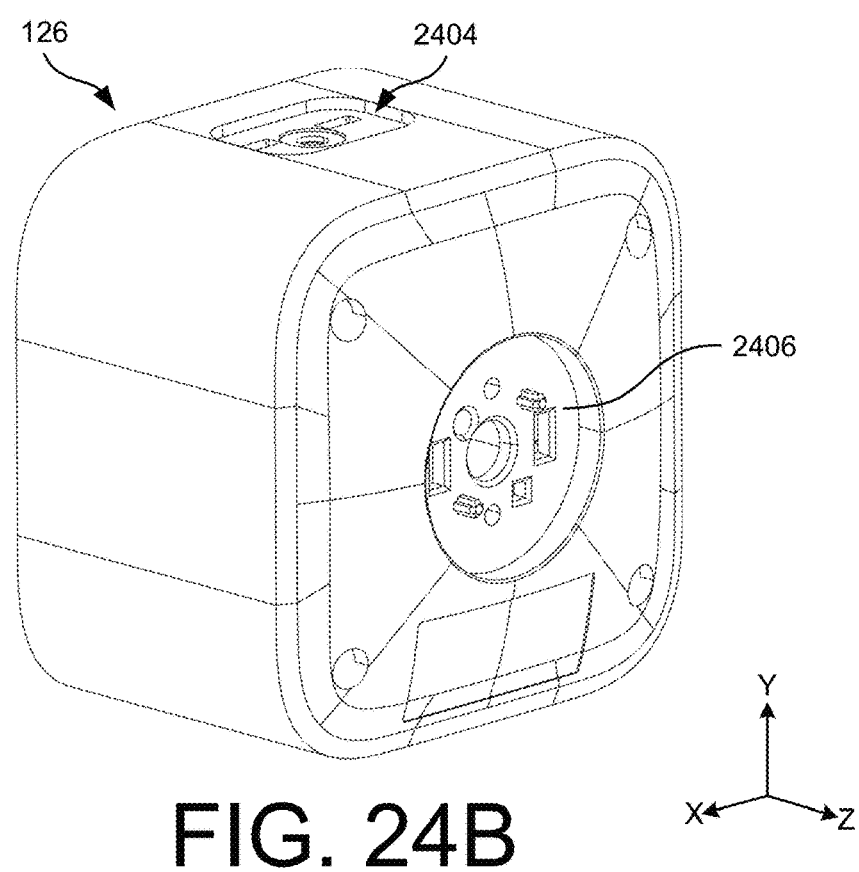

FIGS. 24A and 24B illustrate the housing 126 of the camera assembly 102, according to examples of the present disclosure. FIG. 24A illustrates a front perspective view of the housing 126, and FIG. 24B illustrates a rear perspective view of the housing 126.

The housing 126 defines a cavity 2400 in which components of the camera assembly 102 are disposed. For example, the first PCB 2000, the second PCB 2002, the speaker housing 2102, and so forth may be disposed within the cavity 2400. In some instances, the cavity 2400 may include various posts 2402 to which components of the camera assembly 102 are coupled to. For example, the first PCB 2000 and the second PCB 2002 may be secured to the posts 2402 via fastener(s). The housing 126 may further define the orifices 400 for the speaker 2100. A receptacle 2404 may receive at least a portion of the button 108.

The front cover 124 may couple to the housing 126, for example, at a front of the housing 126 (or the front 112 of the camera assembly 102). In some instances, the ball 602 and/or the connection 2104 may couple to the housing 126 within a recess 2406 at the back 114.

Figure 25A:
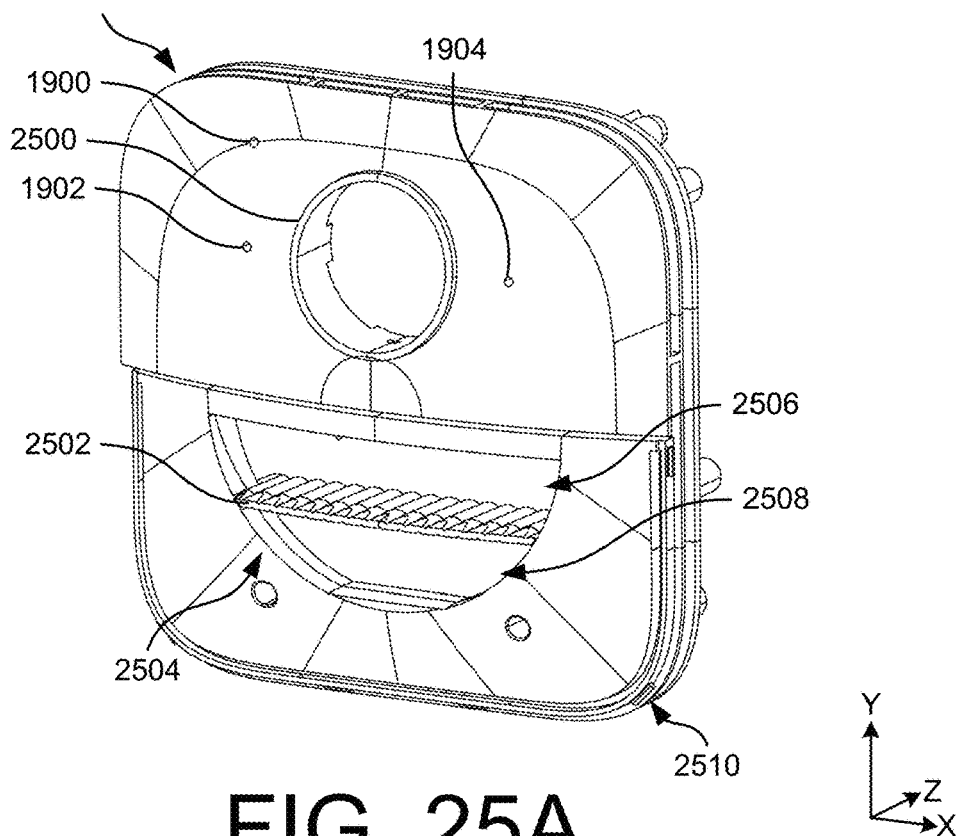
FIGS. 25A and 25B illustrate an example cover of the camera assembly of FIG. 19, according to an example of the present disclosure.
Figure 25B:
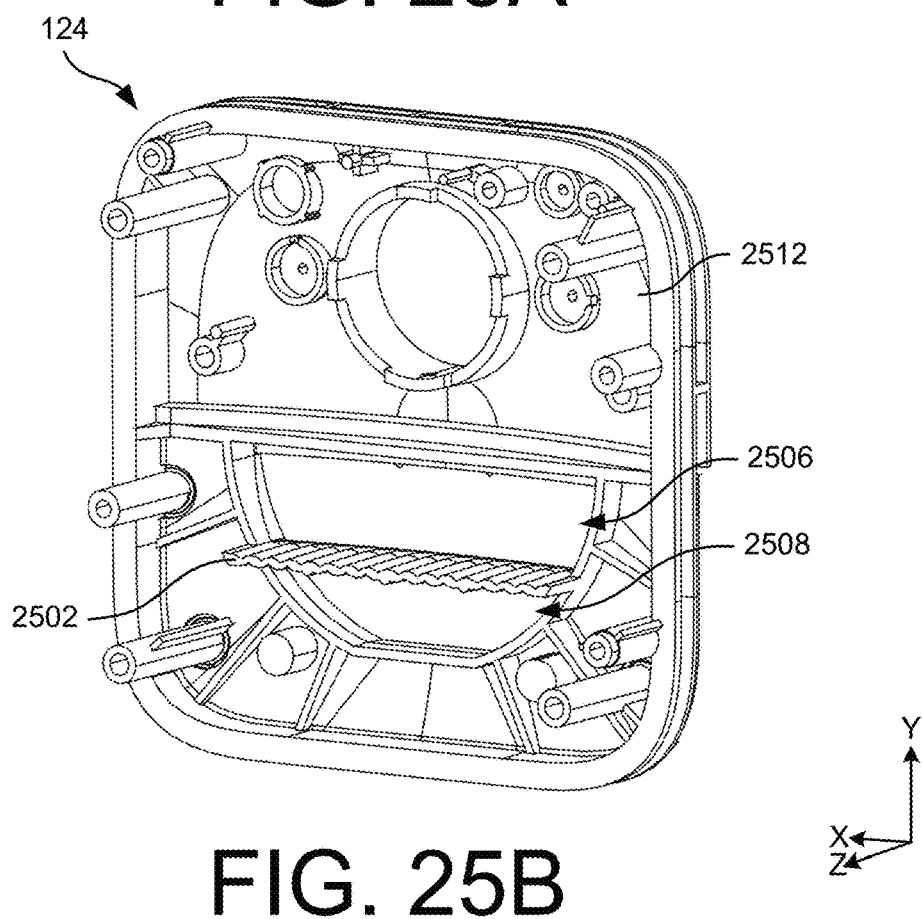

FIG. 25A and FIG. 25B illustrate the front cover 124, according to examples of the present disclosure. FIG. 25A illustrates a front perspective view of the front cover 124, and FIG. 25B illustrates a rear perspective view of the front cover 124.

The front cover 124 defines the first channel 1900, the second channel 1902, and the third channel 1904. Additionally, the front cover 124 defines a fourth channel 2500 through which at least a portion of the camera 110 is disposed. Additionally, the camera lens 1906 may be disposed in the fourth channel 2500. The front cover 124 may also define a divider 2502. The first PIR sensor 2012(1) may be arranged vertically above the divider 2502, and the second PIR sensor 2012(2) may be arranged vertically below the divider 2502. In doing so, first light rays may be directed to the first PIR sensor 2012(1) and second light rays may be directed to the second PIR sensor 2012(2). In some instances, the front cover 124 defines a window 2504 through which the first PIR sensor 2012(1) and the second PIR sensor 2012(2) are configured to receive light rays. The divider 2502 may extend across a portion of the window 2504, so as to adjoin adjacent sidewalls of the window 2504.

In some instances, the window 800 has an upper portion 2506 and a lower portion 2508. The first PIR sensor 2012(1) is arranged to receive light rays via the upper portion 2506, while the second PIR sensor 2012(2) is arranged to receive light rays via the lower portion 2508. In some instances, the upper portion 2506 is larger in size than the lower portion 2508. In some instances, surfaces of the divider 2502 are scalloped-shaped. The scalloped-shaped surface of the divider 2502 may reduce glare of incoming light rays being received by the first PIR sensor 2012(1) and/or the second PIR sensor 2012(2), respectively.

The front cover 124 may include first attachment mechanisms 2510 that engage or correspond to second attachment mechanisms of the sensor lens 128. The first attachment mechanisms 2510 may represent flanges, slots, tabs, keyways, and the like that engage with corresponding features on the sensor lens 128. Such engagement may secure the sensor lens 128 and the front cover 124 together. For example, the first attachment mechanisms 2510 and the second attachment mechanisms may snap together, slide together, press fit together, and so forth. The first attachment mechanisms 2510 may be disposed around at least a portion of a perimeter or periphery of the front cover 124. In some instances, adhesives or fasteners may also be used to secure the front cover 124 and the sensor lens 128 together.

The front cover 124 includes an interior surface 2512 disposed at the back of the front cover 124. The interior surface 2512 may define prongs that engage with features of the first PCB 2000, the second PCB 2002, the housing 126, the microphone assembly 2014, and so forth for aligning the first PCB 2000, the second PCB 2002, the housing 126, the microphone assembly 2014, and so forth within the camera assembly 102. The interior surface 2512 may also define various other tabs, receptacles, slots, etc. for receiving components of the camera assembly 102.

As discussed above, the first IR sensor 2004(1) and the second IR sensor 2004(2) are configured to output light through the front cover 124. For example, the first IR sensor 2004(1) and the second IR sensor 2004(2) may emit signals (e.g., IR signals) through at least a portion of the front cover 124 and receive the signals to detect IR radiation. As such, at least a portion of the front cover 124 is transmissive to signals emitted from, and received by, the first IR sensor 2004(1) and the second IR sensor 2004(2).

In some instances, seals gaskets, and so forth may be interposed between the front cover 124 and the housing 126 to environmentally seal the camera assembly 102.

Figure 26:
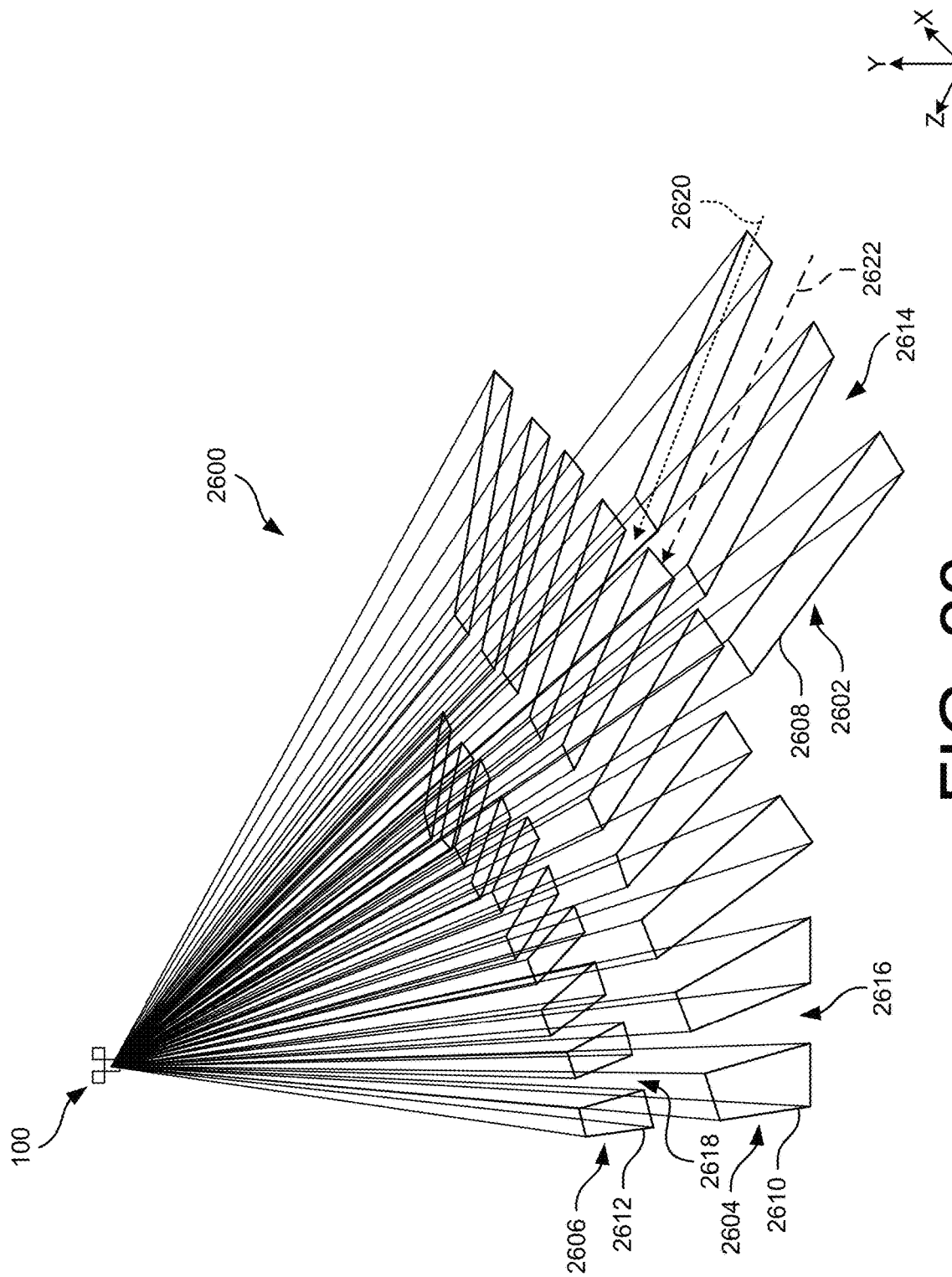
FIG. 26 illustrates example field of views (FoVs) of passive infrared (PIR) sensors of the device of FIG. 1, according to an example of the present disclosure.

FIG. 26 illustrates a FoV 2600 of the PIR sensor(s) 2012 of the device 100, according to examples of the present disclosure. In some instances, the FoV 2600 may be representative of a collective FoV of the first PIR sensor 2012(1) and the second PIR sensor 2012(2). The FoV 2600, however, may be formed via a first FoV 2602 of the first PIR sensor 2012(1), a second FoV 2604 of the second PIR sensor 2012(2), and a third FoV 2606 of the second PIR sensor 2012(2). As shown, the first FoV 2602 may represent a FoV located furthest from the device 100, while the third FoV 2606 may be located closest to the device 100. The second FoV 2604 may be disposed between the first FoV 2602 and the third FoV 2606.

The first FoV 2602 is made up by, or includes, a plurality of first detectable zones 2608. The second FoV 2604 is made up by, or includes, a plurality of second detectable zones 2610, and the third FoV 2606 is made up by, or includes, a plurality of third detectable zones 2612. As shown, the plurality of first detectable zones 2608, the plurality of second detectable zones 2610, and the plurality of third detectable zones 2612 may be separated by first gaps 2614, second gaps 2616, and third gaps 2618, respectively. That is, the first gaps 2614 may be interposed between adjacent detectable zones of the plurality of first detectable zones 2608, the second gaps 2616 may be interposed between adjacent detectable zones of the plurality of second detectable zones 2610, and the third gaps 2618 may be interposed between adjacent detectable zones of the plurality of second detectable zones 2610.

The plurality of first detectable zones 2608, the plurality of second detectable zones 2610, and the plurality of third detectable zones 2612 may represent polarized areas, sections, or regions. For example, the plurality of first detectable zones 2608 represent polarized (e.g., + and −) zones of the PIR sensors 2012 that generate a signal as to whether a person (or other object) is leaving an individual zone of the plurality of first detectable zones 2608. When the person is within a first gap of the first gaps 2614, being as the person may not be within any of the plurality of first detectable zones 2608, the first PIR sensor 2012(1) may not detect the person. However, as a person comes within individual zones of the plurality of first detectable zones 2608, for example, the one of the pyroelectric sensing elements of the first PIR sensor 2012(1) generates a signal indicative of IR radiation emitted by the person. Such signals indicate whether the person is entering, or leaving, the detectable zones of the plurality of first detectable zones 2608.

As will be explained further herein, the plurality of first detectable zones 2608 may be offset from the plurality of second detectable zones 2610 and/or the plurality of third detectable zones 2612. Such offset prevents the signals generated by the first PIR sensor 2012(1) and/or the second PIR sensor 2012(2) cancelling out. For example, if the person enters two detection zones at the same time, the signals may be cancelled out and motion may not be detected by the device 100. That is, a pyroelectric sensing element of the first PIR sensor 2012(1) may receive radiation from a detection zone of the plurality of first detectable zones 2608 may generate a positive (+) signal, while a pyroelectric sensing element of the second PIR sensor 2012(2) may receive radiation from a detection zone of the plurality of second detectable zones 2610 may generate a negative (−) signal. These signals may cancel out and the device 100 may fail to detect motion.

However, by offsetting the detection zones of the plurality of first detectable zones 2608 from the plurality of second detectable zones 2610 and the third detectable zones 2612, the device 100 may more detect motion as an object, such as a person, approaches the device 100. That is, the signals may not cancel out one another, thereby permitting the device 100 to sense motion. Take, for example, a person who approaches the device 100 along a first path 2620. As the person approaches the device 100, the person is detected upon entering one of the plurality of first detectable zones 2608. As the person continues to walk towards the device 100, along the first path 2620, the person exits the detectable zone of the plurality of first detectable zones 2608. The first path 2620 is shown being between the plurality of second detectable zones 2610, such as within the second gaps 2616. However, prior to this point, motion was detected and the camera 110 may have already begun capturing image and/or video data (e.g., upon entering one of the plurality of first detectable zones 2608).

Additionally, a person who approaches the device 100 along a second path 2622 is not detected until reaching the plurality of second detectable zones 2610. That is, the second path 2622 may be within one of the first gaps 2614. However, motion is detected upon the person entering one of the plurality of second detectable zones 2610 if the person continues on the second path 2622.

Comparatively, if all of the detectable zones were aligned, signals generated from the first PIR sensor 2012(1) and the second PIR sensor 2012(2) may overlap. For example, if the detectable zones of the plurality of first detectable zones 2608 and the plurality of second detectable zones 2610 were aligned, a pyroelectric sensing element that generates a first signal for one of the detectable zones of the plurality of first detectable zones 2608 may cancel out with a signal generated from a pyroelectric sensing element of the plurality of second detectable zones 2610 monitoring one of the detectable zones of the plurality of second detectable zones 2610. As a result, motion may not be detected.

In some instances, the first FoV 2602 may be associated with a first tier of the FoV 2600, while the second FoV 2604 and the third FoV 2606 may be associated with a second tier of the FoV 2600. The first tier may be located more distant from the device 100 than the second tier. In some instances, a user of the device 100 may configure the device 100 to one monitor proximate to the device 100 and/or distant from the device 100. In the former, the user may disable the second PIR sensor 2012(1) and in the latter, the user may disable the first PIR sensor 2012(1).

The plurality of first detectable zones 2608, the plurality of second detectable zones 2610, and the plurality of third detectable zones 2612 may be generated at least in part by a Fresnel lens of the device 100. For example, the Fresnel lens may guide light from respective zones of the plurality of first detectable zones 2608, the plurality of second detectable zones 2610, and the plurality of third detectable zones 2612 to the first PIR sensor 2012(1) and/or the second PIR sensor 2012(2), respectively. In some instances, the Fresnel lens may include a plurality of individual lens elements having concentric grooves with different certain points and/or focal lengths for generating the plurality of first detectable zones 2608, the plurality of second detectable zones 2610, and the plurality of third detectable zones 2612.

In response to sensing motion and/or the distance to the object, the device 100 may perform one or more processes. For a first example, the device 100 may be configured to send motion alerts and/or generate image data when objects are located within a threshold distance to the device 100. As such, if the device 100 determines that a distance to an object is within the threshold distance, then the device 100 may send a motion alert and/or generate image data. However, if the device 100 determines that a distance to an object is outside of the threshold distance, then the device 100 may refrain from sending a motion alert and/or generate image data. For a second example, the device 100 may be configured to send motion alerts and/or generate image data when objects are moving towards the device 100. As such, if the device 100 determines that an object is moving towards the device 100 using two distances, then the device 100 may send a motion alert and/or generate image data. However, if the device 100 determines that an object is moving away from the device 100 using two distances, then the device 100 may refrain from sending a motion alert and/or generate image data.

It will be appreciated that the illustrations with respect to the first FoV 2602, the second FoV 2604, and the third FoV 2606 are exemplary. In some instances, the device 100 may be configured to define different FoVs for the first PIR sensor 2012(1) and/or the second PIR sensor 2012(2) than those illustrated. In such instances, the detectable zones of the FoVs may be different than, or similar to, those illustrated. However, one or more of the detectable zones of the FoVs may be offset from other detectable zones of the FoVs to sense objects approaching the device 100. Additional details of FoV for PIR sensors are described in, for example, U.S. patent application Ser. No. 17/855,752, filed Jun. 30, 2022, entitled "Techniques for Determining Distances Using Passive Infrared Sensors." This patent application, as well as any publications thereof or patents issuing therefrom, are herein incorporated by reference.

Figure 27:
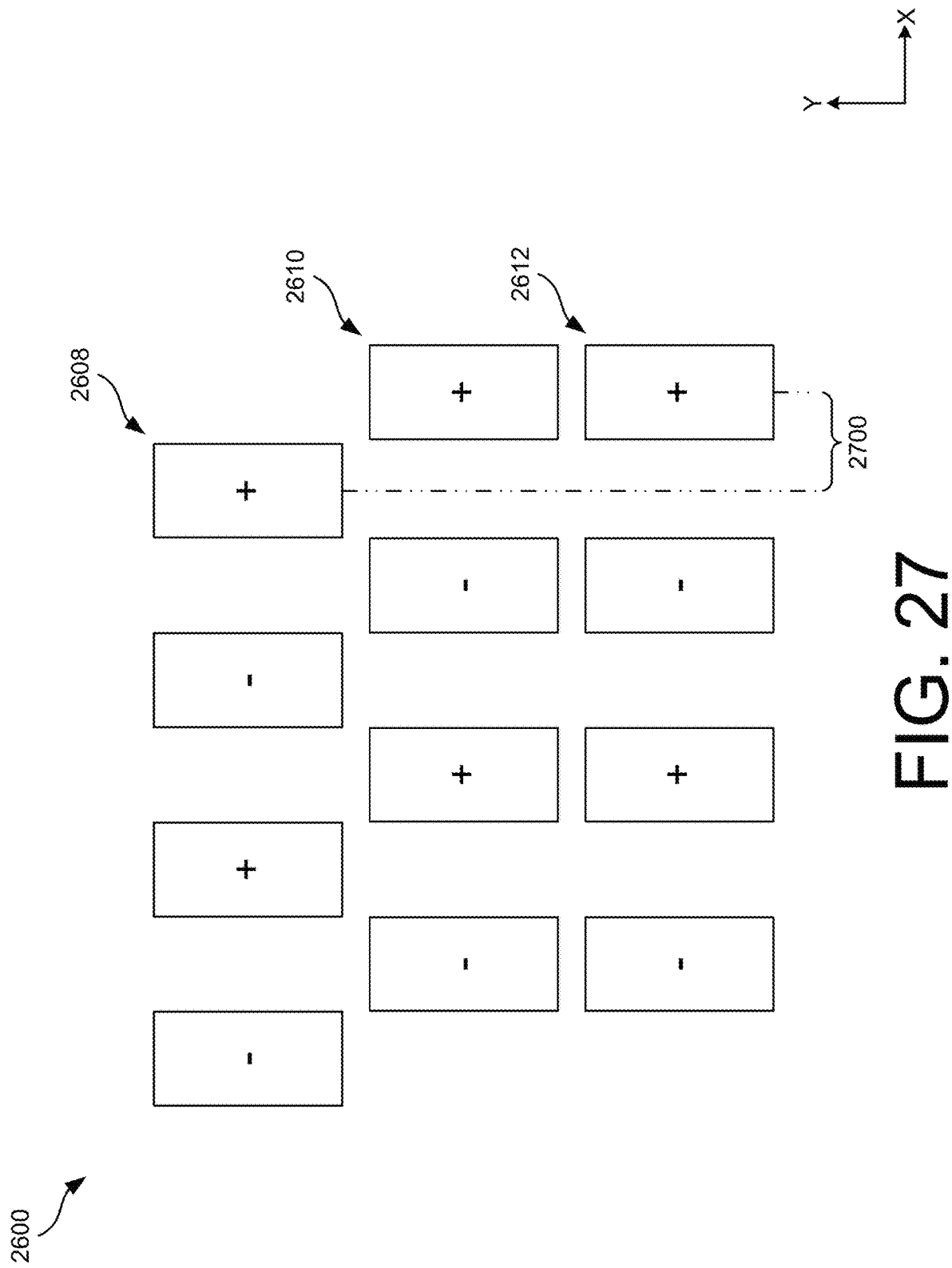
FIG. 27 illustrates example detection zones of the FoV of passive infrared (PIR) sensors of the device of FIG. 1, according to an example of the present disclosure.

FIG. 27 illustrates a cross-sectional view of the FoV 2600 of the device 100, according to examples of the present disclosure. The cross-sectional view illustrates certain detectable zones of the plurality of first detectable zones 2608, the plurality of second detectable zones 2610, and the plurality of third detectable zones 2612. For example, four of the plurality of first detectable zones 2608, the plurality of second detectable zones 2610, and the plurality of third detectable zones 2612 are shown.

As shown, the plurality of first detectable zones 2608 may be offset from the plurality of second detectable zones 2610 and the plurality of third detectable zones 2612. For example, the plurality of first detectable zones 2608 may include an offset 2700 from the plurality of second detectable zones 2610 and the plurality of third detectable zones 2612. The offset 2700 may represent a horizontal offset. By offsetting the plurality of first detectable zones 2608, the device 100 is able to sense motion in instances where both the first PIR sensor 2012(1) and the second PIR sensor 2012(2) generate sensor data for detectable zones of the first FoV 2602, the second FoV 2604, and the third FoV 2606.

Figure 28:
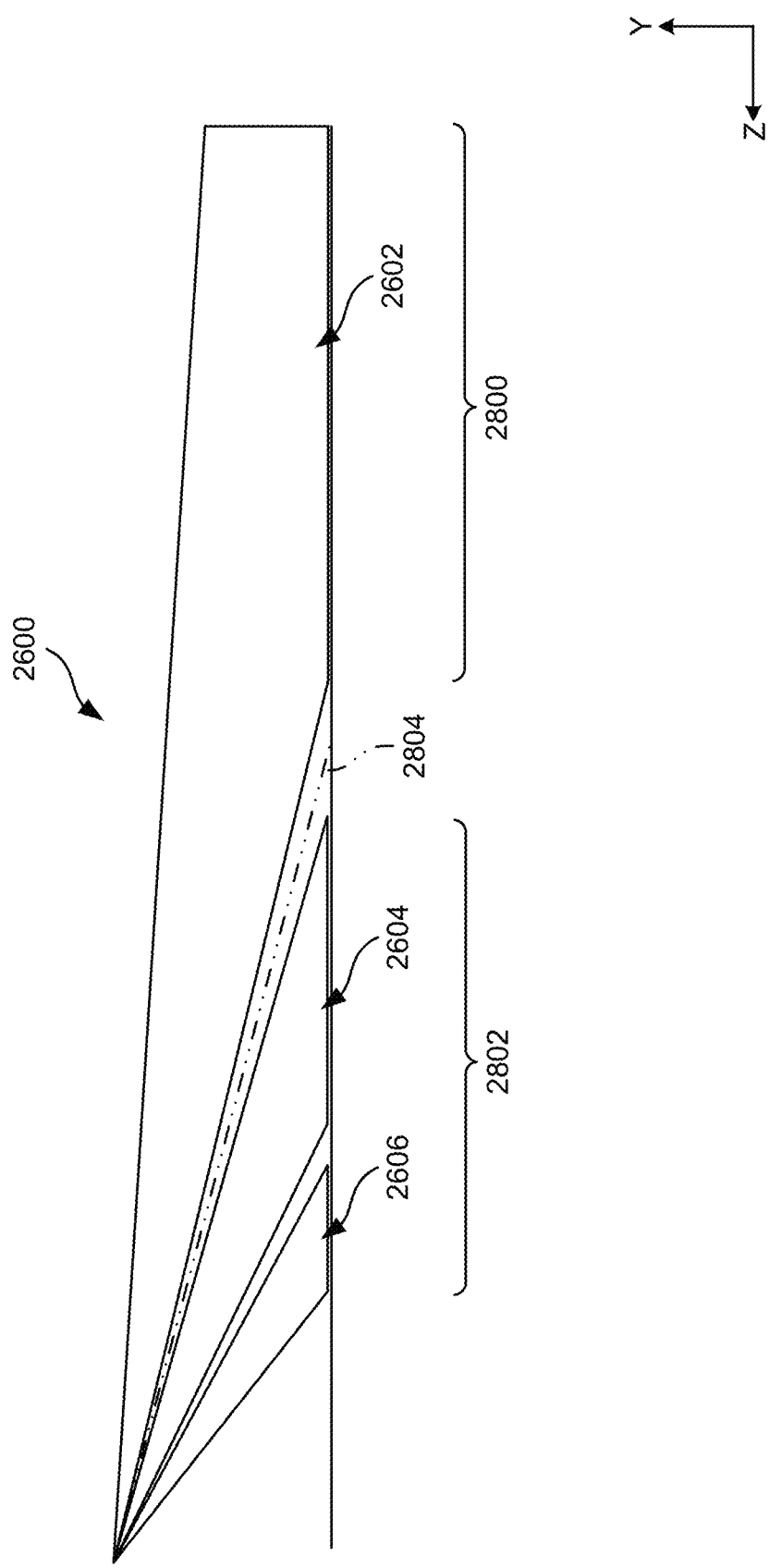
FIG. 28 illustrates example tiers of the FoV of passive infrared (PIR) sensors of the device of FIG. 1, according to an example of the present disclosure.
Figure 29:
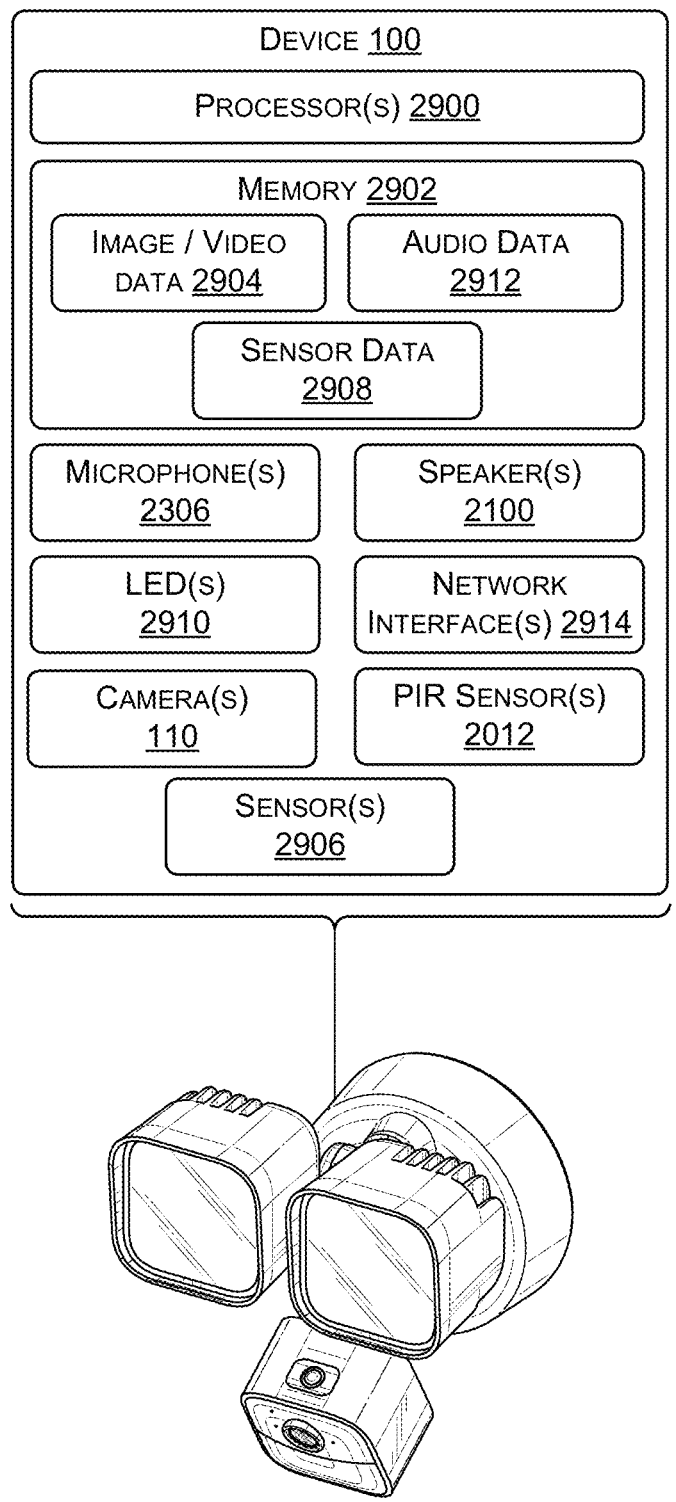
FIG. 29 illustrates select component of the device of FIG. 1, according to an example of the present disclosure.

FIG. 28 illustrates different tiers of the FoV 2600 of the device 100, according to examples of the present disclosure. The first PIR sensor 2012(1) may be associated with a first tier 2800, while the second PIR sensor 2012(2) may be associated with a second tier 2802. In some instances, the different tiers may assist the device 100 in controlling detection distance range (e.g., distance of object to the device 100).

As shown, the first tier 2800 may encompass, or be associated with, the first FOV 2602 and/or the plurality of first detectable zones 2608. The second tier 2802 may encompass, or be associated with, the second FoV 2604 and/or the plurality of second detectable zones 2610, as well as the third FoV 2606 and/or the plurality of third detectable zones 2612. The first PIR sensor 2012(1) is configured to generate signals associated with the first tier 2800, while the second PIR sensor 2012(2) is configured to generate signals associated with the second tier 2802. A dashed line 2804 exists between the first tier 2800 and the second tier 2802, and may indicate a line of separation between the first tier 2800 and the second tier 2802. By separating the first FoV 2602, the second FoV 2604, and the third FoV 2606 into tiers, the device 100 may more accurately detect a distance between an object and the device 100. For example, the distance to the object may be determined by ignoring one of the signals generated from first PIR sensor 2012(1) or the second PIR sensor 2012(2) (e.g., nuisance detection).

The first PIR sensor 2012(1) may include the first FoV 2602 that extends a first distance from the device 100. The second PIR sensor 2012(2) may include a second FoV that extends a second, shorter distance from the device 100, and the third FoV 2606 that extends a third, even shorter distance from the device 100. The distances and the FoV of the first PIR sensor 2012(1) and the second PIR sensor 2012(2) may be created based on an orientation of the first PIR sensor 2012(1) and the second PIR sensor 2012(2) on the device 100, as well as the Fresnel lens (e.g., of the sensor lens 128).

In some instances, the PIR sensors have non-overlapping FoVs. For example, the first FoV 2602, the second FoV 2604, and the third FoV 2606 may be non-overlapping. In such examples, the PIR sensors 2012 are able to detect objects when the objects are located close to the device 100 and when the objects are located far from the device 100. For example, when the person is located at a first, closer location from the device 100, the second PIR sensor 2012(2) is able to detect the person while the first PIR sensor 2012(1) may not detect the person. Based on this, the device 100 may determine that the person is within a first distance from the device 100. In some instances, to make this determination, the device 100 may determine that a first value associated with the second PIR sensor 2012(2) is large while a second value associated with the first PIR sensor 2012(1) is zero or small. As such, the device 100 may determine that the ratio is also small and the device 100 may then determine that the person is within a certain distance.

Additionally, when the person is located at a second further location from the device 100, the first PIR sensor 2012(1) is able to detect the person while the second PIR sensor 2012(2) may not be able to detect the person. As such, the device 100 may determine that the person is farther from the device 100. To make this determination, the device 100 may determine that a first value associated with the first PIR sensor 2012(1) is large, and a second value for the second PIR sensor 2012(2) is small. Because of this, the device may determine that the person is further from the device 100.

While described herein as using a Fresnel lens in order to create the different first FoVs, in other examples, the device 100 may additionally, or alternatively, include more than two PIR sensors 2012 to create the FoVs. For example, the device 100 may include three PIR sensors 2012 that generate three FoVs.

FIG. 26 illustrates select components of the device 100, according to examples of the present disclosure. The device 100 is shown including processor(s) 2900 and memory 2902, where the processor(s) 2900 may perform various functions associated with controlling an operation of the device 100, and the memory 2902 may store instructions executable by the processor(s) 2900 to perform the operations described herein.

The device 100 includes the camera 110 for capturing image/video data 2904 within an environment of the device 100. In some instances, the camera(s) 110 may include red, green, blue, depth (RGBD) camera(s) and/or three-dimensional (3D) sensors. Additionally, the device 100 may include any other sensor(s) 2906 (e.g., the ambient light sensor 2006) that generates sensor data 2908. Further, the device 100 may include the PIR sensor(s) 2012 that generates the sensor data 2908. In some instances, the PIR sensor(s) 2012 act as motion sensors for detecting movement within a FoV of the PIR sensor(s) 2012. The PIR sensor(s) 2012 may reside behind a sensor lens (e.g., a Fresnel lens) of the device 100. In such examples, the PIR sensor(s) 2012 may detect IR radiation in a FoV of the PIR sensor(s) 2012, and produce an output signal (e.g., voltage) that changes as the amount of IR radiation in the FoV changes. The amount of voltage in the output signal may be compared, by the processor(s) 2900, for example, to one or more threshold voltage values to determine if the amount of voltage in the output signal is indicative of motion, and/or if the amount of voltage in the output signal is indicative of motion of an entity that is to be recorded by the camera(s) 110. In some instances, the PIR sensor(s) 2012 may detect the motion for activating the camera(s) 110 and/or the microphone(s) 2306 to begin capturing image data and/or audio data, respectively.

In some instances, the PIR sensor(s) 2012 are used to detection motion within an environment of the device 100. However, in some instances, the camera(s) 110, in addition to or alternative from the PIR sensor(s) 2012, may be used to detect motion. For example, computer vision techniques may be used to detect objects of interest. In some instances, the camera(s) 110 may include a CMOS image sensor, and a digital processor that may perform embedded processing within the low-power CVM itself, such that the low-power CVM may output post-processed computer vision metadata to the processor(s) 2900. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image.

The device 100 also includes LED(s) 2910, such as IR LEDs and/or white LEDs, for illuminating and/or emitting light within the environment of the device 100. Any number of IR LEDs and/or white LEDs may be included, and the IR LEDs and the white LEDs may be arranged about various sides of the device 100 (e.g., front, sides, etc.). In some instances, in response to the PIR sensor(s) 2012 and/or the camera(s) 110 detecting motion, the LED(s) 2910 may receive an output signal from the processor(s) 2900 that causes the LED(s) 2910 to activate the one or more lights. The IR LEDs may also be used to detect motion and/or record image/video data 2904 in low-light conditions. The LED(s) 2910 may also output indications associated with an operational status of the device 100. The LED(s) 2910 may be representative of the lighting elements 900 within the light assemblies 104, the first lighting element 2300, and/or the second lighting element.

The device 100 includes the microphone(s) 2306 that generate audio data 2912. Speaker(s) 2100 may output sound in a direction away from the device 100. The sound output by the speaker(s) 2100 may include the audio data 2912, which may be received from one or more communicatively coupled device, or other audio (e.g., siren, alarm, etc.).

Network interface(s) 2914 permit the device 100 to communicate over one or more networks. Example network interface(s) 2914 include, without limitation, Wi-Fi, Bluetooth, ZigBee, Bluetooth Low Energy (BLE), LTE, and so forth. The network interface(s) 2914 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data from may be routed through the network interface(s) 2914 before being directed to the processor(s) 2900, and outbound data from the processor(s) 2900 may be routed through the network interface(s) 2914. The network interface(s) 2914 may therefore receive inputs, such as data, from the processor(s) 2900, the camera(s) 110, the PIR sensor(s) 2012, and so forth. For example, the network interface(s) 2914 may be configured to transmit data to and/or receive data from one or more network devices. The network interface(s) 2914 may act as a conduit for data communicated between various components and the processor(s) 2900.

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth).

As used herein, a processor, such as the processor(s) 2900 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 2902 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device comprising:
   a camera;
   a first passive infrared (PIR) sensor including a first PIR element and a second PIR element;

a second PIR sensor including a third PIR element and a fourth PIR element;
a first lens section shaped and dimensioned to direct light onto the first PIR sensor so as to provide:
 a first field of view (FoV) for the first PIR element,
 a second FoV for the second PIR element, and
 a first blind zone between the first FoV and the second FoV;
a second lens section shaped and dimensioned to direct light onto the second PIR sensor so as to provide:
 a third FoV for the third PIR element,
 a fourth FoV for the fourth PIR element, and
 a second blind zone between the third FoV and the fourth FoV; and
a third lens section shaped and dimensioned to direct light onto the second PIR sensor so as to provide:
 a fifth FoV for the third PIR element,
 a sixth FoV for the fourth PIR element, and
 a third blind zone between the fifth FOV and the sixth FoV;
wherein the first lens section, second lens section, and third lens section are arranged such that, when the electronic device is oriented in a first orientation:
 the first lens section is disposed vertically above the second lens section and the third lens section,
 the third lens section horizontally overlaps the first lens section and the second lens section, and
 the first blind zone is azimuthally offset from the second blind zone and the third blind zone.

2. The electronic device of claim 1, wherein:
each respective lens section comprises a plurality of grooves in the shape of concentric arcs relative to a respective centerpoint of the respective lens section, and
when the electronic device is in the first orientation, the centerpoint for the first lens section is horizontally offset from the centerpoints for the second lens section and the third lens section.

3. The electronic device of claim 1, wherein the electronic device comprises one or more computer readable media containing computer executable instructions that, when executed by one or more processors of the electronic device, cause the electronic device to perform operations comprising initiating recording by the camera based on data generated by at least one of the first PIR sensor or second PIR sensor.

4. An electronic device comprising:
a camera;
a first passive infrared (PIR) sensor;
a second PIR sensor;
a first lens section shaped and dimensioned to direct light onto the first PIR sensor so as to define first field of view (FoV) and a second FoV, and
a second lens section shaped and dimensioned to direct light onto the second PIR sensor so as to define a third FoV and a fourth FoV, and
a third lens section shaped and dimensioned to direct light onto the second PIR sensor so as to define fifth FoV and a sixth FoV, and
wherein the first lens section, the second lens section, and the third lens section are arranged such that, when the electronic device is oriented in a first orientation:
 the first lens section is disposed vertically above the second lens section and third lens section, and
 the first lens section horizontally overlaps the second lens section and the third lens section,
 a first vertical plane extending from the first PIR sensor halfway between the first FoV and the second FoV is azimuthally offset from a second vertical plane extending from the second PIR sensor halfway between the third FOV and the fourth FoV,
 a third vertical plane extending from the second PIR sensor halfway between the fourth FoV and the fifth FoV; and
 a fourth vertical plane extending from the second PIR sensor halfway between the fifth FoV and the sixth FoV.

5. The electronic device of claim 4, wherein:
the first lens section is shaped and dimensioned to:
 direct light from the first FoV onto a first PIR element of the first PIR sensor, and
 direct light from the second FoV onto a second PIR element of the first PIR sensor;
the second lens section is shaped and dimensioned to:
 direct light from the third FoV onto a third PIR element of the second PIR sensor, and
 direct light from the fourth FoV onto a fourth PIR element of the second PIR sensor; and
the third lens section is shaped and dimensioned to:
 direct light from the fifth FoV onto the third PIR element of the second PIR sensor, and
 direct light from the sixth FoV onto the fourth PIR element of the second PIR sensor.

6. The electronic device of claim 4, wherein the first PIR sensor include a first pyroelectric crystal element and a second pyroelectric crystal element, each pyroelectric crystal element being configured to generate voltage based on a change in temperature, and wherein electronics of the PIR sensor are configured to reverse a polarity of exactly one of:
 a first voltage value corresponding to voltage generated by the first pyroelectric crystal element,
 a second voltage value corresponding to voltage generated by the first pyroelectric crystal element, or
 sum the first voltage value and the second voltage value.

7. The electronic device of claim 4, wherein the first PIR sensor includes a first pyroelectric crystal element and a second pyroelectric crystal element, each pyroelectric crystal element being configured to generate voltage based on a change in temperature, and wherein electronics of the PIR sensor are configured to shift a phase of exactly one of:
 a signal generated based on the first pyroelectric crystal, or
 a signal generated based on the second pyroelectric crystal.

8. The electronic device of claim 4, wherein the electronic device comprises one or more computer readable media containing computer executable instructions that, when executed by one or more processors of the electronic device, cause the electronic device to perform operations comprising:
 receiving, at a controller of the electronic device from an integrated circuit of the first PIR sensor, a signal; and
 based on the signal, powering up the camera of the electronic device.

9. The electronic device of claim 4, wherein the electronic device comprises one or more computer readable media containing computer executable instructions that, when executed by one or more processors of the electronic device, cause the electronic device to perform operations comprising initiating recording by the camera based on data generated by at least one of the first PIR sensor or the second PIR sensor.

10. The electronic device of claim 4, wherein the electronic device comprises a lens that includes the first lens section, the second lens section, and the third lens section, and wherein, when the electronic device is in the first orientation, the first lens section is a center-most lens section of a first row of lens sections, and the second lens section and the third lens section are center-most lens sections of a second row of lens sections, the first row of lens sections being vertically above the second row of lens sections.

11. The electronic device of claim 4, wherein the electronic device comprises:
a fourth lens section shaped and dimensioned to direct light onto the second PIR sensor so as to define a seventh FoV and an eighth FoV,
a fifth lens section shaped and dimensioned to direct light onto the second PIR sensor so as to define a ninth FoV and a tenth FoV,
wherein the fourth lens section and the fifth lens section are arranged such that, when the electronic device is oriented in a first orientation:
the fourth lens section and the fifth lens section are disposed vertically below the second lens section and the third lens section, and
the first lens section horizontally overlaps the fourth lens section and the fifth lens section, and
the first vertical plane extending from the first PIR sensor halfway between the first FoV and the second FoV is azimuthally offset from:
a fourth vertical plane extending from the second PIR sensor halfway between the seventh FoV and the eighth FoV,
a fifth vertical plane extending from the second PIR sensor halfway between the eighth FoV and the ninth FoV, and
a sixth vertical plane extending from the second PIR sensor halfway between the ninth FOV and the tenth FoV.

12. The electronic device of claim 11, wherein the electronic device comprises a lens that includes the first lens section, the second lens section, the third lens section, the fourth lens section, and the fifth lens section, and wherein, when the electronic device is in the first orientation, the first lens section is a center-most lens section of a first row of lens sections, the second lens section and the third lens section are center-most lens sections of a second row of lens sections, and the fourth lens section and the fifth lens section are center-most lens sections of a third row of lens sections, the first row of lens sections being vertically above the second row of lens sections, and the second row of lens sections being vertically above the third row of lens sections.

13. The electronic device of claim 4, wherein each respective lens section comprises a plurality of grooves in the shape of concentric arcs relative to a respective centerpoint for the respective lens section.

14. The electronic device of claim 13, wherein, when the electronic device is in the first orientation, the centerpoint for the first lens section is horizontally offset from the centerpoints for the second lens section and the third lens section.

15. The electronic device of claim 4, wherein the first lens section includes a plurality of grooves defined by lens facets or translation edges.

16. The electronic device of claim 4, wherein each respective lens section comprises a plurality of curved surfaces shaped and dimensioned to direct light to a respective focal point for the respective lens section.

17. The electronic device of claim 4, wherein, when the electronic device is in the first orientation, the focal point for the first lens section is horizontally offset from the focal points for the second lens section and the third lens section.

18. An electronic device, comprising:
a camera;
a first passive infrared (PIR) sensor;
a second PIR sensor; and
a plurality of lens sections, each respective lens section including a plurality of grooves defining concentric arcs relative to a respective centerpoint for the respective lens section, the plurality of lens sections having:
a first lens section shaped and dimensioned to direct light onto the first PIR sensor, and
a second lens section and a third lens section shaped and dimensioned to direct light onto the second PIR sensor;
wherein the plurality of lens sections are arranged such that, when the electronic device is oriented in a first orientation:
the first lens section is disposed vertically above the second lens section and the third lens section,
the first lens section horizontally overlaps the second lens section and the third lens section, and
the centerpoint for the first lens section is horizontally offset from the centerpoints for the second lens section and the third lens section.

19. The electronic device of claim 18, wherein the electronic device comprises a first lens including the plurality of lens sections, and wherein, when the electronic device is in the first orientation, the first lens section is a center-most lens section of a first row of lens sections, and the second lens section and the third lens section are center-most lens sections of a second row of lens sections, the first row of lens sections being vertically above the second row of lens sections.

20. The electronic device of claim 18, wherein each respective lens section includes a plurality of curved surfaces shaped and dimensioned to direct light to a respective focal point for the respective lens section, and wherein, for each respective lens section, the respective focal point for the respective lens section corresponds to the respective centerpoint for that respective lens section.

21. The electronic device of claim 18, wherein the electronic device comprises one or more computer readable media containing computer executable instructions that, when executed by one or more processors of the electronic device, cause the electronic device to perform operations comprising initiating recording by the camera based on data generated by the first PIR sensor or second PIR sensor.

* * * * *